(12) United States Patent
Li et al.

(10) Patent No.: US 12,429,294 B2
(45) Date of Patent: Sep. 30, 2025

(54) PACKING SHEET, PACKING MODULE AND COOLING TOWER

(71) Applicant: SHANDONG BENO COOLING EQUIPMENT CO., LTD., Dezhou (CN)

(72) Inventors: Jin Peng Li, Dezhou (CN); Jin Li, Dezhou (CN); Min Liu, Dezhou (CN); Juan Du, Dezhou (CN); Liang Cai Chen, Dezhou (CN); Yan Liu, Dezhou (CN); Gang Sun, Dezhou (CN); Zhen Xing Lin, Dezhou (CN)

(73) Assignee: SHANDONG BENO COOLING EQUIPMENT CO., LTD., Dezhou (CN)

( * ) Notice: Subject to any disclaimer, the term of this patent is extended or adjusted under 35 U.S.C. 154(b) by 722 days.

(21) Appl. No.: 17/594,950

(22) PCT Filed: Mar. 9, 2020

(86) PCT No.: PCT/CN2020/078411
§ 371 (c)(1),
(2) Date: Nov. 3, 2021

(87) PCT Pub. No.: WO2021/008143
PCT Pub. Date: Jan. 21, 2021

(65) Prior Publication Data
US 2022/0307780 A1 Sep. 29, 2022

(30) Foreign Application Priority Data
Jul. 15, 2019 (CN) .......................... 201910634826.6

(51) Int. Cl.
*F28F 25/08* (2006.01)
*F28C 1/12* (2006.01)
(Continued)

(52) U.S. Cl.
CPC .............. *F28F 25/087* (2013.01); *F28C 1/12* (2013.01); *F28C 1/14* (2013.01); *F28F 19/006* (2013.01); *F28F 25/06* (2013.01)

(58) Field of Classification Search
CPC ... F28C 1/12; F28C 1/14; F28F 19/006; F28F 25/06; F28F 25/087
(Continued)

(56) References Cited

U.S. PATENT DOCUMENTS 3,995,689 A * 12/1976 Cates .................... F28F 21/065
261/153
3,997,635 A * 12/1976 Hallgren ................. F28F 25/02
261/DIG. 11
(Continued)

FOREIGN PATENT DOCUMENTS

CN 108344310 A * 7/2018
CN 108469187 A 8/2018
(Continued)

OTHER PUBLICATIONS

Abstract of EP 0915312 A2 (Year: 1999).*
(Continued)

*Primary Examiner* — Charles S Bushey
(74) *Attorney, Agent, or Firm* — HAUPTMAN HAM, LLP

(57) ABSTRACT

A packing module includes first and second flow paths which exchange heat between water sprayed from above and air flowing from below; a first import portion for importing water sprayed from one side of the packing module into the first flow path; a second import portion for importing water sprayed from the other side of the packing module into the second flow path; a first export portion for guiding water flowing out from the first water path to one side of the packing module for discharging; and, a second export por-
(Continued)

Figure 1:
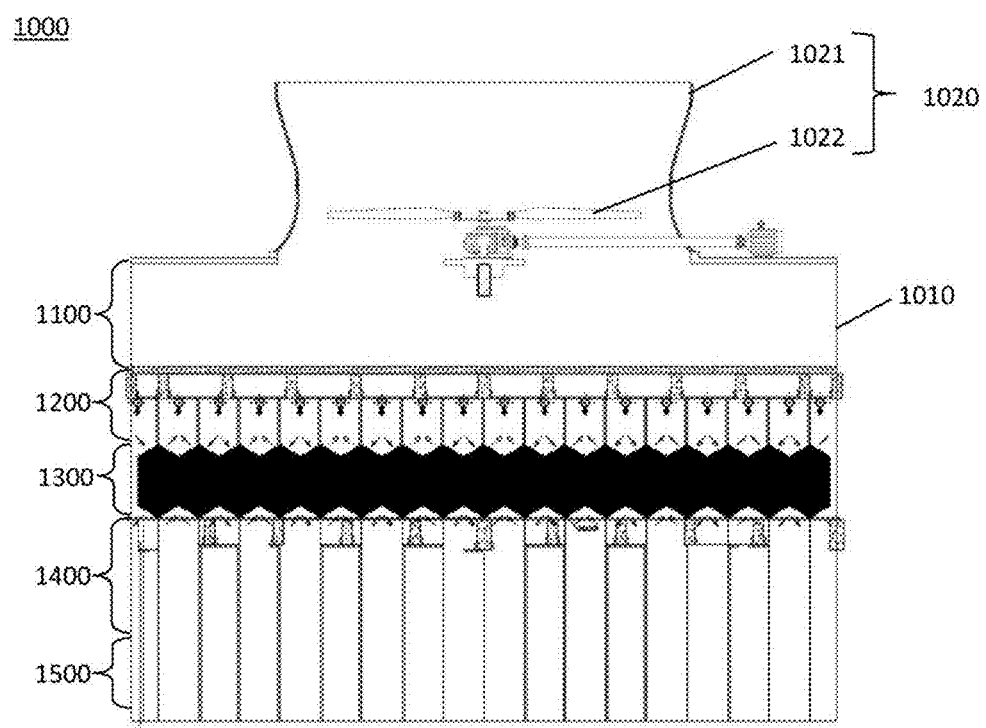

tion for guiding water flowing out from the second water path to the other side of the packing module for discharging. Two flow paths in the packing module operate in different operation modes, so that water or wind flows through one flow path to cool water while air flows through the other flow path for heat exchange through partition walls.

17 Claims, 33 Drawing Sheets

(51) Int. Cl.
*F28C 1/14* (2006.01)
*F28F 19/00* (2006.01)
*F28F 25/06* (2006.01)

(58) Field of Classification Search
USPC ......... 261/112.2, DIG. 11, DIG. 77, DIG. 86
See application file for complete search history.

(56) References Cited

U.S. PATENT DOCUMENTS

| | | | |
|---|---|---|---|
| 4,374,071 A | 2/1983 | Regehr | |
| 5,468,426 A * | 11/1995 | Kato | F28F 25/02 261/153 |
| 5,775,409 A * | 7/1998 | Goto | F28C 1/14 261/153 |
| 5,958,308 A * | 9/1999 | Mochizuki | F28F 25/04 261/153 |
| 8,636,269 B2 * | 1/2014 | James | B32B 29/08 261/153 |
| 9,719,726 B2 * | 8/2017 | Vadder | F28F 25/04 |
| 2015/0069643 A1 * | 3/2015 | Mockry | F28C 1/00 261/146 |

FOREIGN PATENT DOCUMENTS

| | | |
|---|---|---|
| CN | 208075613 U | 11/2018 |
| CN | 109405579 A | 3/2019 |
| CN | 110006268 A | 7/2019 |
| EP | 0915312 A2 * | 12/1999 |

OTHER PUBLICATIONS

Partial English Translation of CN 108344310 A (Year: 2018).*
International Search Report and Written Opinion issued in International Application No. PCT/CN2020/078411; mailed Jun. 10, 2020; 16 pgs.

* cited by examiner

US 12,429,294 B2

PACKING SHEET, PACKING MODULE AND COOLING TOWER

RELATED APPLICATIONS

The present application is a U.S. National Phase of International Application Number PCT/CN2020/078411 filed Mar. 9, 2020 and claims priority to Chinese Application Number 201910634826.6 filed Jul. 15, 2019.

TECHNICAL FIELD

The present invention relates to a packing sheet, a packing module, and a cooling tower comprising the packing module.

BACKGROUND

For a cooling tower in the prior art, an air mixing portion, a water collecting and fog trapping portion, a spray portion, a heat exchange portion, an air import portion and a water collecting portion are successively arranged in a main body of the cooling tower from the top down. An exhaust portion is arranged in an upper portion of the main body 1010, and the exhaust portion includes an air duct and a draught fan arranged in the air duct. Water is sprayed from the spray portion to the exchange portion, and multiple groups of packing modules with stacked flow paths formed by stacking a plurality of packing sheets are arranged in the heat exchange portion. The sprayed water flows through the flow paths of the packing modules from the top down. On the other hand, air is sucked into the cooling tower from the air import portion in the lower portion of the cooling tower and flows through the flow paths of the packing modules from the top down to realize heat and mass transfer with the sprayed hot water, so as to cool the hot water.

The air after flowing through the packing modules is discharged from the air duct of the cooling tower. The discharged air is saturated wet air which is mixed with cold air after being discharged into the ambient air, so that the temperature is lowered and the saturation humidity ratio is reduced. As a result, the saturated wet air at the outlet of the air duct is supersaturated, and the supersaturated water vapor will be condensed to form fog. Particularly in winter at high latitudes, the air discharged from the cooling tower will form dense fog and then form rain and snow, thereby bringing adverse effects on the environment. More seriously, ice will be formed on the devices and the ground, resulting in freezing damage.

SUMMARY

In view of the above problems, the present invention provides a packing module with a special structure. By using this packing module, even if the established cooling tower structure is simply modified, the problems in the prior art can be greatly improved.

The present invention provides a packing module having: stacked first flow path and second flow path which exchange heat between water sprayed from above and air flowing from below to above; a first import portion for importing water sprayed from one side of the packing module in a width direction into the first flow path; a second import portion for importing water sprayed from the other side of the packing module in the width direction into the second flow path; a first export portion for guiding water flowing out from the first water path to one side of the packing module in the width direction for discharging; and, a second export portion for guiding water flowing out from the second water path to the other side of the packing module in the width direction for discharging.

By allowing the upper portion of the packing module to have an import portion of the two flow paths therein and the lower portion thereof to have an export portion of the two flow paths therein, the two flow paths can operate in different operation modes, so that water or wind can flow through one flow path to cool water while only air can flow through the other flow path. The cold air flows through partition sheets to absorb the heat released by the sprayed water from the adjacent flow path, and the temperature of the air rises. Thus, in the air mixing portion of the cooling tower, the saturated wet air from one flow path is mixed with dry hot air from the other flow path, so that the relative humidity of the wet air changes from saturated to unsaturated. Thus, after the air is discharged into the atmosphere, the possibility of fogging is reduced.

Preferably, the packing module of the present invention is characterized in that: the first and second flow paths are stacked, and occupy the approximately full width of the packing module in the width direction, respectively. By allowing the first and second flow paths to occupy the approximately full width of the packing module in the width direction, respectively, the existing packing sheets can be used without specifically designing the flow paths. Thus, the cost for design and development is greatly reduced. Moreover, the water guided by the import portion occupying part of the width can flow to the flow paths occupying the full width to fully exchange heat with the air entering the flow path from the lower side.

Preferably, the packing module of the present invention has: first primary packing sheets, which limit the formation of the firs flow path; second primary packing sheets, which limit the formation of the second flow path and arranged alternately with the first primary packing sheets; and, partition sheets, which separate the first primary packing sheets from the second primary packing sheets. By providing the partition sheets between the first and second primary packing sheets, the first and second flow paths separated from each other can be conveniently formed. If each packing sheet is used to separate the flow path, it is necessary to form fins on one surface or two surfaces of the packing sheet to serve as the import portion, the export portion and the flow path, so that the cost in manufacturing the packing sheet will be very high. However, in this implementation, by arranging partition sheets between the first and the second primary packing sheets, the packing sheets can be conveniently manufactured by compression molding, and the cost for the packing module is greatly reduced.

Preferably, the packing module of the present invention is characterized in that: the first import portion is formed to guide, above the first primary packing sheets and by using a flow guide slot arranged obliquely, water flowing from one side of the packing module in the width direction to the first flow path; and, the second import portion is formed to guide, above the second primary packing sheets and by using a flow guide slot arranged obliquely, water flowing from the other side of the packing module in the width direction to the second flow path. By providing oblique flow guide slots in the upper portions of the first and second primary packing sheets, import ports to the corresponding flow paths can be effectively formed on one side of the packing module in the width direction.

Preferably, the packing module of the present invention is characterized in that: the first export portion is formed to guide, below the first primary packing sheets and by using a flow guide slot arranged obliquely, water flowing out from the first flow path to one side of the packing module in the width direction for discharging; and, the second export portion is formed to guide, below the second primary packing sheets and by using a flow guide slot arranged obliquely, water flowing out from the second flow path to the other side of the packing module in the width direction for discharging. By providing oblique flow guide slots in the lower portions of the first and second primary packing sheets, water in the flow paths in the full width range of the packing module can be effectively guided to one side of the packing module in the width direction for discharging.

The packing module of the present invention is characterized in that: the first import portion is integrally formed with the first primary packing sheets; and, the second import portion is integrally formed with the second primary packing sheets. Moreover, preferably, the first export portion is integrally formed with the first primary packing sheets; and, the second export portion is integrally formed with the second primary packing sheets. Furthermore, preferably, the packing module of the present invention is characterized in that: the first import portion is integrally formed with the first primary packing sheets to guide, above the first primary packing sheets and by using a flow guide slot arranged obliquely, water flowing from one side of the packing module in the width direction to the first flow path; the second import portion is integrally formed with the second primary packing sheets to guide, above the second primary packing sheets and by using a flow guide slot arranged obliquely, water flowing from the other side of the packing module in the width direction to the second flow path; the first export portion is integrally formed with the first primary packing sheets to guide, below the first primary packing sheets and by using a flow guide slot arranged obliquely, water flowing out from the first flow path to one side of the packing module in the width direction for discharging; and, the second export portion is integrally formed with the second primary packing sheets to guide, below the second primary packing sheets and by using a flow guide slot arranged obliquely, water flowing out from the second flow path to the other side of the packing module in the width direction for discharging.

As described above, by stacking the first and second primary packing sheets with the partition sheets, the water on one side of the packing module in the width direction can be guided to the flow paths in the full width range of the packing module, and the partition sheets are used as packing sheets for separating the flow paths. Therefore, even if the import and export portions of the first and second packing sheets are separated from the flow paths, the objective of the present invention can also be achieved, and this structure can be adopted according to actual needs. Thus, this structure is also included in the protection scope specified by other claims of the present invention. However, it is preferable to use a structure in which the import and export portions are integrally formed with the flow paths, so that the import and export portions and the flow paths can be molded at one time during manufacturing the packing sheets. Thus, the manufacturing efficiency is improved, the cost is reduced, and the mounting efficiency is greatly improved.

In addition, preferably, the packing module of the present invention is characterized in that: the first and second import portions and/or the first and second export portions are formed in such a way that a substrate is bent for many times to form a concave-convex flow guide slot. Moreover, preferably, the first and second import portions and/or the first and second export portions are formed in such a way that a substrate is bent for many times to form a concave-convex flow guide slot, and have a corrugated cross-section in a direction perpendicular to an extension direction of the flow guide slot, and the corrugated slot bottom is formed as a flat strip in the extension direction. Further, preferably, a groove extending in the extension direction and being recessed toward the inner side of the slot is formed on the slot bottom.

Such import and export portions are simple in structure and easy to form, so that the cost can be greatly reduced. Moreover, if the slot bottom is formed as a flat strip, the slot bottom can be conveniently bonded with the partition sheets, and the bonding procedure becomes simpler ad easier by forming a groove on the slot bottom.

Preferably, the packing module of the present invention is characterized in that: the first and second import portions and/or the first and second export portions are formed as a triangular shape having a vertex angle pointing to the outside of the packing module when viewed in a stack direction of the packing module. By forming the import and export portions as a triangle shape, the amount of raw materials used for the packing sheets can be greatly decreased, and the cost for the packing module can thus be reduced.

Also preferably, the packing module of the present invention is characterized in that: the partition sheets include: first partition sheets, which are located on one side of the first primary packing sheets and matched with the first primary packing sheets to form a first module group; and, second partition sheets, which are located on one side of the second primary packing sheets and matched with the second primary packing sheets to form a second module group; and, the first module group and the second module group are stacked to form the packing module. By arranging the partition sheets and the primary packing sheets in groups, the convenience of combining packing modules and the stability and tightness after assembly can be improved.

Preferably, the packing module of the present invention is characterized in that: on the edges, where no inflow/outflow port is formed, of the first primary packing sheets and the first partition sheets, first folding groups that can be folded toward each other in opposite directions and can be buckled with each other are formed; on the edges, where no inflow/outflow port is formed, of the second primary packing sheets and the second partition sheets, second folding groups that can be folded toward each other in opposite directions and can be buckled with each other are formed; and, when the first and second module groups are stacked, the first folding groups and the second folding groups at two ends of the packing module in the width direction are stacked with each other.

Since the primary packing sheets and the partition sheets are arranged in groups and provided with folding edges buckled with each other, the assembly strength of the packing module can be greatly improved, the service life can be prolonged, and the production cost can thus be reduced.

Preferably, the packing module of the present invention is characterized in that: when the first and second module groups are stacked, import portion water-retaining ribs are formed on the outer surfaces of the first and second folding groups of the first and second import portions. Since the import and export portions are formed in a triangle shape, the problem of uneven inflow water may occur, thus affecting the heat exchange efficiency. By providing the water-retaining ribs, the possible problem of uneven water flow can be effectively solved.

Also preferably, the packing module of the present invention is characterized in that: the import portion water-retaining ribs are formed as a herringbone shape with an upward tip. The herringbone water-retaining ribs are simple in structure, easy to form and good in effect.

Also preferably, the packing module of the present invention is characterized in that: when the first and second module groups are stacked, export portion water-retaining ribs are formed on the outer surfaces of the first and second folding groups of the first and second export portions. Similarly, by providing the water-retaining ribs in the export portion, the possible problem of unevenly discharging water can be effectively solved.

Also preferably, the packing module of the present invention is characterized in that: in the upper portion of the packing module: when viewed in the stack direction of the packing sheets, the packing module forms, in a vertical direction, upper flow guide portions with an upper triangle having a vertex angle pointing to the upper side of the packing module, and upper longitudinal flow guide portions communicating a bevel edge of the upper triangle on an inflow side; in the lower portion of the packing module: when viewed in the stack direction of the packing sheets, the packing module forms, in a vertical direction, lower flow guide portions with a lower triangle having a vertex angle pointing to the lower side of the packing module, and lower longitudinal flow guide portions communicating a bevel edge of the upper triangle on an outflow side; the first primary packing sheets guide, at the upper flow guide portions, water from a bevel edge on one side as the bevel edge on the inflow side to the middle part of the approximately full width of the first primary packing sheets, and guide, at the lower flow guide portions, the water from the middle part of the approximately full width of the first primary packing sheets to a bevel edge on the other side as the bevel edge on the outflow side or the bevel edge on the one side; for the first primary packing sheets, the upper longitudinal flow guide portions are arranged at positions corresponding to the bevel edge on the one side, and the lower longitudinal flow guide portions are arranged at position corresponding to the bevel edge on the other side or the bevel edge on the one side; the second primary packing sheets guide, at the upper flow guide portions, water from a bevel edge on the other side as the bevel edge on the inflow side to the middle part of the approximately full width of the second primary packing sheets, and guide, at the lower flow guide portions, the water from the middle part of the approximately full width of the second primary packing sheets to a bevel edge on one side as the bevel edge on the outflow side or the bevel edge on the other side; and, for the second primary packing sheets, the upper longitudinal flow guide portions are arranged at positions corresponding to the bevel edge on the other side, and the lower longitudinal flow guide portions are arranged at positions corresponding to the bevel edge on the one side or the bevel edge on the other side. By providing the upper longitudinal flow guide portions and the lower longitudinal flow guide portions, water can evenly flow into the packing module and flow out from the packing module.

Also preferably, the packing module of the present invention is characterized in that: the height of the upper longitudinal flow guide portions of the first and second primary packing sheets is less than that of the vertex of the upper triangle, and the vertex angle of the upper triangle is protruded upward; and, the height of the vertex of the lower triangle is less than that of the lower longitudinal flow guide portions of the first and second primary packing sheets, and the vertex angle of the lower triangle is protruded downward. The packing module can be positioned and mounted conveniently and accurately, and the packing module can be connected to an upper partition plate and a lower partition plate to form different operating regions.

Also preferably, the packing module of the present invention is characterized in that: the upper ends of the first and second primary packing sheets on a non-inflow side are at the same height as the upper ends of the upper longitudinal flow guide portions; and, the lower ends of the first and second primary packing sheets on a non-outflow side are at the same height as the lower ends of the upper longitudinal flow guide portions.

In a case where the non-inflow side is arranged obliquely, the water sprayed from the upper side of the packing module and falling on the upper surface of the non-inflow side slides obliquely downward along the upper surface, resulting in the uneven distribution of water in the packing module and affecting the heat exchange efficiency of the packing module. However, in the packing module in this implementation, the water falling on the upper surface of the non-inflow side will flow into the upper longitudinal flow guide portions of adjacent module groups, so that the water can be evenly distributed into the packing module.

In a case where the non-outflow side is arranged obliquely, the water flowing out from the lower longitudinal flow guide portions will slide obliquely downward along the lower surface of the non-outflow side, resulting in the uneven distribution of discharged water on the lower side of the packing module and affecting the heat exchange efficiency in a region below the packing module. However, in the packing module in this implementation, the water flowing out from the lower longitudinal flow guide portions will fall evenly, so that the water in the packing module evenly falls into the region below the packing module.

Also preferably, the packing module of the present invention is characterized in that: on the edges, where no inflow/outflow port is formed, of the first primary packing sheets and the first partition sheets, first folding groups that can be folded toward each other in opposite directions and can be buckled with each other are formed; on the edges, where no inflow/outflow port is formed, of the second primary packing sheets and the second partition sheets, second folding groups that can be folded toward each other in opposite directions and can be buckled with each other are formed; cover members for covering gaps between the first primary packing sheets and between first and second partition sheets adjacent thereto are arranged at the upper ends of the first primary packing sheets on the non-inflow side and the lower ends of the first primary packing sheets on the non-outflow side; and, cover members for covering gaps between the second primary packing sheets and between first and second partition sheets adjacent thereto are arranged at the upper ends of the second primary packing sheets on the non-inflow side and the lower ends of the second primary packing sheets on the non-outflow side.

By providing the cover members, the water sprayed from the upper side of the packing module and the air flowing from the lower side can be shielded by the cover members and will not flow into gaps on the non-inflow side between the first primary sheets and the first partition sheets and between the first primary packing sheets and the second partition sheets.

Also preferably, the packing module of the present invention is characterized in that: water guide slots are formed on the tops of the cover members on the upper side of the first and second primary packing sheets; the inflow ends of the water guide slots are close to the vertex angle of the upper triangle; and, the outflow ends of the water guide slots extend away from the vertex angle of the upper triangle in a direction parallel to the width direction of the first and second primary packing sheets and is separated from the edge of the packing module by a certain distance. The wall flow formed on the surface of the upper partition plate or the tower wall can flow into from the inflow ends of the water guide slots and out from the outflow ends of the water guide slots. The outflow ends of the water guide slots are separated from the edge of the packing module in the width direction by a certain distance, and the water guide slots can convey water to a middle region of the inflow port of the packing module, so that it is advantageous for the even distribution of water in the packing module.

Also preferably, the packing module of the present invention is characterized in that: a plurality of diversion portions are arranged on two sidewalls of the water guide slots, and the height of bottom edges of the plurality of diversion portions gradually decreases from the inflow ends to the outflow ends of the water guide slots. The water in the water guide slots can be preferentially dredged to the middle region of the inflow port. When the amount of water is large, diversion is preferentially performed at lower positions on the bottom edges of the diversion portions near the middle region of the inflow port, and the amount of diverted water is larger than that at other positions, so that it is further advantageous for the even distribution of water in the packing module.

Also preferably, the packing module of the present invention is characterized in that: flared portions are formed at lower openings of the flow guide slots obliquely arranged in the first and second import portions, and the flared portions are gradually widened from the top down. Since the flared portions are gradually widened in a direction from the first import portion to the functional portion, the width of the water film can be expanded, and the water film is evenly configured at the inlet of the functional portion.

Also preferably, the packing module of the present invention is characterized in that: in the first import portion, protrusion portions protruded outward in a normal direction of a plane where the first primary packing sheets are located are formed between two adjacent flow guide slots; in the second import portion, protrusion portions protruded outward in a normal direction of a plane where the second primary packing sheets are located are formed between two adjacent flow guide slots; and, the flared portions are connected to at least one protrusion portion adjacent thereto through smooth transition surfaces. The water film can gradually change its direction along the smooth transition surfaces under the action of tension. The smooth transition surfaces can turn the water film on the surfaces of the lower sidewalls of the flow guide slots to the direction parallel to the plane where the packing sheets are located.

Also preferably, the packing module of the present invention is characterized in that: the smooth transition surfaces are curved surfaces. By setting the smooth transition surfaces as curved surfaces, the water film can be better guided to turn smoothly.

Also preferably, the packing module of the present invention is characterized in that: the lower ends of the protrusion portions gradually decrease in protrusion height and gradually decrease in width from the top down. In this way, the flow guide slots and the flared portions are also formed on the rear surfaces of the protrusion portions. In addition, a part of the water film can flow on the surfaces of the lower ends of the protrusion portions under the action of gravity and tension, so that the width of the turned water film is further increased.

Also preferably, the packing module of the present invention is characterized in that: the flared portions are connected to the protrusion portions on the lower side thereof through first transition surfaces, and the first transition surfaces are convex smooth transition surfaces; and, the flared portions are connected to the protrusion portions on the upper side thereof through second transition surfaces, and the second transition surfaces are concave smooth transition surfaces.

Firstly, the first transition surfaces are located on the lower side of the flow guide slots at positions deviated from the extension direction of the flow guide slots, and guide the water film to turn mainly by using the tension of the water film and the gravity of the water film. At the first transition surfaces, the convex smooth transition surfaces are more advantageous for guiding flow. The second transition surfaces are roughly located in the extension direction of the flow guide slots, and guide the water film to turn mainly by using the inertial force of the water film flowing down, where the tension and gravity of the water film play an auxiliary role. At the second transition surfaces, the concave smooth transition surfaces are more advantageous for the water film to smoothly flow down and turn its direction under the action of the inertial force.

Secondly, at positions on the front surfaces of the packing sheets where the protrusion portions are formed, the flow guide slots are formed on the rear surfaces of the packing sheets; and, at positions on the front surfaces of the packing sheets where the flow guide slots are formed, the protrusion portions are formed on the rear surfaces of the packing sheets. Similarly, at positions on the front surfaces of the packing sheets where the convex transition surfaces are formed, the concave transition surfaces are formed on the rear surfaces of the packing sheets. In other words, the first transition surfaces and the second transition surfaces in this technical solution will be formed on both sides of the packing sheets. Furthermore, at positions on the packing sheets where the convex first transition surfaces are formed, the concave second transition surfaces are formed on the rear surfaces of the packing sheets; and, at positions on the front surfaces of the packing sheets where the concave second transition surfaces are formed, the convex first transition surfaces are formed on the rear surfaces of the packing sheets.

Also preferably, the packing module of the present invention is characterized in that: diffusion portions for uniformly distributing water to the middle part of the approximately full width of the first primary packing sheets are formed on the first primary packing sheets between the first import portion and the middle part of the approximately full width of the first primary packing sheets; and, diffusion portions for uniformly distributing water to the middle part of the approximately full width of the second primary packing sheets are formed on the second primary packing sheets between the first import portion and the middle part of the approximately full width of the second primary packing sheets. The diffusion portions are used to evenly diffuse the water, that flows into the upper end of the functional portion (the heat exchange portion) from the upper import portion in the approximately full width range of the packing sheets, into the approximately full width region of the packing sheets, thereby ensuring that the water falling into the functional portion can spread over the whole surface of the functional portion.

Also preferably, the packing module of the present invention is characterized in that: the diffusion portions are formed as diffusion protrusions in multiple inverted herringbone shapes. Further, the intersection points of the herringbone shapes of the diffusion portions are approximately aligned with opening centers of the corresponding flow guide slots facing the middle parts of the approximately full widths of the first and second primary packing sheets. In accordance with the above structure, the water flowing out from the flow guide slots will first reach the diffusion protrusions in the inverted herringbone shapes when flowing through the diffusion portions. Since the diffusion protrusions are formed in inverted herringbone shapes, water will be temporarily accumulated on the inner side of the intersection of the herringbone shape. When the subsequent water is also accumulated, due to the impulse force, the water will jump from the inner side of the intersection of the herringbone shape or even reach the second or first partition sheets opposite to the first primary packing sheets.

Also preferably, the packing module of the present invention is characterized in that: the partition sheets include: first partition sheets, which are located on one side of the first primary packing sheets and matched with the first primary packing sheets to form a first module group; and, second partition sheets, which are located on one side of the second primary packing sheets and matched with the second primary packing sheets to form a second module group; the first module group and the second module group are stacked to form the packing module; a convex bent portion is formed on one side of the first module group in the stack direction, and a concave bent portion is formed on the other side thereof; a convex bent portion is formed on one side of the second module group in the stack direction, and a concave bent portion is formed on the other side thereof; the convex bent portion of the first module group can be connected to the concave bent portion of the second module group; and the concave bent portion of the first module group can be connected to the convex bent portion of the second module group. It is convenient to realize accurate positioning and connection on two sides of the first module group and the second module group in the width direction, and the concave bent portion is glued to further facilitate the sealed connection between the first module group and the second module group.

In addition, the present invention further provides a packing sheet having: functional portion formed on the approximately full width of the packing sheet for heat exchange; an upper flow guide portion formed on the upper side of the functional portion, the upper flow guide portion comprising flow guide slots formed by bending a substrate and protrusion portions, the flow guide slots and the protrusion portions being arranged at intervals, the flow guide slots of the upper flow guide portion extending obliquely; and, flared portions formed at openings at the lower ends of the flow guide slots of the upper flow guide portion, the flared portions being gradually widened in a direction from the upper flow guide portion to the functional portion, the flared portions being connected to at least one protrusion portion adjacent thereto through smooth transition surfaces.

Flared portions are formed at the lower ends of the flow guide slots in the upper flow guide portion, and smooth transition surfaces are formed on at least one side of the flared portions in the width direction of the packing sheet. The water film can gradually change its direction along the smooth transition surfaces under the action of tension. The smooth transition surfaces can turn the water film on the surfaces of the lower sidewalls of the flow guide slots to the direction parallel to the plane where the packing sheet is located. Since the flared portions are gradually widened in a direction from the upper flow guide portion to the functional portion, the width of the water film can be expanded, and the water film is evenly configured at the inlet of the functional portion.

Also preferably, the packing sheet of the present invention is characterized in that: the flared portions are connected to the protrusion portions on the lower side thereof through first transition surfaces, and the first transition surfaces are outwardly convex smooth transition surfaces; and, the flared portions are connected to the protrusion portions on the upper side thereof through first transition surfaces, and the first transition surfaces are outwardly concave smooth transition surfaces. The first transition surfaces are located on the lower side of the flow guide slots at positions deviated from the extension direction of the flow guide slots, and guide the water film to turn mainly by using the tension of the water film and the gravity of the water film. At the first transition surfaces, the convex smooth transition surfaces are more advantageous for guiding flow. The second transition surfaces are roughly located in the extension direction of the flow guide slots, and guide the water film to turn mainly by using the inertial force of the water film flowing down, where the tension and gravity of the water film play an auxiliary role. At the second transition surfaces, the concave smooth transition surfaces are more advantageous for the water film to smoothly flow down and turn its direction under the action of the inertial force.

In addition, the present invention further provides a cooling tower having the packing modules described above, the plurality of packing modules being arranged in a horizontal direction to form a heat exchange portion of the cooling tower, partition plates being arranged between first import portions and second import portions of the packing modules to partition a plurality of spray spaces, nozzles being arranged in the spray spaces, respectively. By using the above packing modules for guiding water to different flow paths from two sides in the width direction, one packing module can have multiple operating modes, which can be flexibly selected as needed.

In addition, the cooling tower of the present invention is characterized in that: the nozzles are controlled separately to open or close, so that the opened or closed states of the nozzles corresponding to the first and second import portions of the packing modules are different. By controlling the water supply mode of the spray portion for the import portions on two sides of each packing module, the fog dispersal purpose can be effectively achieved.

The present invention further provides a cooling tower, wherein a heat exchange module of the cooling tower is spaced apart from a sidewall of a main body by a specified distance to form a cleaning space, and a cleaning nozzle is arranged in an upper portion of the cleaning space. The cooling tower can effectively wash and preheat the air sucked from the lower portion of the cooling tower, so that the pollution caused by long-term drying of the packing modules in the cooling tower operating in multiple modes can be avoided.

Figure 39:
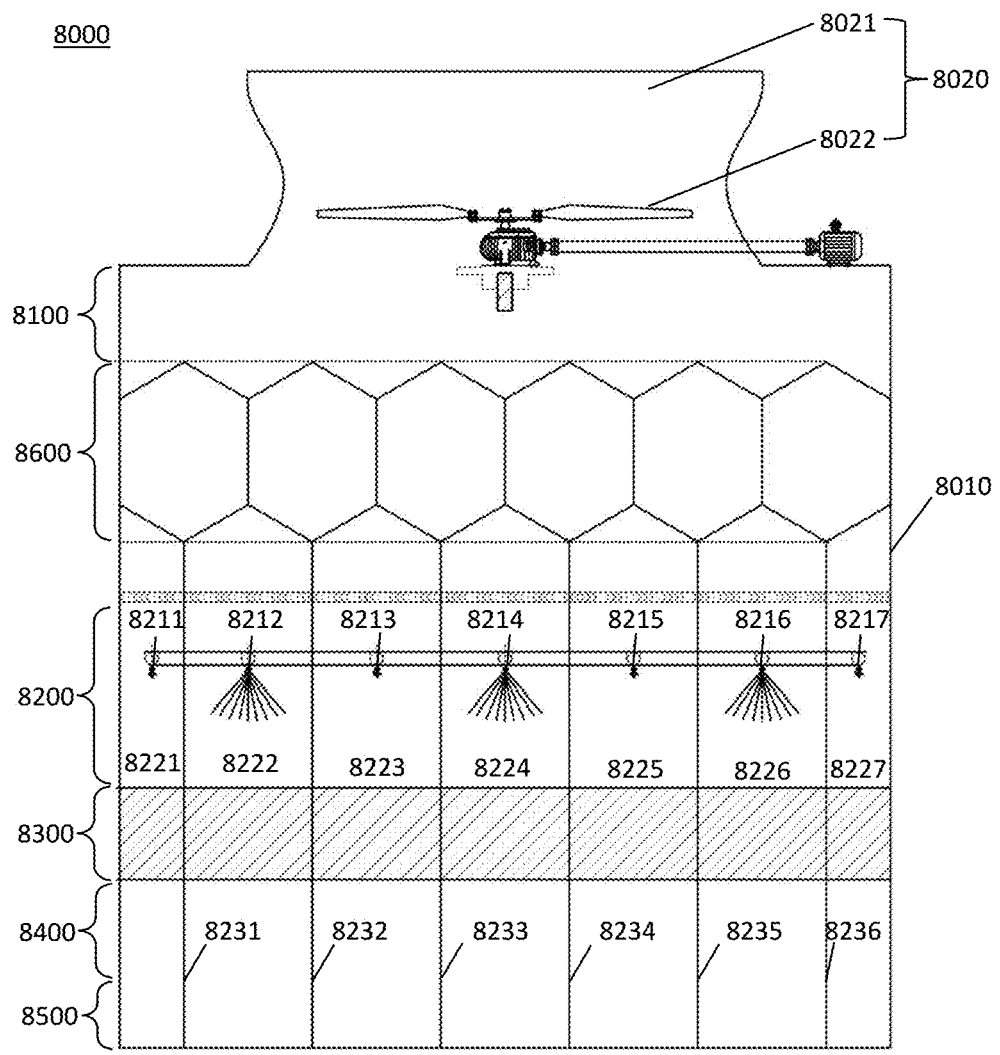
Figure 40:
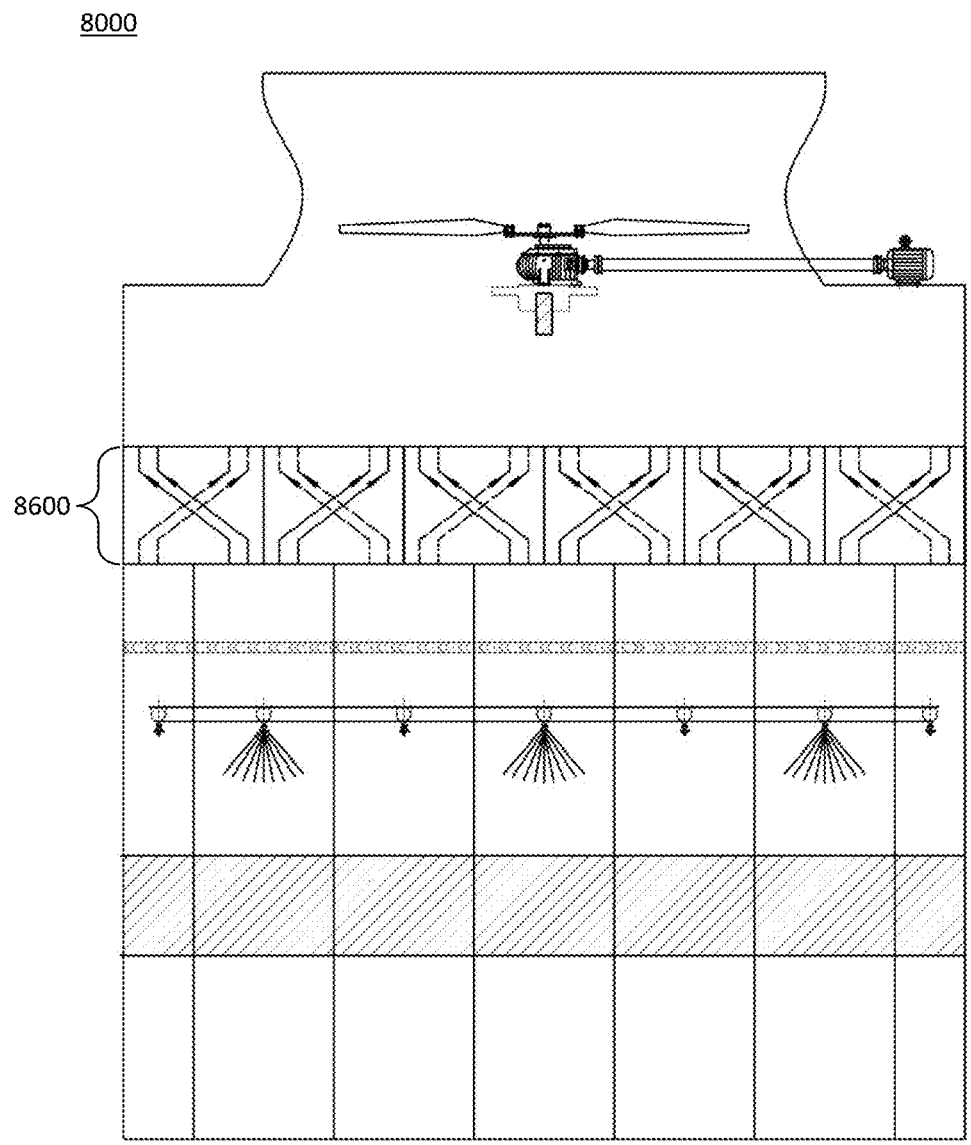

In addition, the cooling tower of the present invention has the packing modules described above. The plurality of packing modules being arranged in a horizontal direction to form a heat exchange portion of the cooling tower, and partition plates are arranged between first import portions and second import portions of the packing modules to partition a plurality of spray spaces. Nozzles are arranged in the spray spaces, respectively. The nozzles can be controlled separately to open or close, so that the opened or closed states of the nozzles corresponding to the first and second import portions of the packing modules are different. Thus, fog can be dispersed effectively, and the service life of the packing modules can be prolonged.

The present invention further provides a cooling tower, including: a condensation portion located on an upper side of a spray portion, the condensation portion comprising the packing modules described in any one of the above technical solutions, the plurality of packing modules being arranged in a horizontal direction; partition plates which are located on a lower side of the condensation portion and arranged between first export portions and second export portions of the packing modules, a plurality of spray spaces being partitioned by the plurality of partition plates; nozzles which are arranged on the spray spaces, respectively, the nozzles being separately controlled to open or close so that the opened or closed states of the nozzles corresponding to the first and second export portions of the packing modules are different; and, a heat exchange portion located on a lower side of the spray portion.

Therefore, in the spray space, the dry cold air flowing from the air import portion flows through the heat exchange portion without hot water sprayed thereon and then flows upward to the condensation portion, and flows through the first flow path of the packing module in the condensation portion to the air mixing portion. In addition, in the spray space, the dry cold air flowing from the air import portion flows through the heat exchange portion with hot water sprayed thereon to come into contact and exchange heat with the hot water to form wet hot air. The wet hot air also flows upward through the second flow path of the packing module in the condensation portion to reach the air mixing portion so as to mix the dry cold air. In the packing module in the condensation portion, when the wet hot air in the second flow path comes into contact with the cold surface of the first flow path, condensed water droplets are formed on the surface of the second flow path. These water droplets are resulted from cooling the wet cold air so that the water content in the wet hot air decreases. The condensed water droplets fall back to the water collecting portion, so that the purpose of saving water and dispersing fog is achieved.

BRIEF DESCRIPTION OF THE DRAWINGS

FIG. 1 is a sectional elevation view of a cooling tower according to an implementation of the present invention;

FIG. 2 is a partially enlarged view of FIG. 1;

FIG. 3 is a stereoscopic view of a part of the packing module used in this implementation;

FIG. 4 is an exploded view of the packing module shown in FIG. 3;

FIG. 5 is a structure diagram of a first primary packing sheet in FIG. 3;

FIG. 6 is a structure diagram of a second primary packing sheet in FIG. 3;

FIG. 7 is a structure diagram of a first partition sheet arranged between the first and second primary packing sheets;

FIG. 8 is a structure diagram of a partition sheet arranged between the second and first primary packing sheets;

FIG. 9 is a stereoscopic view of a part of a stacked body of a packing module according to a second implementation;

FIG. 10 is a stereoscopic view of a first primary packing sheet in FIG. 9;

FIG. 11 is a partially enlarged view of the first primary packing sheet in FIG. 9;

FIG. 12 is a view in a direction indicated by arrow M in FIG. 9;

FIG. 13 is a view in a direction indicated by arrow N in FIG. 9;

FIG. 14 is a schematic view of a packing module mounting structure according to the present invention;

FIG. 15 is a partially enlarged view of part E in FIG. 14;

FIG. 16 is a schematic top view of an upper bracket;

FIG. 17 is a partially enlarged view of part F in FIG. 14, i.e., a connecting structure of a lower bracket and a lower partition plate in an embodiment of the packing module mounting structure according to the present invention;

FIG. 18 is a schematic bottom view of the lower bracket;

FIG. 19 shows a connecting structure of the lower bracket and the lower partition in another embodiment of the packing module mounting structure according to the present invention;

FIG. 20 is a partially schematic view of a cooling tower according to a third implementation of the present invention;

FIG. 21 is a schematic view of a packing module according to a fourth implementation of the present invention;

FIG. 22 is a schematic view of a packing module according to a fifth implementation of the present invention;

FIG. 23 is a schematic structure diagram of a second primary packing sheet in the packing module according to the fifth implementation of the present invention;

FIG. 24 a schematic structure diagram of an upper portion of the second primary packing sheet shown in FIG. 23;

FIG. 25 is an enlarged view of part H in FIG. 24;

FIG. 26 a schematic structure diagram of a lower portion of the second primary packing sheet shown in FIG. 23;

FIG. 27 is a schematic diagram of the mounting positions of cover members according to the fifth implementation of the present invention;

FIG. 28 is a sectional view of the cover member according to an embodiment of the present invention;

FIG. 29 is a sectional view of the cover member according to another embodiment of the present invention;

FIG. 30 is a sectional view of the mounting positions of cover members according to still another embodiment of the present invention;

FIG. 31 is a schematic structure diagram of the cover member shown in FIG. 30;

FIG. 32 is a schematic structure diagram of the sealed connection of the upper ends/lower ends of the first and second partition sheets according to the fifth implementation of the present invention;

FIG. 33 is a schematic view of a stacked structure of the first and second packing sheets and the first and second partition sheets according to the fifth implementation of the present invention;

FIG. 34 is a schematic view of the setting orientation of flow guide slots in the first and second primary packing sheets according to an embodiment of the fifth implementation of the present invention;

FIG. 35 is a schematic view of non-parallel flow guide slots in the first and second primary packing sheets according to an embodiment of the fifth implementation of the present invention;

FIG. 36 is a schematic structure diagram of a cooling tower according to a sixth implementation of the present invention;

FIG. 37 is a partially schematic view of a cooling tower according to a seventh implementation of the present invention;

FIG. 38 is a sectional view of FIG. 37 along E-E;

FIG. 39 is a schematic structure diagram of a cooling tower according to an eighth implementation of the present invention; and FIG. 40 is a schematic structure diagram of a cooling tower having packing modules in a condensation portion with a rectangular structure;

in which:

1000: cooling tower; 1010: main body; 1100: air mixing portion; 1200: spray portion;
1300: heat exchange portion; 1400: air import portion; 1500: water collecting portion; 1020: exhaust portion;
1021: air duct; 1022: draught fan; 1211-1214: nozzle; 1430: air inlet;
1221-1224: spray space; 1231-1235: partition plate; 1301-1305: packing module;
1300: packing module; 1310: upper flow guide portion; 1320: functional portion; 1330: lower flow guide portion;
A, A': first primary packing sheet; B, B': second primary packing sheet; C, C': first partition sheet;
D, D': second partition sheet;
A1310: upper flow guide portion; A1320: functional portion; A1330: lower flow guide portion;
B1310: upper flow guide portion; B1320: functional portion; B1330: lower flow guide portion;
A1311, A1331, B1311, B1331: flow guide slot;
AP, BP, CP, DP: folding edge;
1300A: first flow path; 1300B: second flow path;
2210: upper partition plate; 2220: lower partition plate;
2300: packing module; 2310: upper flow guide portion; 2320: functional portion; 2330: lower flow guide portion;
A2310: upper flow guide portion; A2320: functional portion; A2330: lower flow guide portion;
B2310: upper flow guide portion; B2320: functional portion; B2330: lower flow guide portion;
A2311, A2331, B2311, B2331: flow guide slot;
A2321: diffusion portion; A2323: diffusion protrusion;
P2311, P2312: folding edge; P2313, p2314, p2315, p2316: water-retaining rib;
P2311, P2312: folding edge; P2313, p2314: water-retaining rib;
2600: mounting structure; 2610: upper bracket; 2610A: first upper bracket portion; 2611A: first resisting portion; 2612A: first extension portion; 2610B: second upper bracket portion; 2611B: second resisting portion; 2612B: second extension portion; 2610C: upper water passage portion; 2620: lower bracket; 2620A: lower water passage portion; 2621: support connecting portion; 2623: support beam;
3301-3305: packing module; 3810: water-retaining sheet; 3830: water-retaining sheet;
4300: packing module; 4300A: first primary packing sheet; 4300B: second primary packing sheet;
4300C: first partition sheet; 4300D: second partition sheet;
4310(A): upper flow guide portion; 4320(A): functional portion; 4330(A): lower flow guide portion;
A4311, A4331: flow guide slot; A4312, A4332: longitudinal slow guide slot;
A4310P, A4330P: folding edge;
5300: packing module; 5010: tower wall; 5210: upper partition plate; 5220: lower partition plate; 5300A: first primary packing sheet; 5300B: second primary packing sheet; 5300C: first partition sheet; 5300D: second partition sheet; 5301C: first upper extension portion; 5302C: first lower extension portion; 5301D: second upper extension portion; 5302D: second lower extension portion;
5310(A), 5310(B): upper flow guide portion; 5320(A), 5320(B): functional portion; 5330(A), 5330(B): lower flow guide portion; 5340(B): upper dredge portion; 5341(B): first dredge region; 5342(B): second dredge region; 5350(B): lower dredge portion;
A5311, A5331, B5311, B5331: flow guide slot; A5312, A5332, B5312, B5332: longitudinal flow guide slot; A5310P, A5330P, B5310P, B5330P: folding edge; B5313: turnover structure; B5314: first transition surface; B5315: second transition surface; B5316: bent evasion portion;
W, W1, W2, W3: water film; BU1, BU2: protrusion portion; BU3: protrusion end portion;
5510: cover member; 5511: cover sheet; 5512: first buckling portion; 5513: second buckling portion; 5514: buckling slot; 5515: water guide slot; 5516: diversion portion;
5520: support member;
6000: cooling tower; 6010: main body; 6200: spray portion; 6300: heat exchange portion;
6400: air import portion; 6800: cleaning space; 6810: nozzle;
7000: cooling tower; 7200: spray portion; 7210: water supply pipe; 7221-7226: branch pipe; 7231-7236: branch valve; 7240: anti-freezing pipe; 7241: nozzle; 7242: horn-mouth portion; 7251-7256; 7800: cleaning space;
8000: cooling tower; 8010: main body; 8020: exhaust portion; 8021: air duct; 8022: draught fan; 8100: air mixing portion; 8200: spray portion; 8300: heat exchange portion; 8044: air import portion; 8500: water collecting portion; 8600: condensation portion; 8211-8227: spray space; 8231-8236: partition plate.

DETAILED DESCRIPTION

The specific implementations of the present invention will be described in detail below with reference to the accompanying drawings.

[First Implementation]

Figure 2:
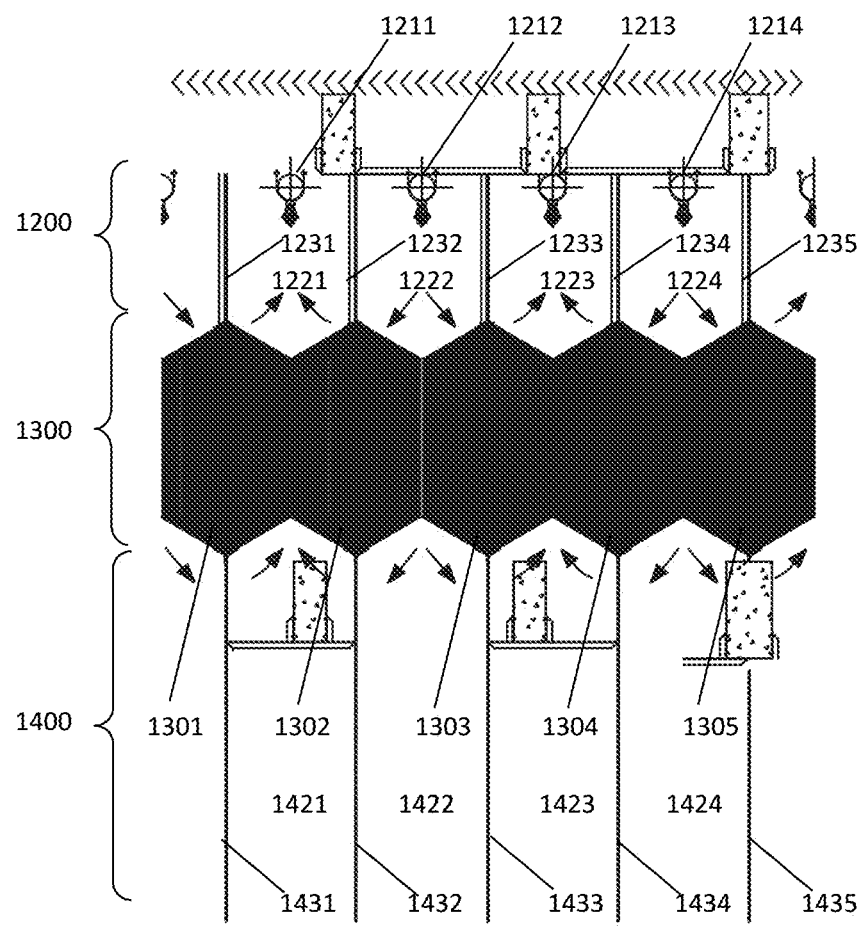

FIG. 1 is a structure diagram of a cooling tower according to a first implementation of the present invention, and FIG. 2 is an enlarged view of the internal structure of the cooling tower. As shown in FIGS. 1 and 2, the cooling tower 1000 is a cooling tower device for cooling hot water during the industrial production. In a main body 1010 of the cooling tower 1000, an air mixing portion 1100, a spray portion 1200, a heat exchange portion 1300, an air import portion 1400 and a water collecting portion 1500 are arranged from the top down. An exhaust portion 1020 is arranged in an upper portion of the main body 1010, and the exhaust portion 1020 includes an air duct 1021 and a draught fan 1022 arranged in the air duct 1021.

According to the cooling tower 1000, a plurality of nozzles 1211-1214 in the upper portion of the spray portion 1200 spray hot water downward, and the hot water falls in the internal space of the spray portion 1200 to enter the heat exchange portion 1300. In the heat exchange portion 1300, the hot water exchanges heat with cold air flowing from the lower portion of the heat exchange portion 1300, then flows out from the lower portion of the heat exchange portion 1300, falls into the water collecting portion 1500 through the air import portion 1400, and is collected on the bottom of the main body 1010 of the cooling tower 1000.

On the other hand, contrary to the movement direction of the water in the main body 1010, the cold air flows upward from the lower portion of the main body 1010, then absorbs the heat from the hot water in a flowing direction opposite to that of the hot water, and is discharged from the exhaust portion 1020 in the upper portion of the main body 1010 of the cooling tower 1000.

Specifically, in the main body 1010, by setting the rotation of the draught fan 1022 in the exhaust portion 1020, the cold air is sucked into the main body 1010 from an air inlet 1430 of the air import portion 1400 arranged in the lower portion of the main body 1010. In the air import portion 1400, the cold air comes into contact with the water falling from the heat exchange portion 1300, and flows upward through the heat exchange portion 1300 after some impurities in the air are removed. In the heat exchange portion 1300, the water and the air flow in opposite directions and fully contact with each other, so that the heat of the water is transferred to the air. The air discharged from the upper portion of the heat exchange portion 1300 has absorbed a large amount of heat, is gathered in the upper space in the main body 1010 after flowing through the spray portion 1200, and is discharged to the outside of the cooling tower 1000 through the air duct 1021. Thus, the function of cooling hot water is realized.

In this implementation, in the heat exchange portion 1300, the hot water flows from the upper portion of the heat exchange portion and flows out from the lower portion thereof; on the other hand, the air is sucked from the lower portion thereof and discharged from the upper portion thereof. Thus, the hot water fully contacts with the cold air in the heat exchange portion 1300, so that the hot water is cooled.

In order to enable hot water to fully contact with air in the heat exchange portion 1300, stacked sheet-shaped packing is usually used, and a plurality of flow paths are formed in the packing, so that the hot water and the air enter the plurality of the flow paths from the upper and lower sides of the packing, respectively, to fully contact with each other in the flow paths to realize heat exchange.

At the end of heat exchange, the air sucked from the lower portion of the cooling tower 1000 becomes saturated hot air and is discharged to the atmosphere. Thus, particularly in winter, after the saturated hot air encounters cold air, the moisture in the saturated hot air is quickly precipitated and condensed into fine water droplets, so that the cooling tower is fogged in winter.

In order to solve this problem, although engineering technicians in the art have improved the cooling tower in various aspects, the effect is unsatisfactory, or the cost is high.

In this implementation, revolutionary improvements have been boldly made to the spray portion 1200 and the heat exchange portion 1300 of the cooling tower 1000. Thus, the cooling tower 1000 in this implementation can satisfactorily solve the problem in the prior art.

As shown in FIGS. 1 and 2, in the spray portion 1200 of the cooling tower 1000 in this implementation, independent spray spaces 1221-1224 . . . are arranged for the nozzles 1211-1214 . . . , respectively. In addition, adjacent nozzles 1211-1214 . . . are controlled in opposite switching ways. That is, as shown in FIGS. 1 and 2, if the nozzles 1211, 1213 . . . are closed, the nozzles 1212, 1214 . . . are opened.

Further, the spray spaces for the nozzles 1211-1214 . . . are separated from each other by partition plates 1231-1235 . . . , so that the spray space for the nozzle 1211 is formed by partition plates 1231 and 1232, the spray space for the nozzle 1212 is formed by partition plates 1232 and 1233 . . . . Thus, for the spray spaces, the spray spaces 1222, 1224 . . . in the operating state and the spray spaces 1221, 1223 . . . in the non-operating state are formed at intervals.

Further, in the heat exchange portion 1300, packing modules 1301-1305 . . . are arranged in parallel, the centers of the packing modules 1301-1305 . . . are misaligned with the nozzles, and the center lines of the packing modules 1301-1305 . . . correspond to the partition plates 1231-1235 . . . .

Thus, in the upper portions of the packing modules 1301-1305 . . . , half parts are located in the spray spaces in the operating state, and the other half parts are located in the spray spaces in the non-operating state. By taking the packing module 1302 as an example, the left half part of its upper portion is located in the spray space 1221 in the non-operating state, while the right half part thereof is located in the spray space 1222 in the operating state. However, since the operating states of the nozzles 1211-1214 . . . are set alternately in this implementation, the left half part of the upper portion of the adjacent packing module 1303 is located on the spray space 1222 in the operating state, while the right half part thereof is located in the spray space 1223 in the non-operating state.

Corresponding to the spray spaces 1221-1224, when air is imported into the air import portion 1400, the spray spaces are also used as drainage spaces 1421-1424 for draining water from the packing modules 1301-1305 to the water collecting portion 1500, and partition plates 1431-1435 . . . for separating the drainage spaces from each other are arranged between the drainage spaces 1421-1424. The partition plates 1431-1435 separate the air sucked from the air import portion 1400, and also separate two paths of water discharged from the packing modules 1301-1305.

The packing modules in this embodiment will be described below by taking the packing module 1300 (any one of the packing modules 1301-1305 . . . ) as an example. As described above, the structure of the packing module 1302 corresponds to the structure where the left and right sides of its upper portion are located in two different spray spaces 1221 and 1222. Two flow paths respectively communicated with the spray space 1221 in the non-operating state and the spray space 1222 in the operating state are formed in the packing module 1302.

Figure 3:
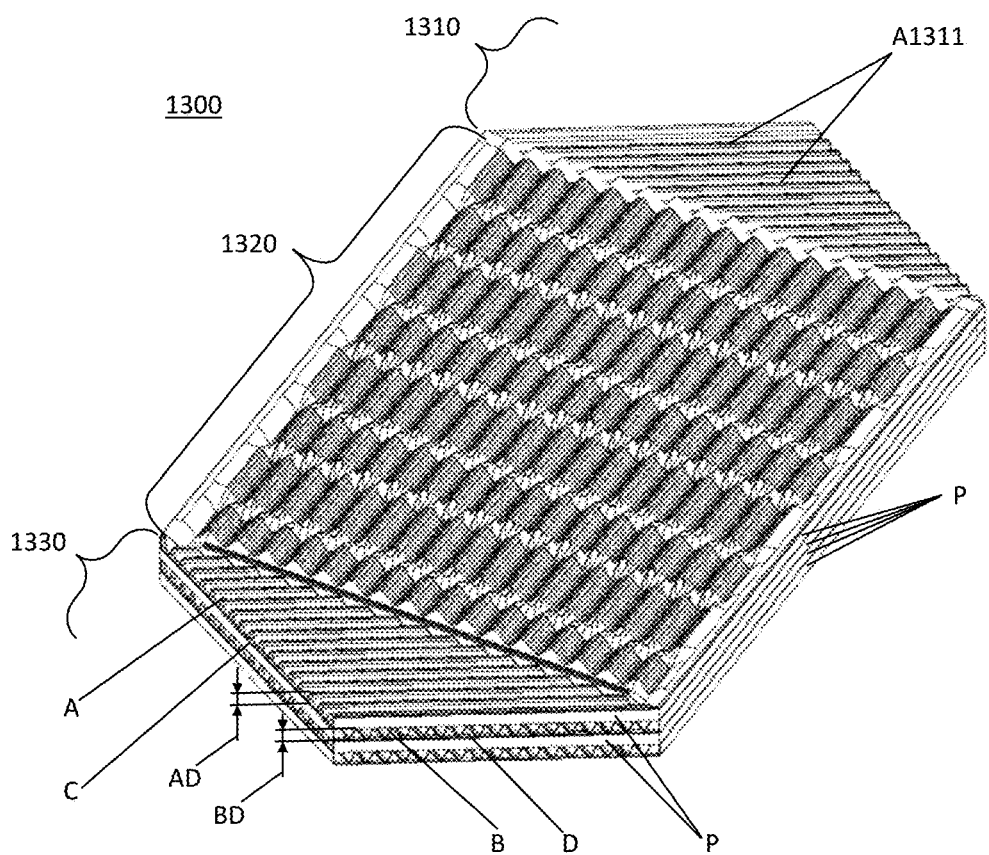
Figure 4:
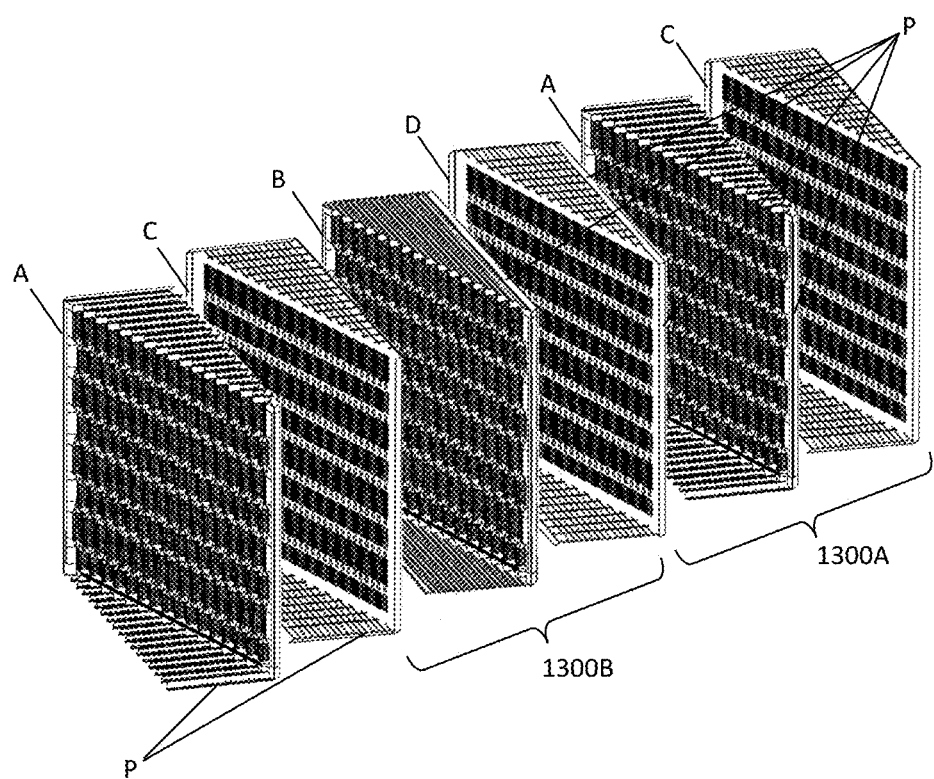
Figure 5:
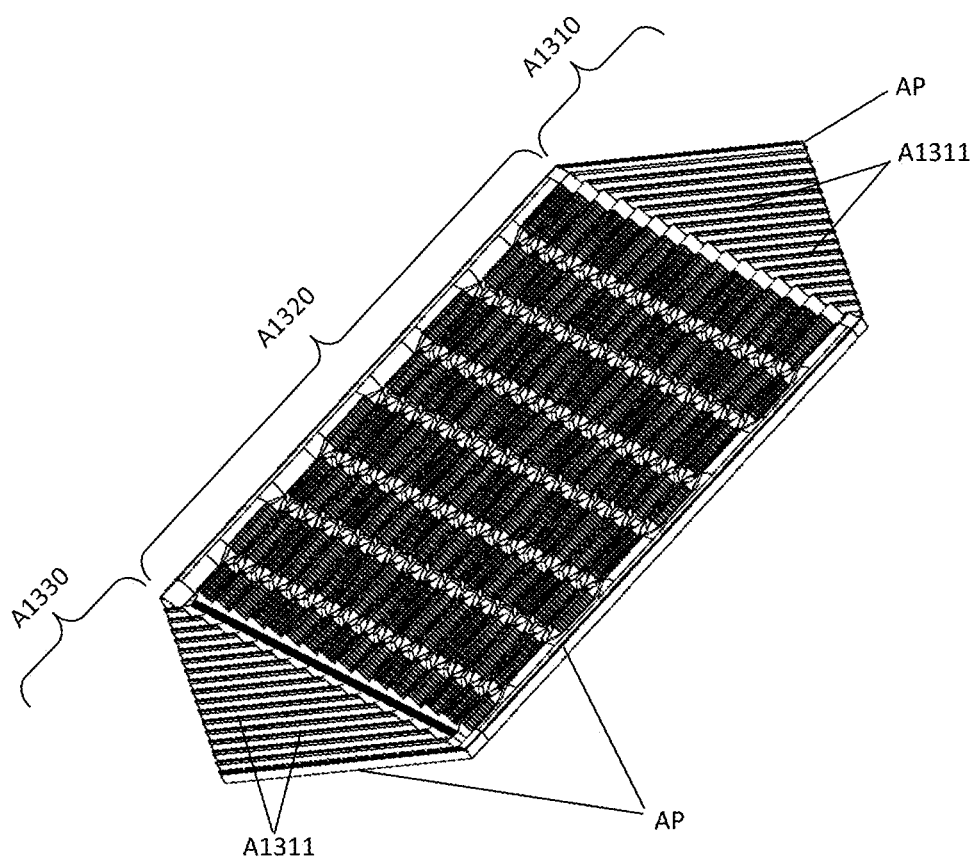
Figure 6:
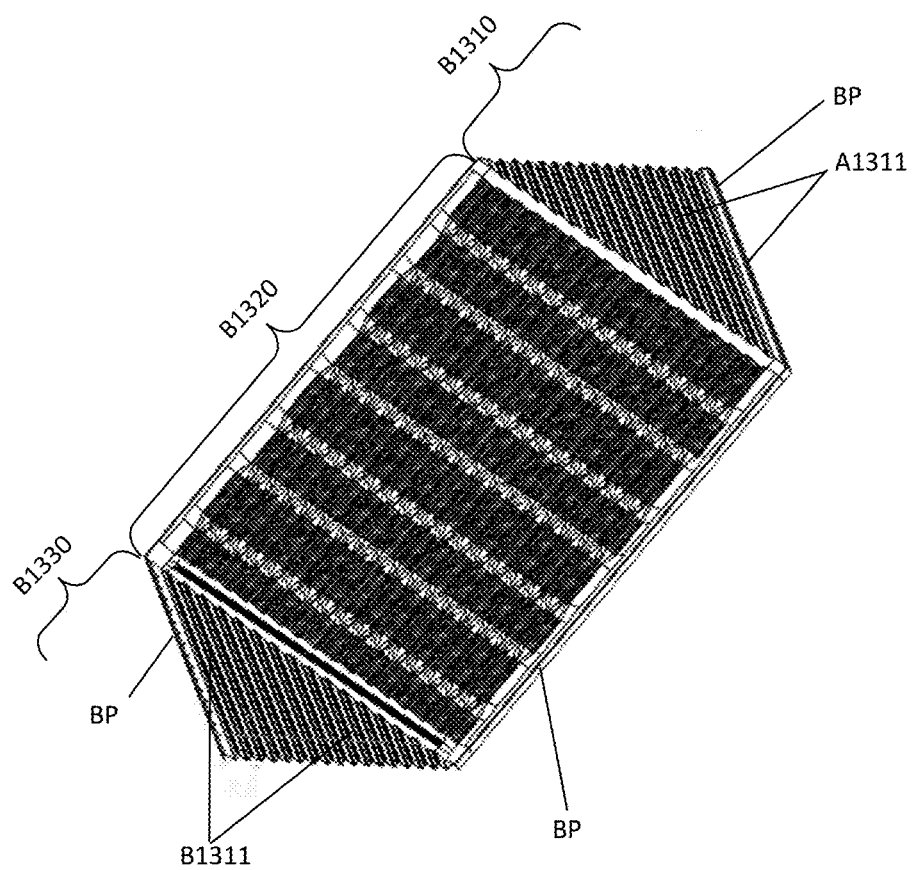
Figure 7:
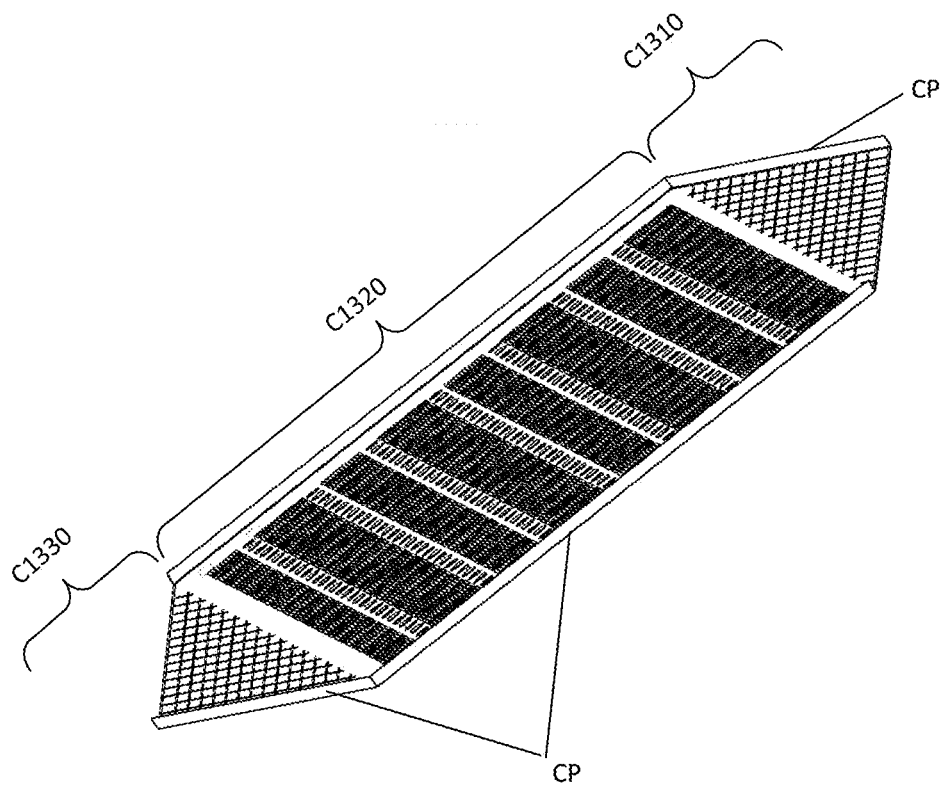

FIG. 3 is a stereoscopic view of a part of the packing module used in this implementation; FIG. 4 is an exploded view of the packing module shown in FIG. 3; FIG. 5 is a structure diagram of a second primary packing sheet; FIG. 6 is a structure diagram of a first partition sheet arranged between the first and second primary packing sheets; and FIG. 7 is a structure diagram of a partition sheet arranged between the second and first primary packing sheets.

Firstly, as shown in FIG. 3, the packing module 1300 is formed by stacking a plurality of packing sheets. FIG. 3 shows some of the packing sheets forming the packing module 1300. The thickness of the packing module 1300 can be changed by changing the number of packing sheets stacked in the stack direction.

The packing module 1300 includes an upper flow guide portion 1310, a functional portion 1320 and a lower flow guide portion 1330. The upper flow guide portion 1310 is communicated with the spray portion 1200, as described above; and, the lower flow guide portion 1330 is communicated with the air import portion 1400. The upper flow guide portion 1310 communicate two adjacent spray spaces with the functional portion 1320, so that the regions communicated with the spray spaces in different operating states on two sides are separated from each other. The adjacent spaces are exported from two sides of the lower flow guide portion 1330 in the case of keeping the state where they are separated from each other.

As described above, the upper flow guide portion 1310 imports hot water in the spray space from one side (for example, the right side in FIG. 3, which is approximately half of the width in this implementation) in the width direction into the packing module 1300, so that the imported hot water is evenly distributed in the width range of the packing module 1300 and discharged from the lower flow guide portion 1330.

Similar to the upper flow guide portion 1310, in the lower flow guide portion 1330, in the process of exporting the hot water after heat exchange, the hot water is guided to and discharged from the other side in the width direction. For example, as shown in FIG. 3, the lower flow guide portion 1330 guides water flowing from the functional portion 1320 to the other side of the packing module 1300 in the width direction for discharging.

As shown in FIG. 4, the packing module 1300 includes first and second primary packing modules A, B which are arranged alternately and form two flow paths having different import/export directions; and, first and second partition sheets C, D which arranged alternately between the first and second primary packing modules A, B and separate the two flow paths having different import/export directions from each other, where the first and second primary packing sheets and the first and second partition sheets form one group, and multiple groups are stacked to form the packing module 1300.

The packing sheet closest to the outer side of the principal plane in the packing module 1300 shown in FIGS. 3 and 4 are the first primary packing sheet A. FIG. 5 is a stereoscopic view of the first primary packing sheet A. The upper flow guide portion A1310 is configured to guide flow in from the right side of the first primary packing sheet A in the width direction, and the lower flow guide portion A1330 is configured to guide flow out from the left side.

As shown in FIG. 6, contrary to the configuration mode for the first primary packing sheet A, the upper flow guide portion B1310 of the second primary packing sheet B is configured to guide flow in from the left side of the second primary packing sheet B, and the lower flow guide portion B1330 is configured to guide flow out from the right side.

In addition, in this embodiment, the first and second primary packing sheets A, B are configured to have flow paths having import/export directions opposite to each other, and the inflow and outflow ports for guiding the flow paths are located on left and right sides of the center line of the packing sheet in the width direction, respectively. Thus, the left and right sides of the packing module 1300 in the width direction of the packing sheet can be communicated with two adjacent spray spaces (e.g., spray spaces 1221, 1222), and the flow paths are separated from each other.

As needed, the inflow port and outflow port for guiding the flow paths can also be arranged in such a way: the inflow port and outflow port of the first primary packing sheet A are located on the left side of the center line of the packing sheet in the width direction, and the inflow port and outflow port of the second primary packing sheet B are located on the right side of the center line of the packing sheet in the width direction. Alternatively, the inflow port and outflow port of the first primary packing sheet A are located on the right side of the center line of the packing sheet in the width direction. Correspondingly, the inflow port and outflow port of the second primary packing sheet B are located on the left side of the center line of the packing sheet in the width direction.

The structure of the first primary packing sheet A will be described in detail below. The packing sheet on the outermost side of the principal plane in FIG. 3 is the first primary packing sheet A, and FIG. 5 is a stereoscopic view of the first primary packing sheet A. Convex-concave flow guide slots arranged approximately in parallel are formed in the upper flow guide portion of the first primary packing sheet A by bending a substrate for multiple times. When viewed from the rear surface of the first primary packing sheet A, convex-concave flow guide slots arranged approximately in parallel are formed by bending the substrate for multiple times in a direction opposite to the front surface. The concave slots on two sides of the first primary packing sheet A formed by multiple times of bending are flow guide slots A1311 of the first primary packing sheet A. Since the flow guide slots A1311 extend obliquely from the right upper side to the left side in the figure, the leftmost flow guide slot A1311 of the first primary packing sheet A is the longest, the rightmost flow guide slot A1311 is the shortest, and the inlet at the upper end of each flow guide slot A1311 is located on an oblique line. Since second and first partition sheets D, C are arranged on front and rear sides of the first primary packing sheet A in the stack direction, the water that is guided to fall on the right side of the center line of the primary packing sheet A can enter the upper end of each flow guide slot A1311 and flow obliquely downward to the left side along each flow guide slot A1311 to reach the functional portion A1320 of the first primary packing sheet A.

The functional portion A1320 of the first primary packing sheet A functions to evenly disperse the water guided from the upper flow guide portion A1310 to form a water film adhered onto the first primary packing sheet A and the second and first partition sheets D, C sandwiching the first primary packing sheet A, so that the cold air entering from the lower portion fully contacts with the water to realize the heat exchange function.

The water flowing out from the lower end of the functional portion A1320 enters the lower flow guide portion A1330 of the first primary packing sheet A. In the lower flow guide portion A1330, similar to the upper flow guide portion A1310, a convex-concave shape is formed by bending the substrate for multiple times. When viewed from the rear surface of the first primary packing sheet A, a convex-concave shape is formed by bending the substrate for multiple times in a direction opposite to the front surface. The concave slots on two sides of the first primary packing sheet A formed by multiple times of bending are flow guide slots A1331 of the first primary packing sheet A. Since the flow guide slots A1331 extend obliquely to the left lower side in the figure, the rightmost flow guide slot A1331 of the first primary packing sheet A is the longest, the leftmost flow guide slot A1311 is the shortest, and the inlet at the lower end of each flow guide slot A is located on an oblique line. Since second and first partition sheets D, C are arranged on front and rear sides of the first primary packing sheet A in the stack direction, after the water flowing from the functional portion A1320 of the first primary packing sheet A reaches the lower flow guide portion A1330, the water can flow to the left side of the center line of the first primary packing sheet A along each flow guide slot A1331 and then flow out from the first primary packing sheet A.

Corresponding to the structure of the first primary packing sheet A, as show in FIG. 6, the direction of inclination of the flow guide slots B1311 and B1331 formed on the upper flow guide portion B1310 and the lower flow guide portion B1330 of the second primary packing sheet B is opposite to the direction of inclination of the flow guide slots A1311 and A1331 on the first primary packing sheet A.

That is, in the upper flow guide portion B1310 of the second primary packing sheet B, the water falling from the left side of the center line of the second primary packing sheet B can be guided to enter the upper end portion of each flow guide slot B1311 and flow obliquely downward to the right side along each flow guide slot B1311 so as to reach the functional portion B1320 of the second primary packing sheet B and enter the functional portion B1320.

Further, in the functional portion B1320 of the second primary packing sheet B, the water guided from the upper flow guide portion B1310 is evenly dispersed to form a water film adhered onto the second primary packing sheet B and the first and second partition sheets C, D sandwiching the second primary packing sheet B, so that the cold air entering from the lower portion fully contacts with the water to realize the heat exchange function.

Further, in the lower flow guide portion B1330 of the second primary packing sheet B, after the water flowing from the functional portion B1320 of the second primary packing sheet B reaches the lower flow guide portion B1330, the water can flow to the right side of the center line of the second primary packing sheet B along each flow guide slot B13331 and then flow out from the second primary packing sheet B.

The first and second partition sheets C, D arranged between the first and second primary packing sheets A, B prevent the communication of the flow paths in the upper and lower flow guide slots A1311, B1311, A1331, B1331 of the first and second primary packing sheets A, B, so that the flow paths in the upper flow guide portions A1310, B1310 and the lower flow guide portions A1330, B1330 are independent of each other.

Thus, as shown in FIG. 4, in the packing module 1330, the partition sheets D, C sandwiches the first primary packing sheet A, so that first flow paths 1300A are formed on two sides of the first primary sheet A in the stack direction; and, the first and second partition sheets C, D sandwiches the second primary packing sheet B, so that second flow paths 1300B are formed on two sides of the second primary packing sheet B in the stack direction. For the packing module 1320, as shown in FIG. 2, the water falling from the spray space 1222 will enter the first flow paths 1300A and be discharged from the drainage space 1421, while the water falling from the spray space 1221 will enter the second flow paths 1300B and be discharged from the drainage space 1422.

In a case of allowing the spray spaces 1221-1224 to have different operating states, for example, allowing the spray spaces 1221 and 1223 in the non-operating state and the spray spaces 1222 and 1224 in the operating state, the hot water sprayed in only the spray spaces 1222 ad 1224 fall into the packing modules 1301-1305 and then discharged from the packing modules 1301-1305 to the drainage spaces 1421 and 1423. There is no water discharged in the drainage spaces 1421 and 1423.

On the other hand, for the air entering from the lower portion of the main body 1010 and being discharged from the upper portion, the cold air sucked into the packing module 1300 from the drainage spaces 1421 and 1423 fully contact with the water in the packing module 1300 to form wet hot air, and the wet hot air reaches the spray spaces 1422 and 1424. When the cold air sucked into the packing module 1300 from the drainage spaces 1422 and 1424 is in the packing module 1300, since no hot water flows through the flow path in the packing module 1300, the cold air does not fully exchange heat with the water and therefore absorbs the heat from the sprayed water in the adjacent flow path through the partition sheets, so that the temperature rises, and dry hot air is formed.

The wet hot air in the spray spaces 1222 and 1224 mix with the dry hot air in the spray spaces 1221 and 1223 in the air mixing portion 1100. The dry hot air can raise the temperature of the wet hot air and reduce the relative humidity, so it is ensured that the wet air will not be fogged after being discharged from the air duct.

In this implementation, for the fogging phenomenon of the cooling tower 1000 when operating in winter, the particular packing module 1300 and the spray control method corresponding to the packing module 1300 are adopted, so that the fogging phenomenon of the cooling tower in winter is significantly prevented.

As described above, in the process of stacking the packing sheets A, B, C and D, in order to realize the stacked state of the packing sheets A, B, C and D in this implementation, folding edges P are on edges, where no inflow/outflow port is formed, of the first and second primary packing sheets A, B and the first and second partition sheets C, D in this implementation, and the folding edges P of the packing sheets A, B, C and D are buckled with each other and stacked to form edge portions of the packing module 1300.

In addition, these folding edges P support the edge portions of the packing sheets A, B, C and D, thereby preventing the edge portions from damage due to insufficient support. Moreover, these folding edges P can be used as sealing edges of the packing sheets A, B, C and D, thereby preventing from the water from flowing in/out from the non-inflow/outflow side of the upper and lower flow guide portions 1310 and 1330 to enter the flow paths which the water should not enter. Thus, it is unnecessary to additionally provide sealing edge components between the packing sheets A, B, C and D, thereby preventing from increasing procedures during stacking and assembling and reducing the assembly precision due to excessive components.

The folding edge structure of the packing sheets A, B, C and D will be described in detail below with reference to the accompanying drawings.

As shown in FIGS. 5 and 7, in this implementation, the first primary packing sheet A and the first partition sheet C adjacent thereto form a module group, and the folding edges AP and CP are folded toward each other in opposite directions and can be buckled with each other in opposite directions. The width of the folding edges AP and CP corresponds to the flex amplitude AD of the first primary packing sheet A. The flex amplitude AD is the distance perpendicular to the principal plane between an outward peak and a reverse peak of the flex principal plane of the first primary packing sheet A.

For the first primary packing sheet A, the upper flow guide portion A1310 is configured to guide the water in the shown right spray space to the first flow path 1331A formed by the functional portion A1320, i.e., the flow path formed by the first primary packing sheet A and the second and first partition sheets D, C on two sides. Therefore, the folding edges AP and CP are formed on the left edge of the upper flow guide portion A1310 of the first primary packing sheet A in a triangle shape with a vertex angle pointing to the outside of the packing module and on the right edge of the lower flow guide portion A1330 of the first primary packing sheet A in a triangle shape with a vertex angle pointing to the outside of the packing module, respectively.

Figure 8:
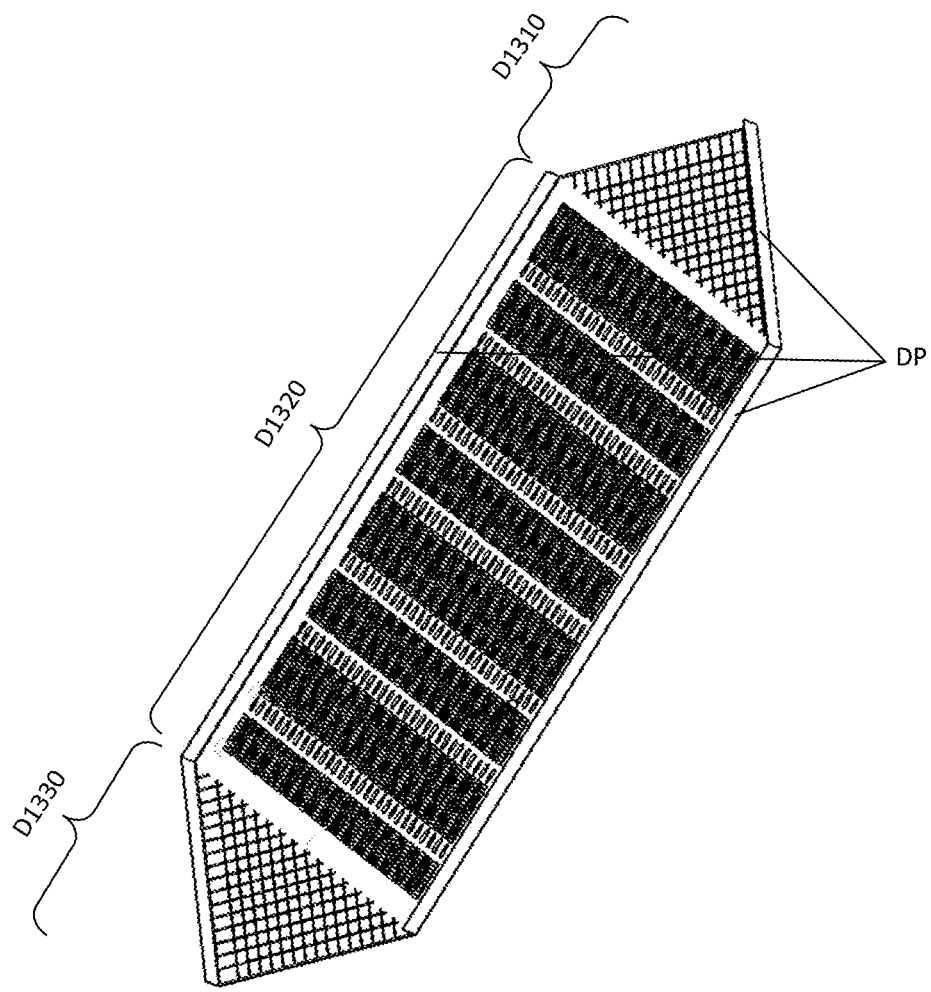

In addition, as shown in FIGS. 6 and 8, correspondingly, the second primary packing sheet B and the second partition sheet D adjacent thereto form a module group, and the folding edges BP and DP are folded toward each other in opposite directions and can be buckled with each other in opposite directions. The width of the folding edges BP and DP corresponds to the flex amplitude BD of the second primary packing sheet B. The flex amplitude BD is the distance perpendicular to the principal plane between an outward peak and a reverse peak of the flex principal plane of the second primary packing sheet B.

For the second primary packing sheet B, the upper flow guide portion B1310 is configured to guide the water in the shown left spray space to the second flow path formed by the functional portion B1320, i.e., the flow path formed by the second primary packing sheet B and the first and second partition sheets C, D on two sides. Therefore, the folding edges BP and DP are formed on the left edge of the upper flow guide portion B1310 of the second primary packing sheet B in a triangle shape with a vertex angle pointing to the outside of the packing module, on two side edges of the functional portion B1320 and on the right edge of the lower flow guide portion B1330 of the second primary packing sheet B in a triangle shape with a vertex angle pointing to the outside of the packing module, respectively.

Since the width of the folding edges AP, CP and the folding edges BP, DP is equal to the flex amplitude AD, BD of the first primary packing sheet A and the second primary packing sheet B, respectively, when the group formed by the first primary packing sheet A and the first partition sheet C and the group formed by the second primary packing sheet B and the second partition sheet D are further stacked, the group formed by the first primary packing sheet A and the first partition sheet C and the group formed by the second primary packing sheet B and the second partition sheet D can be stably stacked, avoiding the situation where obvious clearances are formed by the folding edges and the situation where the flex portions of the first and second primary sheets A, B are not supported and fail to well contact with the first and second partition sheets C, D so as to result in uneven stress since the folding edges P are supported too high.

In addition, the folding edges P arranged on the upper flow guide portions 1310 can effectively seal the edges of the flow paths, thereby preventing the water in adjacent spray spaces from entering the flow paths which the water should not enter. Moreover, the folding edges P arranged on the lower flow guide portions 1330 can effectively prevent the water in the flow paths from leaking into the drainage spaces which the water should not enter.

On the other hand, when the group formed by the first primary packing sheet A and the first partition sheet C and the group formed by the second primary packing sheet B and the second partition sheet D are further stacked, due to good flatness and straightness of the folding edges P, the edges of the groups can be easily sealed.

For example, for the second partition sheet D and the first primary packing sheet A, even if there are no folding edges buckled with each other on the edges of the both, the second partition sheet D and the first primary packing sheet A can be tightly pressed to seal the edges of the second partition sheet D and the first primary packing sheet A, and gluing can be easily carried out to ensure the sealing performance of the edge portions of the both. Thus, the second partition sheet D and the first partition sheet C are allowed to sandwich the first primary packing sheet A to form the first flow path 1300A on two sides of the first primary packing sheet A, respectively.

Similarly, for the first partition sheet C and the second primary packing sheet B, even if there are no folding edges buckled with each other on the edges of the both, the first partition sheet C and the second primary packing sheet B can be tightly pressed by using the flatness and straightness of the folding edges P to seal the edges of the first primary packing sheet A and the second primary packing sheet B, and gluing can be easily carried out to ensure the sealing performance of the edge portions of the both. Thus, the first partition sheet C and the second partition sheet D are allowed to sandwich the second primary packing sheet B to form the second flow path 1300B on two sides of the first primary packing sheet B, respectively.

As described above, in this implementation, two flow paths from different positions on the packing sheet in the width direction to the inside of the packing sheet are formed by using the first and second primary packing sheets A and B, and the two flow paths are imported from different positions of the packing sheet in the width direction, so that two adjacent spray spaces are respectively connected to the two flow paths in the packing sheet and respectively guided to adjacent drainage spaces 1431-1435.

Therefore, by taking the packing module 1302 as an example, two sides of the upper flow guide portion 1310 are communicated with the spray spaces 1221 and 1222, respectively, so that the water in the two spray spaces 1221 and 1222 are guided to the two flow paths formed by the second primary packing sheet B and the second primary packing sheet A and then discharged to the drainage spaces 1422 and 1421 from the lower flow guide portion 1330, respectively. That is, in the cooling tower 1000, a plurality of independent parallel flow paths are formed from the spray portion 1200 to the heat exchange portion 1300 and then to the air import portion 1400, and the flow paths are separated from each other. Thus, when some nozzles (e.g., nozzles 1211, 1213 and 1215) in the spray portion 1200 stop spraying water, the water sprayed from adjacent spray spaces 1222 and 1224 will not enter the flow paths communicated with the spray spaces 1221, 1223 and 1225.

Thus, at a very temperature in winter, in a case where some nozzles (e.g., nozzles 1211, 1213 and 1215) stop spraying water while the nozzles 1212 and 1214 continuously spray hot water, it can be ensured that the air sucked from the spray spaces 1221, 1223 and 1225 absorbs the heat of the sprayed water, thereby raising the temperature and significantly reducing the relative humidity of the mixed wet air, so that the fogging probability is decreased as far as possible when the mixed wet air is discharged to the atmosphere.

In this implementation, the shape of the packing sheets A, B, C and D in the packing module 1300 is not limited as long as the first and second primary packing sheets A, B can form the first and second flow paths, respectively, and have upper flow guide portions A1310 and B1310 which guide water sprayed on two sides of the packing sheets in the width direction to the first and second flow paths in the packing sheets, lower flow guide portions A1330 and B1330 which guide water in the first and second flow paths in the packing sheets to two sides of the packing sheets in the width direction for discharging, and first and second partition sheets C and D which separate the first and second flow paths from each other, thereby ensuring that the two flow paths in the packing module 1300 are separated from each other.

In this implementation, the upper and lower flow guide portions of the first and second primary packing sheets A, B are formed as an isosceles triangle. That is, by taking as the upper flow guide portion A1310 of the first primary packing sheet A as an example, the section of the upper flow guide portion is formed in a triangular wave shape that folds the substrate for multiple times. However, it is not limited thereto, and the upper low guide portion can be formed as various convex-concave grooves. In addition, in this implementation, the packing sheets (i.e., the first and second primary packing sheets A, B and the first and second partition sheets C, D) are correspondingly provided with functional portions 1320. It is also possible that the rectangular functional portions 1320 are not provided as needed, and the upper flow guide portions 1310 and the lower flow guide portions 1330 are directly communicated without passing through the functional portions 1320, so that the height of the packing module 1300 is greatly decreased.

[Second Implementation]

In this implementation, only the shape of the packing module 2300 is different from that in the first implementation, and only the differences from the first implementation will be described in detail here.

Figure 9:
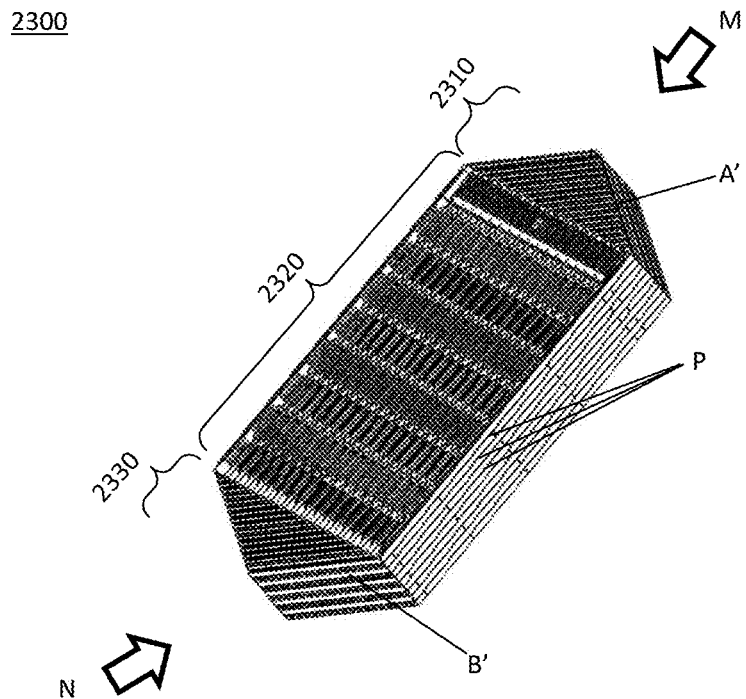
Figure 10:
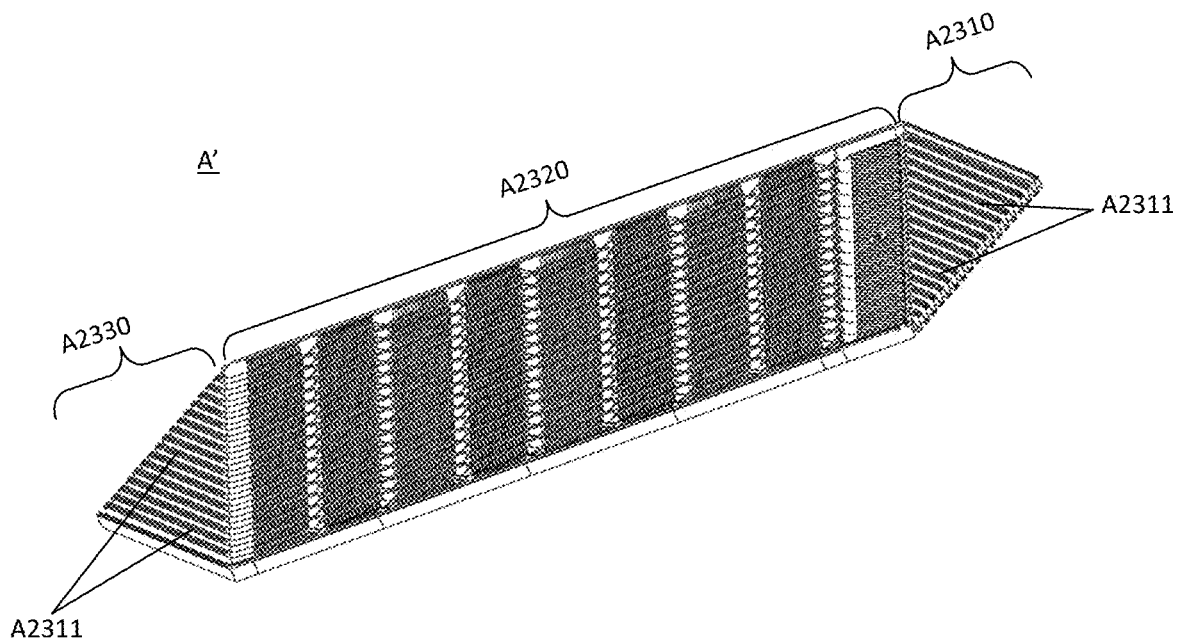
Figure 11:
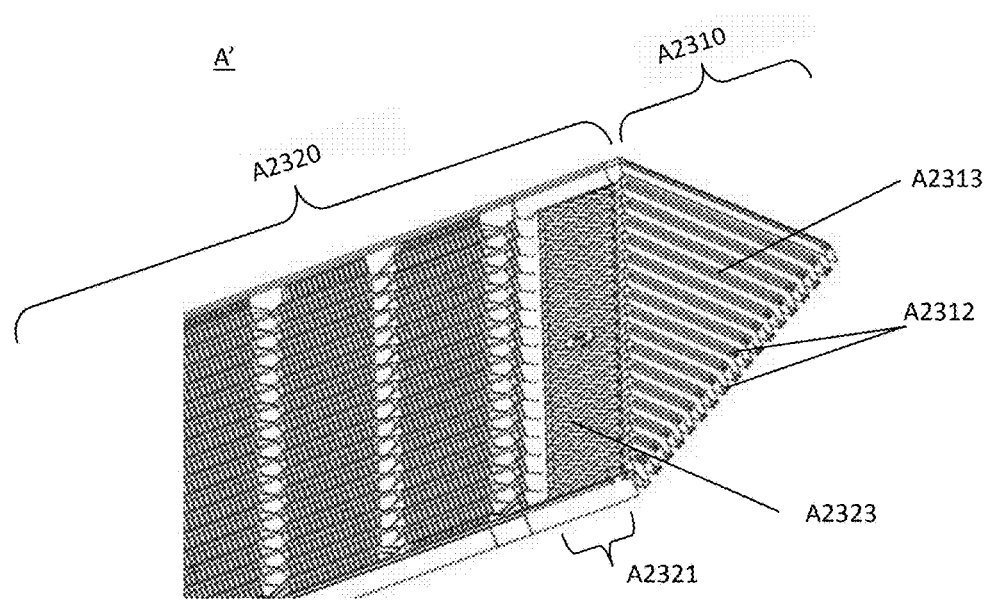

FIG. 9 is a stereoscopic view of a part of a stacked body of the packing module 2300 in this implementation. FIG. 10 is a stereoscopic view of a first primary packing sheet A'. FIG. 11 is a partially enlarged view of the first primary packing sheet in this implementation.

In the packing module 2300 in this implementation, similar to the packing module 1300 in the first implementation, first and second flow paths for flowing in a specified manner are limited and formed by first and second primary packing sheets A', B', and the first and second flow paths are separated by first and second partition sheets C', D'.

By taking the first primary packing sheet A' as an example, in this implementation, the upper flow guide portion A2310 of the first primary packing sheet A' is also formed in such a way that a substrate is bent for many times to form concave-convex and approximately parallel flow guide slot A2311. In this implementation, the section of the convex-concave shape formed by multiple times of bending is in a square wave shape. That is, the slot bottoms A2312 on front and rear sides of the flow guide sots A2311 are formed as flat strips, and the surfaces of the slot bottoms A2312 on the outer side of the flow path are used as fitting surfaces to be fitted with the second partition sheet D' and the first partition sheet C'.

Moreover, the surfaces of the slot bottoms A2312 on the outer side of the flow path are formed with grooves A2313 that are protruded toward the inner side of the flow path in the extension direction of the slot bottoms A2312. In the process of stacking the packing module 2300 and fitting the slot bottoms A2312 with the second or first partition sheet D', C', a sealant can be filled in the grooves A2312 in advance. When the stacked packing module 2300 is tightly pressed, the flow guide slots A2311 in the same flow path can be effectively isolated, and the water can be prevented from entering other flow guide slots A2311 through the gaps between the slot bottoms A2312 and the second partition sheet D' or the first partition sheet C' due to its gravity when the water is guided from the upper low guide portion A2310 to the functional portion A2320 and flows in the flow guide slots A2311.

Thus, the operation reliability of the flow guide slots A2311 can be effectively improved, and it is ensured that the water can be evenly distributed in the full width range of the packing sheet when the water is guided from one side (e.g., the right side in FIG. 10) of the packing sheet in the width direction to the functional portion approximately in the full width range of the packing sheet. Accordingly, the heat exchange efficiency of the packing module 2300 can be effectively improved.

The lower flow guide portions A2330 of the first primary packing sheet A' is also formed in such a way that the substrate is bent for many times to form concave-convex and approximately parallel flow guide slot A2331, and the section of the convex-concave shape formed by multiple times of bending is in a square wave shape. That is, the slot bottoms A2332 on front and rear sides of the flow guide sots A2331 are formed as flat strips, and the surfaces of the slot bottoms A2332 on the outer side of the flow path are used as fitting surfaces to be fitted with the second partition sheet D' and the first partition sheet D.

Moreover, the surfaces of the slot bottoms A2332 on the outer side of the flow path are formed with grooves A2333 that are protruded toward the inner side of the flow path in the extension direction of the slot bottoms A2332. In the process of stacking the packing module 2300 and fitting the slot bottoms A2332 with the second or first partition sheet D', C', a sealant can be filled in the grooves A2332 in advance, and the stacked packing module 2300 is tightly pressed. In this way, the flow guide slots A2331 in the same flow path can be effectively isolated, and the water flowing from the functional portion A2320 to the flow guide slots A2331 of the lower flow guide portion A2330 can be prevented from entering other flow guide slots A2331 through the gaps between the slot bottoms A2332 and the second partition sheet D' or the first partition sheet C' due to its gravity.

In accordance with the first primary packing sheet A' formed as above, the operation reliability of the flow guide slots A2331 can be effectively improved, and it is ensured that the discharged water is evenly distributed for the flow guide slots A2331 when the water is guided from the functional portion A2320 approximately in the full width range of the packing sheet to one side (e.g., the left side in FIG. 10) of the packing sheet in the width direction for discharging.

If the water flowing through the flow guide slots A2311 and A2331 of the upper flow guide portion A2310 or the lower flow guide portion A2330 is not even in flow, some flow guide slows A2311 and 2311 will hinder the air resistance sucked from the lower side of the packing module 2300 due to excessive water, which will further aggravate the problem of uneven flow in the flow guide slots A2311 and A2331. Meanwhile, in the approximately full width range of the first primary packing sheet A', the water cannot evenly flow into the functional portion A2320, thus affecting the heat exchange efficiency.

In accordance with the packing module 2300 in this implementation, the problem of uneven flow in the flow guide slots A2311 and A2331 can be effectively restrained. Similar to the first implementation, the arrangement direction of the second primary packing sheet B' is opposite to that of the first primary packing sheet A', and will not be repeated here.

In addition, in this implementation, FIG. 11 shows a diagram of part of the upper flow guide portion A2310 and the function portion A2320 of the first primary packing sheet A'. As shown in FIG. 11, a diffusion portion A2321 is formed at a connection between the upper portion of the function portion A2320 of the first primary packing sheet A' and the upper flow guide portion A2310 of the first primary packing sheet A'. The diffusion portion A2321 is used to more evenly diffuse the water, that flows into the upper end of the functional portion AA2320 from the upper import portion A2310 in the approximately full width range of the packing sheet, into the approximately full width region of the packing sheet, thereby ensuring that the water falling into the functional portion A2320 can spread over the whole surface of the functional portion A2320.

In this implementation, the diffusion portion A2321 is formed as diffusion protrusions A2323 in multiple inverted herringbone shapes. In FIG. 11, the diffusion protrusions A2323 on the front surface (the outer surface of the principal plane) of the first primary packing sheet A' are shown. Since the packing sheets are sheets formed by stamping, diffusion protrusion A2323 in multiple inverted herringbone shapes are also formed on the rear surface (the inner surface of the principal plane) of the first primary packing sheet A'.

In this implementation, the diffusion protrusions A2323 are formed in multiple inverted herringbone shapes, and the intersection points of the herringbone shapes of the diffusion portions A2323 are approximately aligned with opening centers of the flow guide slots A2311 facing the functional portion. In accordance with the above structure, the water flowing out from the flow guide slots A2311 will first reach the diffusion protrusions A2323 in the inverted herringbone shapes when flowing through the diffusion portion A2321. Since the diffusion protrusions A2323 are formed in the inverted herringbone shape, water will be temporarily accumulated on the inner side of the intersection of the herringbone shape. When the subsequent water is also accumulated, due to the impulse force, the water will jump from the inner side of the intersection of the herringbone shape or even reach the second or first partition sheets D', C' opposite to the first primary packing sheet A'.

Thus, the diffusion protrusions A2323 effectively diffuse the water guided from the upper flow guide portion A2310 of the first primary packing sheet A', so that the water spread over the full width direction of the packing sheet.

Of course, the diffusion protrusions A2323 may be in various shapes. For example, the diffusion protrusions may be diffusion protrusions horizontally arranged in multiple convex-concave shapes or may be in irregular shapes, or the protrusions of the diffusion protrusions A2323 may be further raised. Block portions facing the water flowing from the flow guide slots A2311 sputter the water in a specified direction, so that the water can be evenly distributed in the approximately full width range of the packing sheet.

Figure 12:
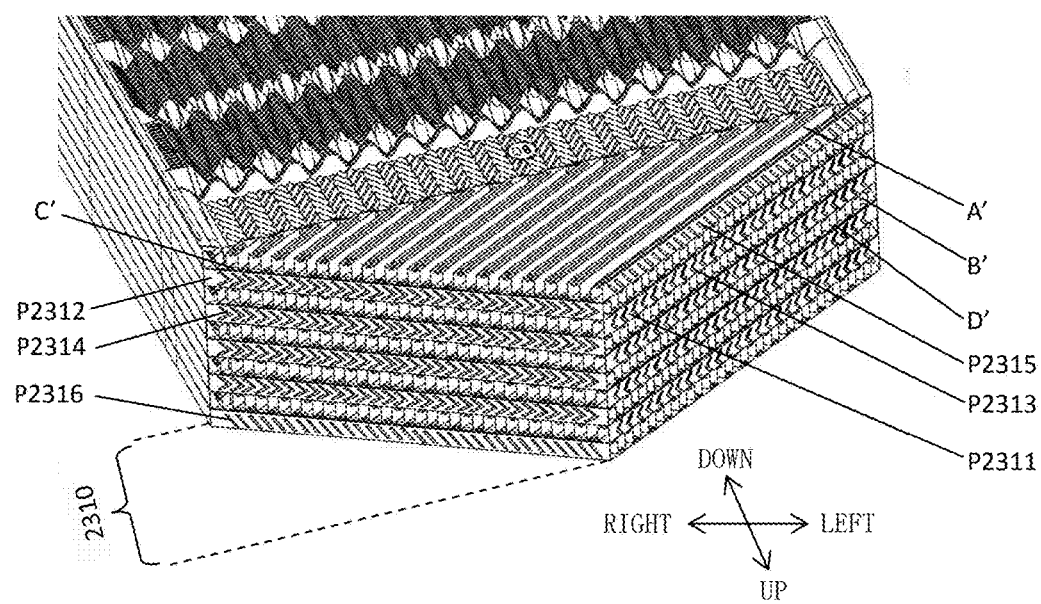

In this implementation, the fitting mode of the first primary packing sheet A' and the first partition sheet C' is the same as that in the first implementation. FIG. 12 is a view in a direction indicated by the arrow M in FIG. 9. As shown in FIG. 12, at the upper flow guide portion 2310 of the packing module 2300, folding edged P2311 bucked with each other are arranged on edges, where no inflow port is formed, of the first primary packing sheet A' and the first partition sheet C'. Water-retaining ribs P2313 are formed on the surfaces of the folding edges P2311 on the outer side.

During spraying from the spray space to the upper end of the packing module 2300, since the inflow ports and the folding edges P2311 are arranged at intervals, the sprayed water will slide to the outermost edge of the upper flow guide portion 2310 along the folding edges P2311 after falling on the folding edges P2311, resulting in the problem that the sprayed water cannot evenly flow into each inflow port.

By forming the water-retaining ribs P2312, the water can be effectively prevented from changing its sliding direction along the surfaces of the folding edges P2311 to laterally fall into adjacent inflow ports. Thus, the uneven water inflow caused by excessive sliding of the sprayed water along the folding edges P2311 is avoided.

In this implementation, the water-retaining ribs P2313 are formed as herringbone protrusions arranged along the folding edges P2311. By forming the water-retaining ribs P2313 as a herringbone shape with an upward tip, the water flowing downward allowing the folding edges P2311 can be blocked and pushed, on two sides, to the inflow ports of the flow paths formed by the second primary packing sheet B'.

For the second primary packing sheet B' and the second partition sheet D', similarly, at the upper flow guide portion 2310 of the packing module 2300, herringbone water-retaining ribs P2314 are formed on the surfaces of the folding edges P2312 on the outer side of two sealing edges buckled with each other on the first primary packing sheet A' and the first partition sheet C' on the left side.

In addition, for the outermost first primary packing sheet A' in the packing module 2300 in the stack direction, the water-retaining ribs P2315 formed on the folding edges P2311 are formed as protrusions descending from the outermost side to the inner side in the stack direction. Thus, the water sprayed onto the outermost folding edge P2311 can be blocked from sliding to the outermost side in the width direction of the packing module 2300 along the outermost folding edge P2311, and the water is transferred to the adjacent inflow port of the flow path formed by the second primary packing sheet B'.

For the outermost second primary packing sheet B' in the stack direction, the water-retaining ribs P2316 formed on the folding edges P2312 are also formed as protrusions descending from the outermost side to the inner side in the stack direction. Thus, the water sprayed onto the outermost folding edge P2312 can be blocked from sliding to the outermost side in the width direction of the packing module 2300 along the outermost folding edge P2312, and the water is transferred to the adjacent inflow port of the flow path formed by the first primary packing sheet A'.

As described above, by forming water-retaining ribs P2313, P2315, P2314 and P2316 on the folding edges P2311 and P2312 at the upper flow guide portions 2310 of the first and second primary packing sheets A', B' (or the first and second partition sheets C', D'), the sprayed water will not slide along the folding edges P2311 and 2312 after falling on the folding edges P2311 and P2312, and the water is transferred to the adjacent flow path formed by the first primary packing sheet A' or the second primary packing sheet B' by using the water-retaining ribs P2313, P2315, P2314 and P2316.

Figure 13:
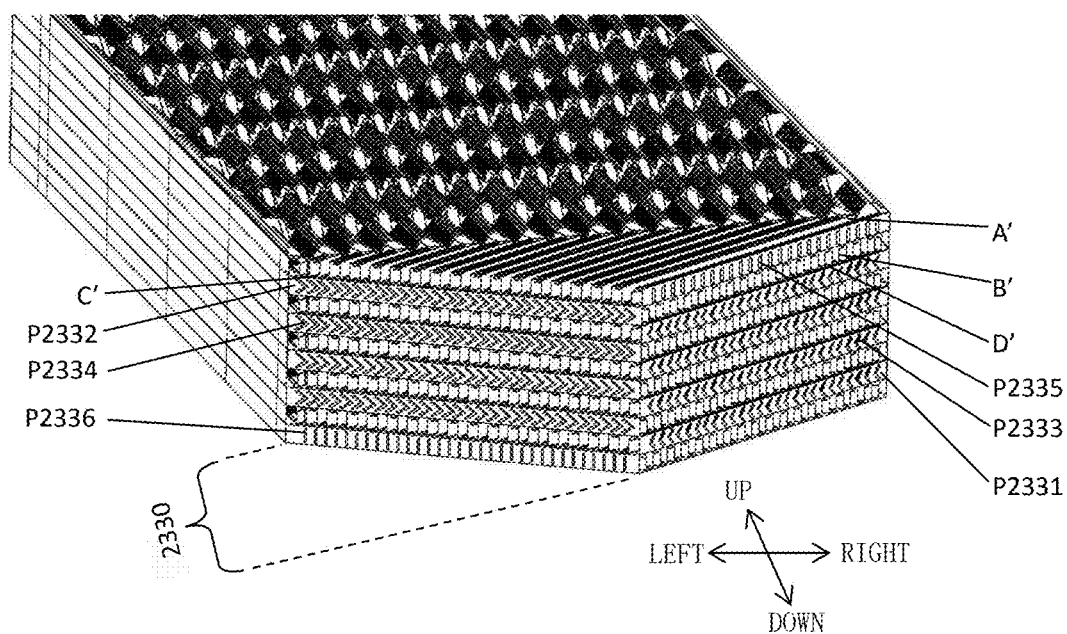

FIG. 13 is a diagram of the packing module 2300 when viewed in the oblique downward direction N in this implementation. As shown in FIG. 3, at the lower flow guide portion 2330 of the packing module 2300, folding edged P2331 bucked with each other are arranged on edges, where no outflow port is formed, of the first primary packing sheet A' and the first partition sheet C'. Water-retaining ribs P2333 are formed on the surfaces of the folding edges P2331 on the outer side.

When the water flowing through the flow path formed by the second primary packing sheet B' flows to the lower flow guide portion 2330 from the functional portion 2320 and flows out from the right side of the second primary packing sheet in the width direction, since the outflow ports and the folding edges P2331 are arranged at intervals in the stack direction, the effluent water will flow downward to the center of the packing sheet in the width direction along the slopes of the folding edges P2331, resulting in uneven water drainage.

In this implementation, by forming the water-retaining ribs P2333 on the folding edges P2331 and the water-retaining ribs P2335 closest to the outer side of the stack direction, the water can be effectively blocked from flowing along the surfaces of the folding edges P2331, and change its sliding direction to directly fall from the water-retaining ribs P2331. Thus, uneven water drainage caused by excessive sliding of the discharged water along the folding edges P2331 is avoided.

In this implementation, the water-retaining ribs P2333 and P2335 are formed as herringbone protrusions arranged along the folding edges P2331. By forming the water-retaining ribs P2333 as a herringbone shape, the water flowing along the folding edges P2331 can effectively move away the surfaces of the folding edges P2331 and directly fall.

For the second primary packing sheet B' and the second partition sheet D', similarly, at the lower flow guide portion 2330 of the packing module 2300, folding edges P2332 buckled with each other are arranged on the edges, where no outflow port is formed, of the second primary packing sheet B' and the second partition sheet D'. Water-retaining ribs P2334 are formed on the surfaces of the folding edges P2332 on the outer side.

When the water flowing through the flow path formed by the first primary packing sheet A' flows to the lower flow guide portion 2330 from the functional portion 2320 and flows out from the left side of the packing sheet in the width direction, since the outflow ports and the folding edges P2332 are arranged at intervals in the stack direction, the effluent water will flow downward to the center of the packing sheet in the width direction along the slopes of the folding edges P2332, resulting in uneven water drainage.

In this implementation, by forming the water-retaining ribs P2334 on the folding edges P2332 and the water-retaining ribs P2336 closest to the outer side of the stack direction, the water can be effectively blocked from flowing along the surfaces of the folding edges P2332, and change its sliding direction to directly fall from the water-retaining ribs P2334. Thus, uneven water drainage caused by excessive sliding of the discharged water along the folding edges P2332 is avoided.

In this implementation, the water-retaining ribs P2334 and P2336 are formed as herringbone protrusions arranged along the folding edges P2332. By forming the water-retaining ribs P2334 as a herringbone shape, the water flowing along the folding edges P2332 can effectively move away the surfaces of the folding edges P2332 and directly fall. The water-retaining ribs P2335 and P2336 closest to the outer side of the stack direction can be formed as any shape, for example, being formed as an in-line shape parallel to the stack direction in this implementation.

Considering that there is tension on the water surface, water will adhere to the surfaces of the folding edges P2331 and P2332 and slide along the folding edges P2331 and P2332, instead of directly moving away the packing module 2300. By arranging the water-retaining ribs P2333 and P2334 on the lower flow guide portion 2330, the tension of the water can be destroyed, and the water can fall directly. Therefore, the water-retaining ribs are not limited to the herringbone shape, and may be in an inverted herringbone shape or in-line shape or may be protrusions in any shape.

In this implementation, by using the packing module 2300 described above, the water entering packing module 2300 can be effectively and evenly distributed to the functional portion 2320 of the packing module 2300, ensuring stable and efficient heat exchange.

Figure 14:
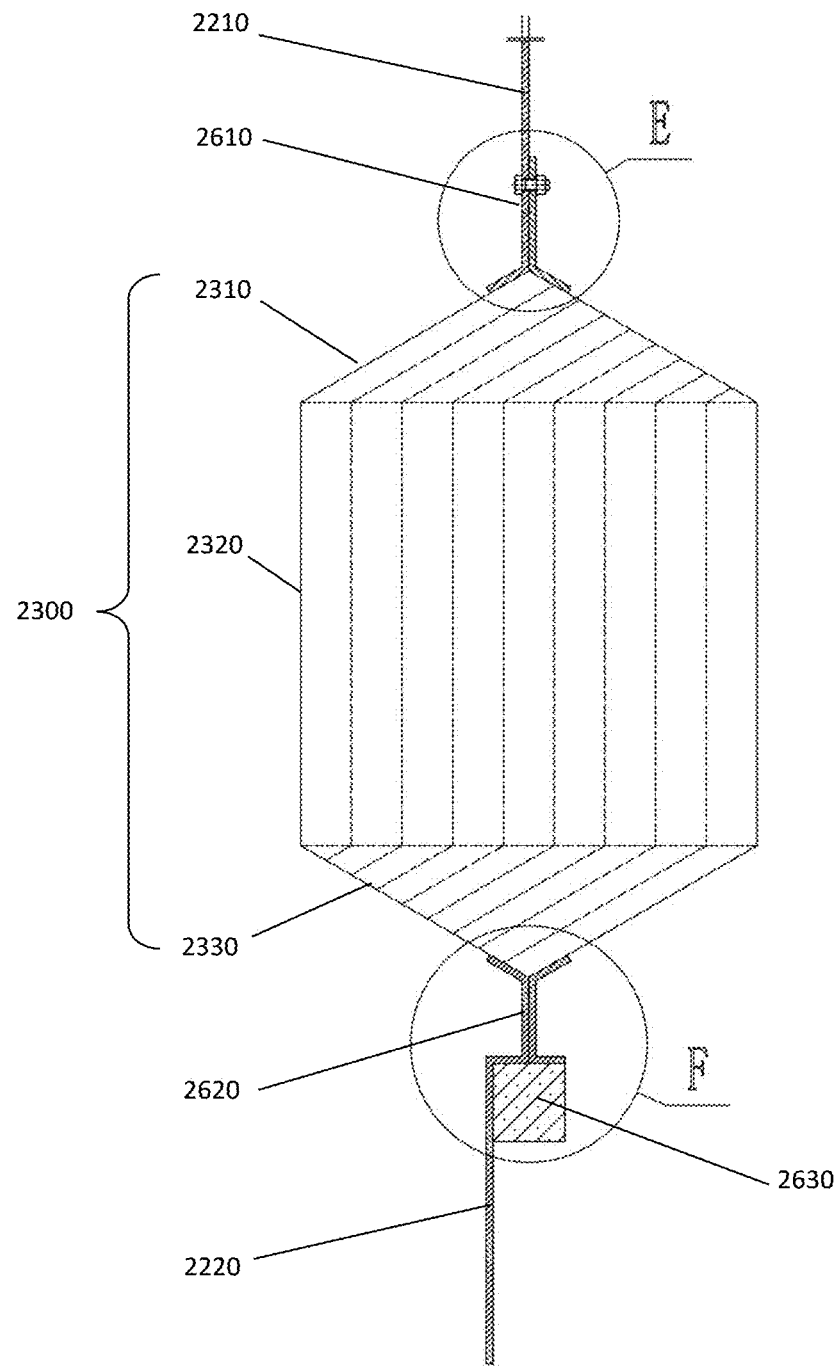
Figure 15:
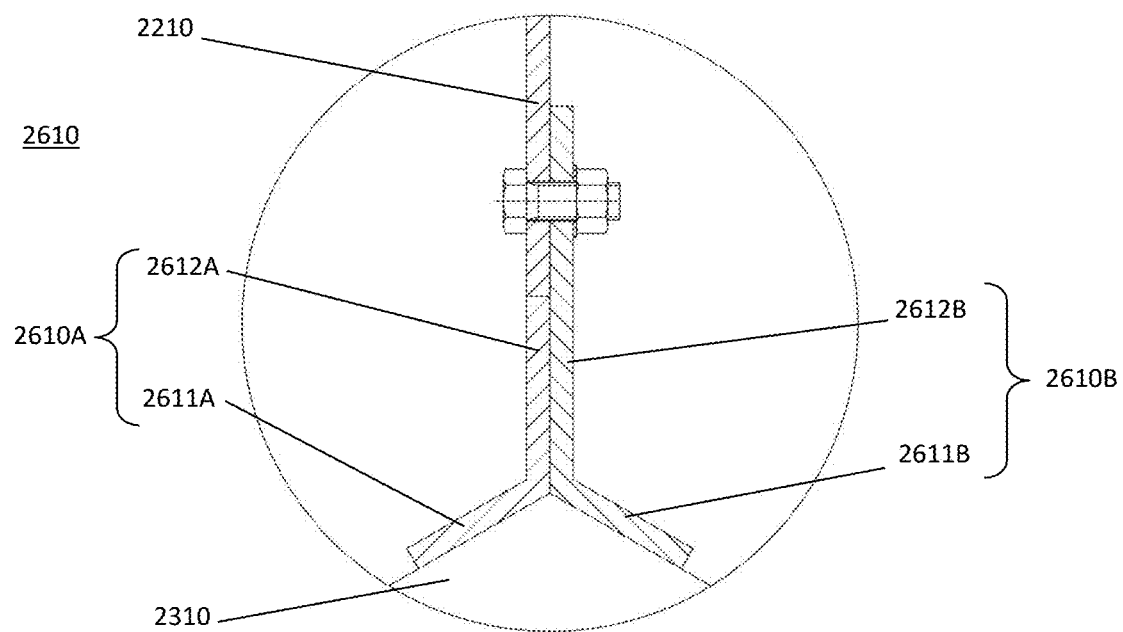
Figure 17:
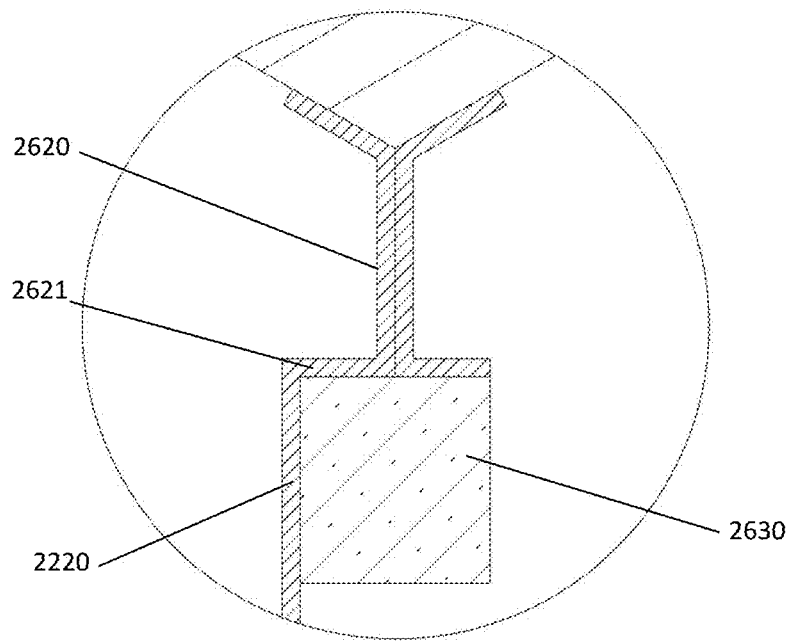
Figure 19:
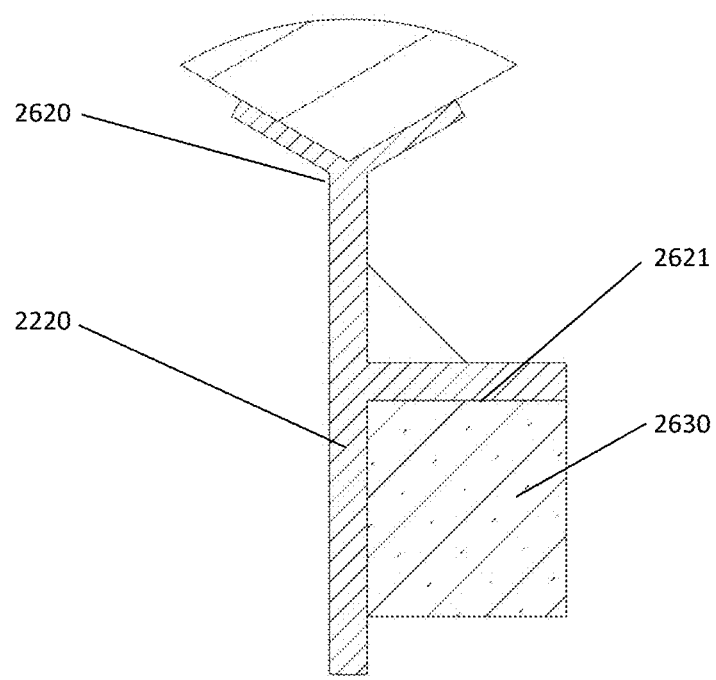

FIG. 14 is a schematic view of a packing module mounting structure in this implementation; FIG. 15 is an enlarged view of part E in FIG. 14; FIG. 17 is an enlarge view of part F in FIG. 14, i.e., a connecting structure of a lower bracket and a lower partition plate in an embodiment of the packing module mounting structure according to the present invention; and FIG. 19 shows a connecting structure of the lower bracket and the lower partition plate in another embodiment of the packing module mounting structure according to the present invention.

As shown in FIG. 14, a packing module mounting structure includes a packing module 2300, an upper partition plate 2210 and a lower partition plate 2220. The upper partition plate 2210 extends upward from the upper vertex angle of the lower flow guide portion 2310 of the packing module 2300, and lower partition plate 2220 extends downward from the lower vertex angle of the lower flow guide portion 2330 of the packing module 2300. On one hand, the upper partition plate 2210 and the lower partition plate 2220 can partition two sides of the packing module 2300 into different spray regions, so that it is convenient for the packing module to have different operating modes in different spray regions; on the other hand, the upper partition plate 2210 and the lower partition plate 2220 can play a role in fixing and supporting the packing module 2300.

Firstly, in order to realize the connection between the packing module 2300 and the upper partition plate 2210, in this implementation, a vertex angle protruded upward is formed on the upper flow guide portion 2310 of the packing module 2300. The packing module mounting structure includes an upper bracket 2610 which is clamped with the vertex angle of the upper flow guide portion 2310 and has a herringbone section. A herringbone upward extension of the upper bracket 2610 is connected and fixed to the upper partition plate 2210. The herringbone structure of the upper bracket 2610 is matched with the shape of the vertex angle of the upper flow guide portion 2310 in this embodiment, so that it is convenient to accurately position and mount the packing module 2300, and it is also convenient to realize the sealed connection between the upper partition plate 2210 and the packing module 2300. The water sprayed by the nozzles on the upper side of the packing module 2300 will be blocked by the herringbone upper bracket 2610 near two sides of the vertex angle and accurately diverted to one side of the upper flow guide portion 2310 in the corresponding spray region, and will not leak to the other side of the vertex angle.

Secondly, in order to realize the connection between the packing module 2300 and the lower partition plate 2220 and support the packing module 2300, in this implementation, a vertex angle protruded downward formed on the lower flow guide portion 2330 of the packing module 2300. The packing module mounting structure includes a lower bracket 2620 which is clamped with the vertex angle of the lower flow guide portion 2330 and has a Y-shaped section. At the lower end of the downward extending portion of the Y-shape of the lower bracket 2620, a support connecting portion 2621 extending in the horizontal direction is formed. A support beam 2630 corresponding to the support connecting portion 2621 is arranged on the cooling tower, and the upper surface of the support beam 2630 is resisted against the lower surface of the support connecting portion 2621, so as to support the lower bracket 2620 and the packing module 2300. Through the clamped connection between the Y-shaped lower bracket 2620 and the vertex angle of the lower flow guide portion 2330, the lower bracket 2620 can support and limit the packing module 2300. During mounting the packing module 2300, by virtue of the connection between the vertex angle of the lower flow guide portion 2330 of the packing module 2300 and the Y-shaped lower bracket 2620, the mounting position of the packing module 2300 can be conveniently and accurately found, and the stable and reliable connection can be formed between the packing module 2300 and the lower bracket 2620.

As shown in FIG. 15, the upper bracket 2610 include a first upper bracket portion 2610A and a second upper bracket portion 2610B, wherein a first resisting portion 2611A resisted against a bevel edge on one side of the vertex angle of the upper flow guide portion 2310 and a first extension portion 2612A extending upward from the upper end of the first resisting portion 2611A are formed on the first upper bracket portion 2610A. A second resisting portion 2611B resisted against a bevel edge on the other side of the vertex angle of the upper flow guide portion 2310 and a second extension portion 2612B extending upward from the upper end of the second resisting portion 2611B are formed on the second upper bracket portion 2610B. In this implementation, the first resisting portion 2611A and the second resisting portion 2611B are formed as a structure matched with the vertex angle of the upper flow guide portion 2310. By using the first resisting portion 2611A and the second resisting portion 2611B, the packing module 2300 can be limited and fixed on left and right sides of the vertex angle of the upper flow guide portion 2310 of the packing module 2300, and the reliable connection can be formed between the upper bracket 2610 and the packing module 2300. The first extension portion 2612A and the second extension portion 2612B are fitted with each other and can be fixedly connected by welding, riveting, bolting or in other ways. In addition, the first upper bracket portion 2610A and the second upper bracket portion 2610B can also be formed integrally.

Figure 16:
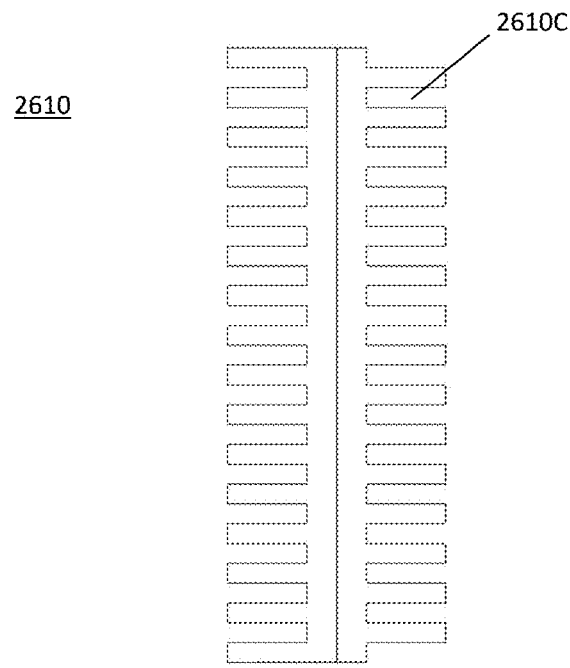

As shown in FIG. 16, in this implementation, an upper water passage portion 2610C matched with the inflow ports on two sides of the vertex angle of the upper flow guide portion 2310 is arranged on the upper bracket 2610. Through the upper water passage portion 2610C, the sprayed water can flow into the flow guide slots of the first and second primary packing sheets at the vertex angle, and the water is evenly distributed in the packing module when the packing module is supported, so that it is advantageous to increase the heat exchange area.

In this implementation, the extension height of the first extension portion 2612 is less than that of the second extension portion 2612B, and the upper partition plate is compressed and fixed to the second extension portion 2612B by a bolt component on the first extension portion 2612A side. The position of the lower end of the upper partition plate 2210 is lower than that of the upper end of the second extension portion 2612B, so that the sprayed water can be prevented from leaking from the first extension portion 2612A side to the second extension portion 2612B side.

In addition, the upper end face of the first extension portion 2612A is resisted against the lower end face of the upper partition plate 2210, so that the firmness of the connection among the upper partition plate 2210, the upper bracket 2610 and the packing module 2300 can be further improved. Moreover, it is also convenient to form the sealed connection between the first extension portion 2612A and the upper partition plate 2210 (for example, glue is applied at the junction of the first extension portion and the upper partition plate).

As shown in FIG. 17, the support beam 2630 is located exactly below the lower bracket 2620, and the lower partition plate 2220 extends upward from one side of the support beam 2630 to be connected to a side edge of the support connecting portion 2621.

Figure 18:
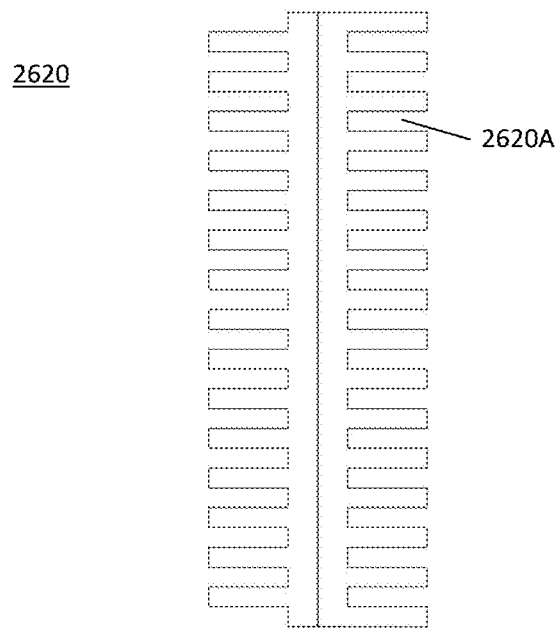

As shown in FIG. 18, a lower water passage portion 2620 matched with the outflow ports on two sides of the vertex angle of the lower flow guide portion 2330 is arranged on the lower bracket 2620. By providing the lower water passage portion 2620A, an overflow path can be provided for the outflow ports on two sides of the vertex angle, so that the lower bracket 2620 realizes the even distribution of water in the packing module while supporting the packing module, and it is advantageous to increase the heat exchange area.

In addition, as shown in FIG. 19, the lower partition plate 2220 may also be formed by a downward extending portion of the Y-shape of the lower bracket 2620, the support connecting portion 2621 is formed on one side of the lower partition plate 2220 and extends in the horizontal direction, and the support beam 2630 is located on the lower side of the support connecting portion 2621 and resisted against the lower end face of the support connecting portion 2621.

[Third Implementation]

Figure 20:
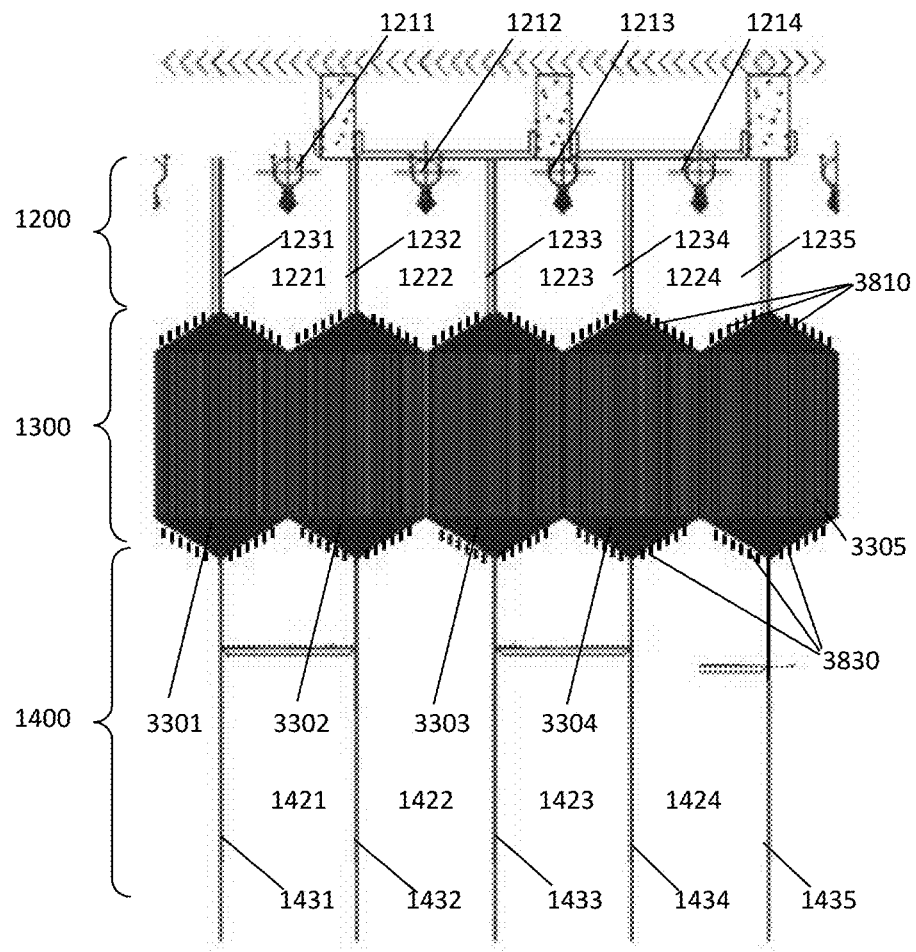

FIG. 20 is a partially schematic view of a cooling tower according to a third implementation of the present invention.

In the second implementation, the water entering the packing module 2300 is evenly distributed by providing water-retaining ribs as structures for evenly distributing water on the folding edges P2311, P2312, P2331 and P2332 of the upper flow guide portion 2310 and the lower flow guide portion 2330 of the packing module 2330. However, in this implementation, no water-retaining ribs are provided on the folding edges of the upper flow guide portions 3310 and the lower flow guide portions 3330 of the packing modules 3301-3305, and water-retaining sheets are arranged on the upper flow guide portions and the lower flow guide portions of the packing modules 3301-3305.

As shown in FIG. 20, for the packing modules 3301-3305 of the heat exchange portion 1300, the description is given by taking the packing module 3302 as an example. A plurality of inflow water-retaining sheets 3810 extending in the stack direction of the packing sheets of the packing module 3302 are vertically arranged at inflow ports on two sides of the partition plate 1232 of the upper flow guide portion 3310 of the packing module 3302, and the lower end of each inflow water-retaining sheet 3810 is tightly attached to the inflow port formed as a face of the packing module 3302. In addition, a plurality of outflow water-retaining sheets 3830 extending in the stack direction of the packing sheets of the packing module 3302 are vertically arranged at outflow ports on two sides of the partition plate 1432 of the upper flow guide portion 3330 of the packing module 3302, and the upper end of each outflow water-retaining sheet 3830 is tightly attached to the outflow port formed as a face of the packing module 3302.

In this implementation, by using the inflow water-retaining sheets 3810 and the outflow water-retaining sheets 3830 as the structure for evenly distributing water, the technical effect the same as that achieved by providing water-retaining ribs on the folding edges P2311, P2312, P2331 and P2332 of the upper flow guide portion 2310 and the lower guide portion 2330 of the packing module 2330 in the second implementation can be achieved, and the water flowing into the packing module 3302 can be evenly distributed.

[Fourth Implementation]

In this implementation, the structure for evenly distributing water is different from those in the second and third implementations, and the structure for evenly distributing water is arranged on each packing sheet of the packing module 4300 to realize even inflow water.

Figure 21:
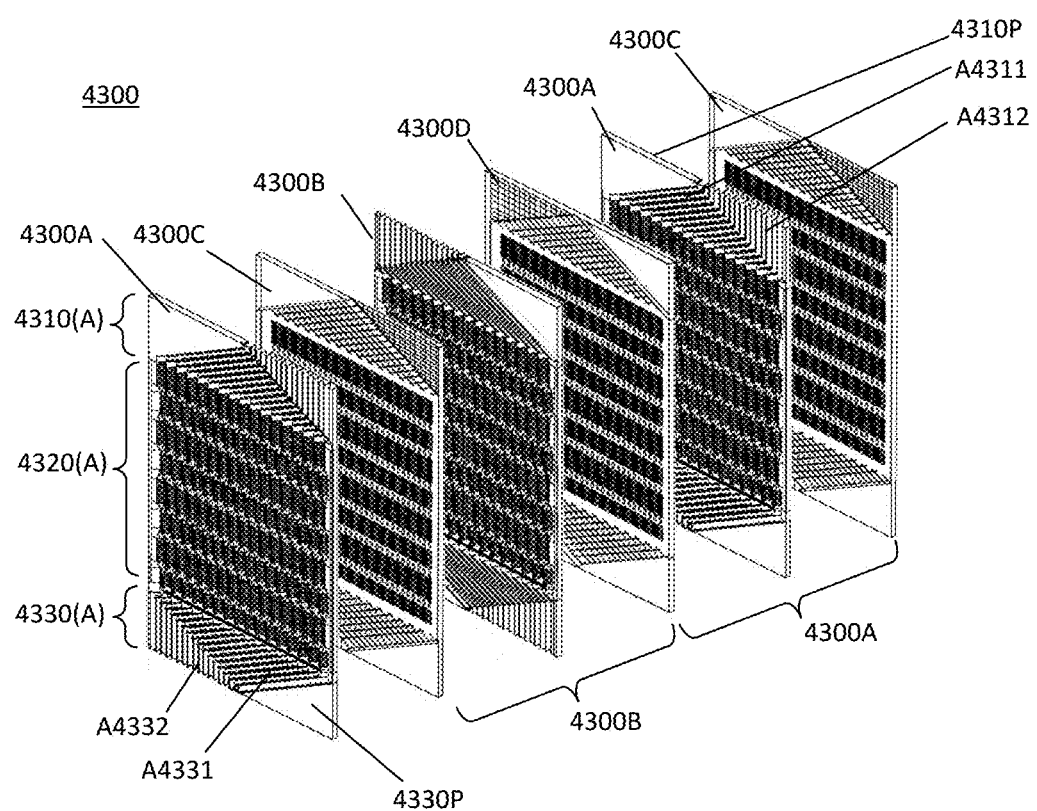

FIG. 21 is a schematic view of a packing module according to the fourth implementation of the present invention.

As shown in FIG. 21, in the packing module 4300 used in this implementation, the basic functions of the packing sheets 4300A, 4300B, 4300C and 4300D are the same as those of the packing sheets A, B, C and D used in the first implementation, but the upper and lower flow guide portions 4310 and 4330 are different in structure. The upper and lower flow guide portions 4310 and 4330 are formed as a rectangle instead of a triangle, so that the packing sheets 4300A, 4300B, 4300C and 4300D form a rectangle as a whole. Only the differences will be described in detail here.

By taking the first primary packing sheet 4300A as an example, longitudinal flow guide slots A4312 which are continuous with the flow guide slots A4311 and extend upward in turn are formed at inflow ends of the flow guide slots A4311 of the upper flow guide portion 4310A in the first primary packing sheet 4300A, and the uppermost openings of the longitudinal flow guide slots A4312 are not lower than the leftmost flow guide slot A4311 and terminate at the same height. Correspondingly, the folding edges 4310P on the non-inflow side (the upper end of the left side in the figure) of the upper flow guide portion 4310A of the first primary packing sheet 4300A are kept at the same height as the uppermost openings of the longitudinal flow guide slots A4312. Thus, the upper flow guide portion 4310A is formed as a rectangle.

On the other hand, longitudinal flow guide slots A4332 which are continuous with the flow guide slots A4331 and extend upward in turn are formed at outflow ends of the flow guide slots A4331 of the lower flow guide portion 4330A in the first primary packing sheet 4300A, and the lowermost openings of the longitudinal flow guide slots A4332 are not lower than the rightmost flow guide slot A4331 and terminate at the same height. Correspondingly, the folding edges 4330P on the non-outflow side (the upper end of the right side in the figure) of the lower flow guide portion 4330A of the first primary packing sheet 4330A are kept at the same height as the lowermost openings of the longitudinal flow guide slots A4332. Thus, the lower flow guide portion 4330A is formed as a rectangle.

Thus, the first primary packing sheet 4300A is formed as a rectangle. The structure of the second primary packing sheet 4300B is opposite to that of the first primary packing sheet 4300A in the left-right direction, and will not be repeated here.

Since the first and second primary packing sheets 4300A and 4300B are formed as a rectangle, the first and second partition sheets 4300C and 4300D are correspondingly formed as a rectangle, and folding edges are formed on edges or some edges corresponding to the first and second primary packing sheets 4300A and 4300B. Therefore, similar to the first implementation, the packing sheets can be stacked, except for the packing module 4300 formed as a cuboid.

By providing longitudinal flow guide slots A4312 and A4332 for the primary packing sheets 4300A and 4300B, the packing module 4300 is formed as a cuboid, and the water can be evenly guided into the functional portion 4320 of the packing module 4300 and evenly discharged from the lower ends of the longitudinal flow guide slots A4332. Moreover, since the packing module 4300 formed as a cuboid is supported more easily, the mounting structure is simpler.

[Fifth Implementation]

In order to further facilitate the mounting of the packing module, the packing module in this implementation differs from that in the fourth implementation in that: in this implementation, there is a vertex angle protruded upward on the upper side of the packing module, and there is a vertex angle protruded downward on the lower side of the packing module.

Figure 22:
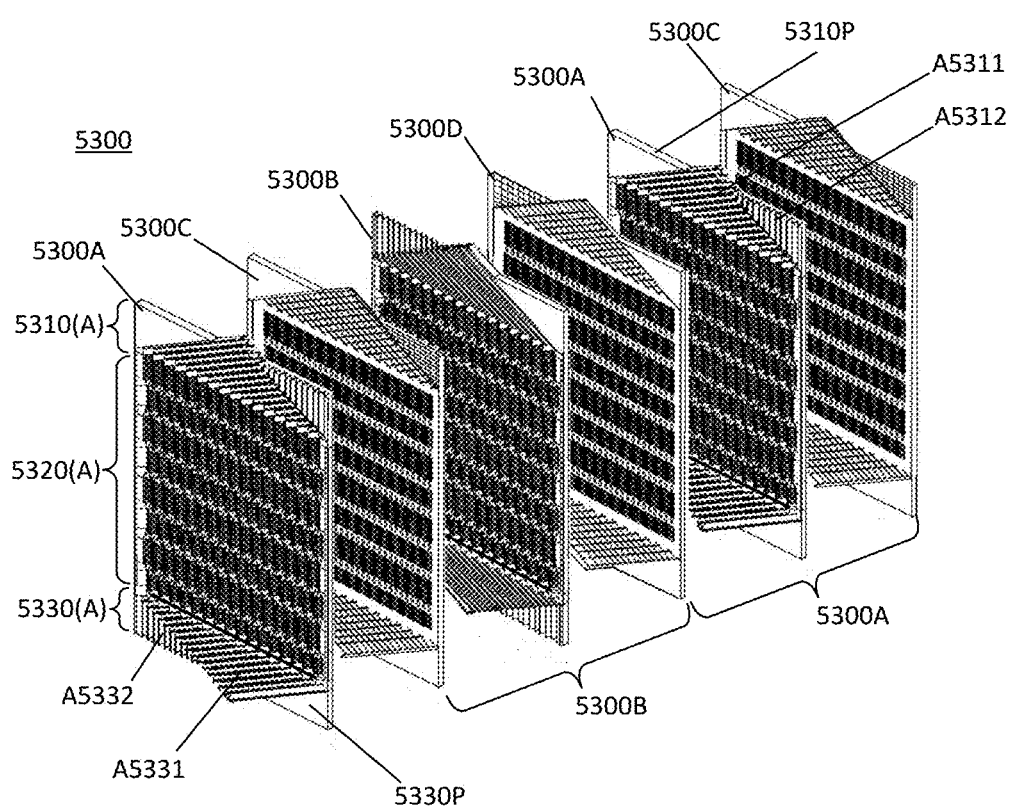

FIG. 22 is a schematic view of a packing module according to the fifth implementation of the present invention.

As shown in FIG. 22, in the packing module 5300 in this implementation, the basic functions of the packing sheets 5300A, 5300B, 5300C and 5300D are the same as those of the packing sheets A, B, C and D used in the fourth implementation, but the upper and lower flow guide portions 5310 and 5330 are different in structure. Specifically, an upper flow guide portion 5310 with an upper triangle having a vertex angle pointing to the packing module 5300 and an upper longitudinal flow guide portion communicating a bevel edge of the upper triangle on the inflow side are formed in the stack direction of the packing module 5300. In addition, the height of the upper longitudinal flow guide portions of the first and second primary packing sheets 5300A and 5300B is less than that of the vertex of the upper triangle, and the vertex angle of the upper triangle is protruded upward. In the lower portion of the packing module 5300: a lower flow guide portion 5330 with a lower triangle having a vertex angle pointing to the lower side of the packing module 5300 and a lower longitudinal flow guide portion communicating a bevel edge of the upper triangle on the outflow side are formed in the stack direction of the packing module 5300. The height of the lower longitudinal flow guide portions of the first and second primary packing sheets 5300A and 5300B is less than that of the vertex of the lower triangle, and the vertex angle of the lower triangle is protruded downward. The vertex angle of the upper triangle and the vertex angle of the lower triangle provide a positioning reference and a mounting support point for the mounting of the packing module.

The differences will be described below by taking the first primary packing sheet 5300A as an example.

The upper flow guide portion 5310A in the first primary packing sheet 5300A is formed as an upper triangle, and the vertex angle of the upper triangle faces upward. At the inflow ends of the flow guide slots A5311 of the upper flow guide portion 5310A in the first primary packing sheet 5300A, longitudinal flow guide slots A5312 which are continuous with only some (those on the right side in the figure) flow guide slots A5311 and extend upward in turn are formed, and the inflow ends of the remaining flow guide slots A5311 are located on one side of the protruded vertex angle of the upper triangle. Openings at the upper ends of the longitudinal flow guide slots A5312 are lower than the height of the vertex of the upper triangle, and the longitudinal flow guide slots A5312 terminate at the same height. The longitudinal flow guide slots A5312 form the upper longitudinal flow guide portions, that is, the height of the upper longitudinal flow guide portions is less than that of the vertex of the upper triangle. Correspondingly, the folding edges 5310P on the non-inflow side (the upper end of the left side in the figure) of the upper flow guide portion 5310A of the first primary packing sheet 5300A are kept at the same height as the uppermost ends of the longitudinal flow guide slots A5312. Thus, the vertex angle of the upper triangle is protruded upward.

The lower flow guide portion 5330A in the first primary packing sheet 5300A is formed as a lower triangle, and the vertex angle of the lower triangle faces downward. At the outflow ends of the flow guide slots A5331 of the lower flow guide portion 5330A in the first primary packing sheet 5300A, longitudinal flow guide slots A5332 which are continuous with only some (those on the left side in the figure) flow guide slots A5331 and extend downward in turn are formed, and the outflow ends of the remaining flow guide slots A5331 are located on one side of the vertex angle of the lower triangle. Openings at the lower ends of the longitudinal flow guide slots A5332 are lower than the height of the vertex of the lower triangle, and the lower ends of the longitudinal flow guide slots A5332 terminate at the same height. The longitudinal flow guide slots A5332 form the lower longitudinal flow guide portions, that is, the height of the lower longitudinal flow guide portions is greater than that of the vertex of the lower triangle. Correspondingly, the folding edges 5330P on the non-outflow side (the upper end of the right side in the figure) of the lower flow guide portion 5330A of the first primary packing sheet 5300A are kept at the same height as the lowermost ends of the longitudinal flow guide slots A5332, so that the vertex angle of the lower triangle is protruded downward.

Thus, the first primary packing sheet 5300A forms an upper triangle with a vertex angle protruded upward and a lower triangle with a vertex angle protruded downward. The structure of the second primary packing sheet 5300B is similar to that of the first primary packing sheet 5300A but is symmetrically on left and right sides, and will not be repeated here.

Since the first and second primary packing sheets 5300A and 5300B are formed as an upper triangle with a vertex angle protruded upward and a lower triangle with a vertex angle protruded downward, correspondingly, the first and second partition sheets 5300C and 5300D are correspondingly formed as an upper triangle with a vertex angle protruded upward and a lower triangle with a vertex angle protruded downward, and folding edges are formed on edges or some edges corresponding to the first and second primary packing sheet 5300A and 5300B. Thus, similar to the fourth implementation, the packing sheets can be stacked to form the packing module; However, different from the fourth implementation, the packing module having an upper triangle with a vertex angle protruded upward and a lower triangle with a vertex angle protruded downward is also formed.

The upper triangle with a vertex angle protruded upward and the lower triangle with a vertex angle protruded downward can be connected to the packing module mounting structure in the second implementation to realize the positioning and mounting of the packing module 5300 (referring to FIGS. 14-19). It should be emphasized that the upper water passage portion and the lower water passage portion in the second implementation can also be applied to this implementation and play the same role.

The water sprayed by the nozzles on the upper side of the packing module 5300 enters the flow guide slots A5311 on the right side in the figure through the longitudinal flow guide slots A5312 in the upper longitudinal flow guide portions, and then enters the functional portion 5320 through the flow guide slots A5311. The inflow ends of the flow guide slots A5311 on the left side in the figure are located on one side of the vertex angle of the upper triangle, and the sprayed water directly flow into the functional portion 5320 through these flow guide slots A5311. The water in the functional portion 5320 on the right side in the figure flows through the flow guide slots A5331 on the right side and then flows out from one side of the vertex angle of the lower triangle; and, the water in the functional portion 5320A on the left side in the figure flows through the flow guide slots A5331 on the left side and then flows out from the longitudinal flow guide slots A5332.

Figure 23:
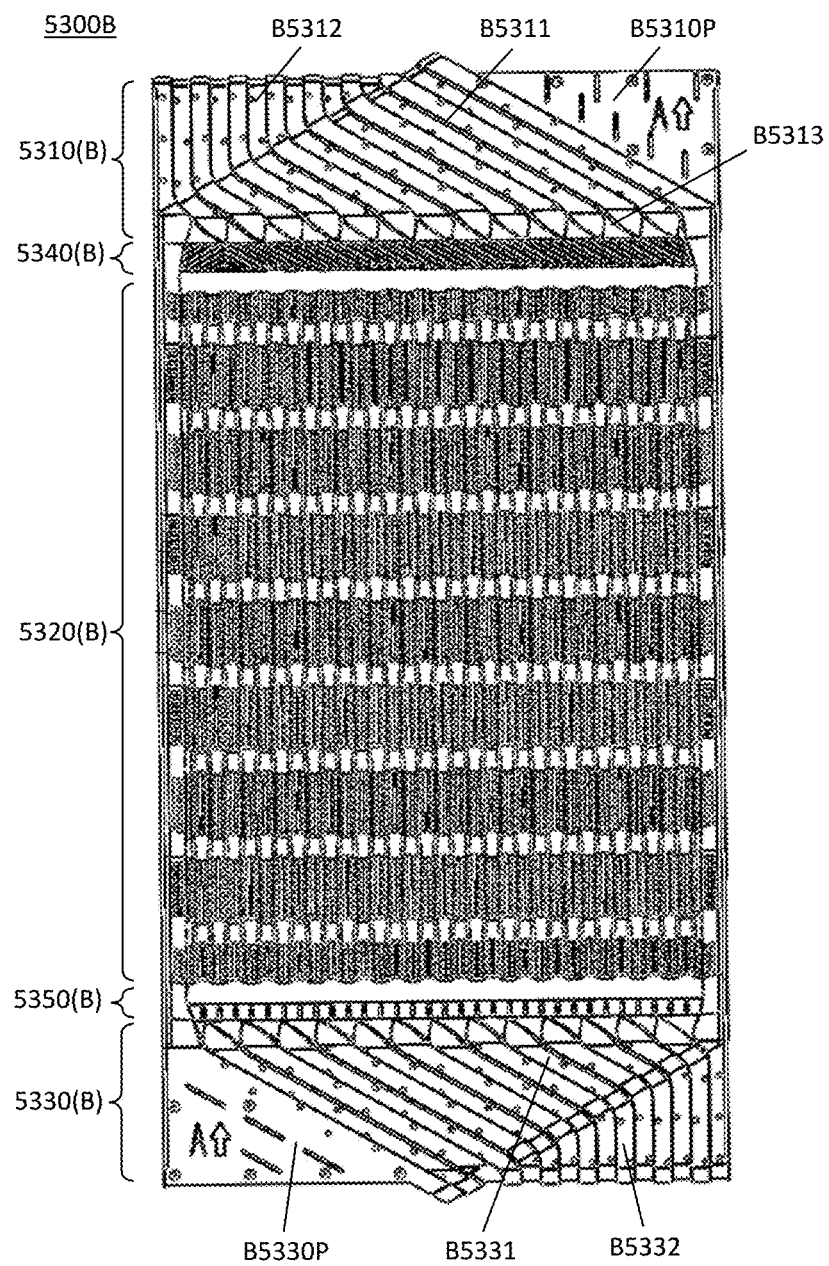
Figure 24:
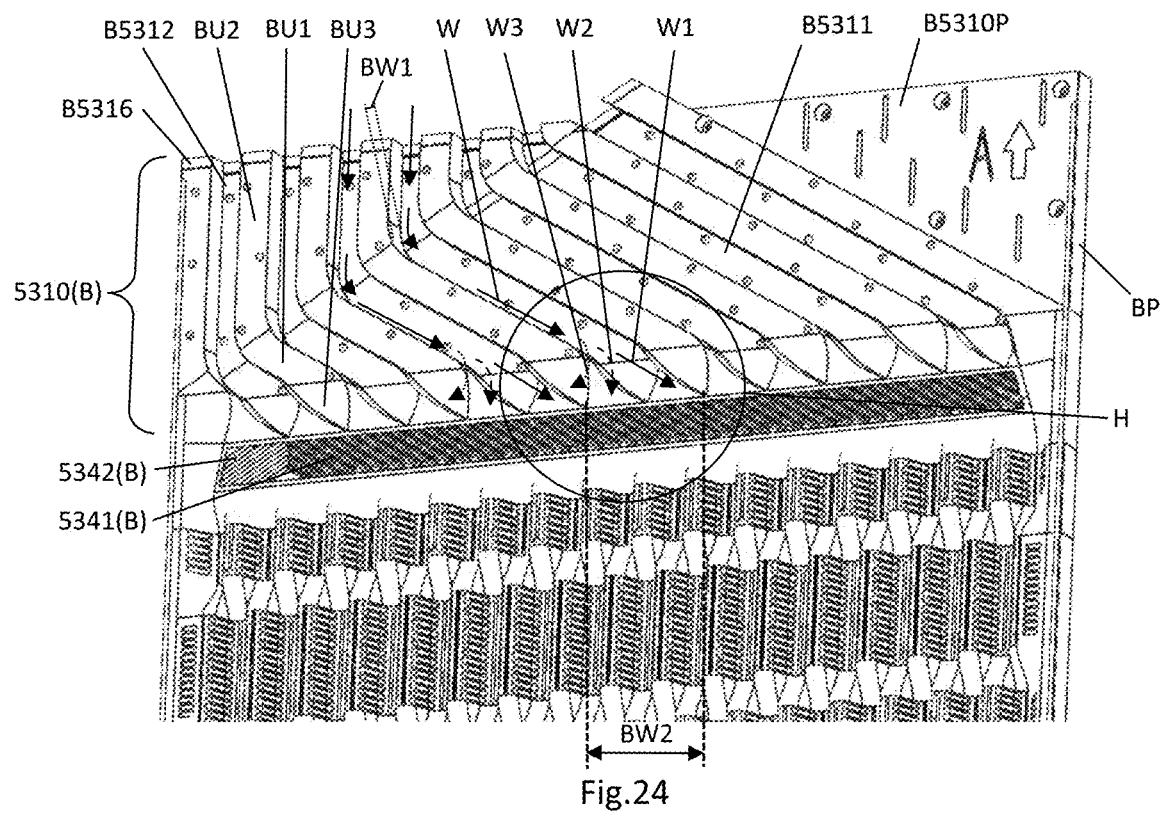
Figure 25:
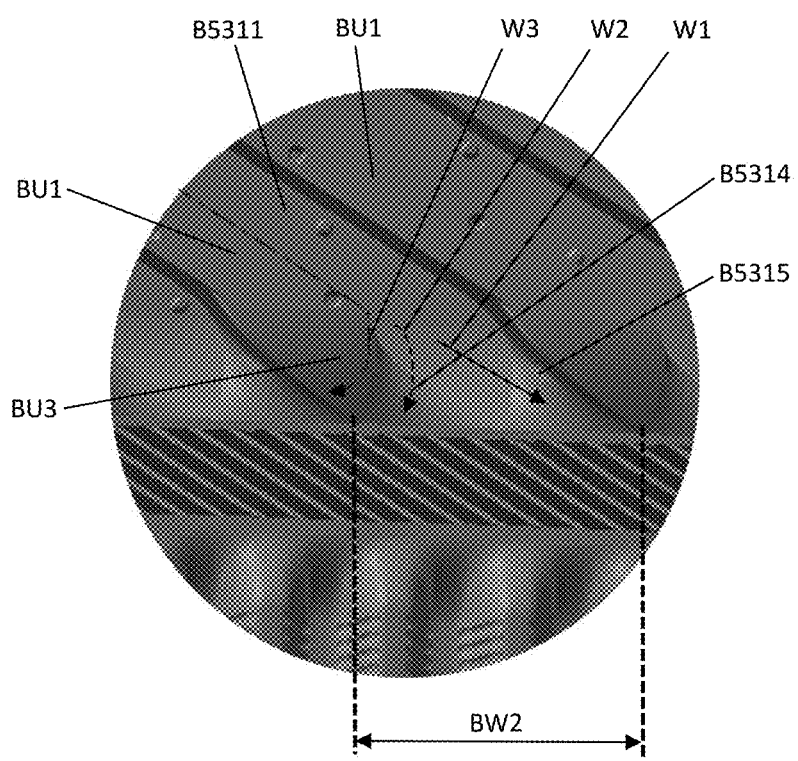

FIG. 23 is a schematic structure diagram of the second primary packing sheet 5300B in an embodiment of the packing module according to the fifth implementation of the present invention. FIG. 24 is a schematic structure diagram of an upper portion of the second primary packing sheet 5300B shown in FIG. 23. FIG. 25 is an enlarged view of part H in FIG. 24. FIG. 24 is a schematic structure diagram of a lower portion of the second primary packing sheet 5300B shown in FIG. 23.

The following description will be given by taking the second primary packing sheet 5300B as an example. As shown in FIG. 23, the water sprayed from the upper side of the packing module 5300 enters the second primary packing sheet 5300B from the longitudinal flow guide slots B5312 and then flows into the flow guide slots B5311 from the longitudinal flow guide slots B5312. However, due to the gravity, the water flowing into the flow guide slots B5311 forms a water film on the inner surfaces of the lower sidewalls of the flow guide slots B5311, so that the water is gathered and unevenly distributed when flowing from the outlets of the flow guide slots B5311 to the function portion B5320, resulting in low heat exchange efficiency of the packing module 5300. In the case where the flow guide slots are arranged obliquely, the technical problem on the gathering and uneven distribution of the water in the flow guide slots becomes a technical problem that is expected to be solved but has not been solved by those skilled in the art.

In order to solve this technical problem, in the packing module 5300 in this implementation, turnover structures B5313 are arranged at the lower ends of the flow guide slots B5311. On one hand, the turnover structures B5313 can turn over the water film on the surfaces of the lower sidewalls of the flow guide slots B5311 to a direction parallel to the plane where the second primary packing sheet 5300B is located. On the other hand, the turnover structures B5313 can also expand the width of the turned water film, so that the water is evenly distributed to the inlet of the functional portion and the heat dissipation efficiency of the packing module 5300 is improved.

The second primary packing sheet 5300B has a flexural structure and a certain thickness. The plane where the second primary packing sheet 5300B is located can be interpreted as the center plane of the second primary packing sheet 5300B. FIG. 23 shows the first surface of the second primary packing sheet 5300B, and the second surface of the second primary packing sheet 5300B is located on the rear side of the first surface. The center plane is parallel to the first surface and the second surface, and located between the first surface and the second surface.

Specifically, as shown in FIG. 24, in the second primary packing sheet 5300B, the substrate is bent for multiple times to form a plurality of protrusion portions BU1 and BU2, flow guide slots B5311 are formed two adjacent protrusion portions BU1, and longitudinal flow guide slots B5312 are formed between two adjacent protrusion portions BU2. When the water sprayed by the spray device on the upper side of the packing module 5300 flows into the flow guide slots B5311 from the longitudinal flow guide slots V5312, the water forms a water film W on the surfaces on the upper side of the protrusion portions BU1 (i.e., the surfaces on the lower side of the flow guide slots B5311 adjacent to the upper side of the protrusion portions BU1) due to its own gravity.

As shown in FIGS. 24 and 25, the flow guide slots B5311 obliquely extend from the top down, and flared portions are formed at the lower ends of the flow guide slots B5311. The flared portions are in a horn-mouth shape that is open downward. The depth of the bottoms of the flared portions gradually decreases in a direction from the upper flow guide portion 5310B to the functional portion 5320B.

One flared portion is connected to the protrusion portion BU1 on the lower side thereof (or referred to as the left side) through a first transition surface B5314. This flared portion is connected to the protrusion portion BU1 on the upper side thereof (or referred to as the right side) through a second transition surface B5315. Both the first transition surface B5314 and the second transition surface B5315 are preferably smooth curved surfaces. In addition, the first transition surface B5314 and the second transition surface B5315 may also be formed as planes or slopes.

In this embodiment, preferably, smooth transition surfaces (i.e., the first transition surface B5314 and the second transition surface B5315) are formed on left and right sides of the flared portion. It should be understood that, if the smooth transition surface is formed on only one side (left or right side) of the flared portion, the effect of turning over and expanding a part of the water film can also be achieved.

The first transition surface B5314 is preferably a convex smooth transition surface, and the second transition surface B5315 is preferably a concave smooth transition surface. The first transition surface B5314 is located on the lower side of the flow guide slot B5311 at a position deviated from the extension direction of the flow guide slot B5311. The first transition surface B5314 guides the water film W to turn over by mainly using the tension of the water film and the gravity of the water film. At the first transition surface B5314, the convex smooth transition surface is more advantageous to guide the water film W2 to turn over. The second transition surface B5315 is approximately located in the extension direction of the flow guide slot B5311, and the second transition surface B5315 guides the water film W1 to turn over by manly using the inertial force of the water film. The tension and gravity of the water film W1 play an auxiliary role. At the second transition surface B5315, the concave smooth transition surface is more advantageous for the water film W1 to smoothly flow and turn over under the action of the inertial force.

It is to be noted that, since the second primary packing sheet 5300B is formed from the substrate by pressure molding, at the positions on the front side (in a direction toward the outer side of the principal plane) of the second primary packing sheet 5300B where the protrusion portions BU1 are formed, flow guide slots B531 are formed on the rear side (in a direction toward the inner side of the principal plane) of the second primary packing sheet. At the positions on the front side of the second primary packing sheet 5300B where the protrusion portions BU2 are formed, flow guide slots B5311 are formed on the rear side of the second primary packing sheet 5300B. At the on the front side of the second primary packing sheet 5300B where the flow guide slots B5311 are formed, protrusion portions BU1 are formed on the rear side of the second primary packing sheet 5300B. Similarly, at positions on the front side of the second primary packing sheet 5300B where the convex transition surfaces are formed, the concave transition surfaces are formed on the rear side of the second primary packing sheet 5300B. In other words, the first transition surfaces B5314 and the second transition surfaces B5315 in this implementation will be formed on both sides of the second primary packing sheet 5300B. Furthermore, at positions on the second primary packing sheet 5300B where the convex first transition surfaces B5134 are formed, the concave second transition surfaces B5315 are formed on the rear side of the second primary packing sheet 5300B; and, at positions on the front side of the second primary packing sheet 5300B where the concave second transition surfaces B5315 are formed, the convex first transition surfaces B5314 are formed on the rear side of the second primary packing sheet 5300B.

As shown in FIGS. 24 and 25, when the water film W flows to the turnover structure B5315, the first part of water film W1 flows to the second transition surface B5315 in the flowing direction of the water film W under the action of the inertial force and tension of the water film W1. Since the second transition surface B5315 is a smooth and concave curved surface, the first part of water film W1 gradually turns over from the surface of the lower sidewall of the flow guide slot B5311 to a direction parallel to the second primary packing sheet 5300B.

Since the first transition surface B5314 is a smooth and convex curved surface, the second part of water film W2 is adhered onto the surface of the first transition surface B5314 under the action of its own tension, and turns over from the surface of the lower sidewall of the flow guide slot B5311 to a direction parallel to the second primary packing sheet 5300B along the surface of the first transition surface B5314.

As shown in FIG. 24, the width of the water film W in the flow guide slot B5311 is the protrusion height BW1 of the protrusion portion BU1. The total width of the water films W1 and W2 after the turnover and diffusion effect of the turnover structure B5313 is the width BW2 of the lower end of the flared portion of the turnover structure B5313. It can be seen that the width of the water film after passing through the turnover structure B5313 is greatly increased.

The protrusion portion BU1 extends obliquely from the top down, i.e., forming an included angle with the vertical direction. At the tail end of the protrusion portion BU1, the height gradually decreases in the extension direction of the protrusion portion BU1, and the width also gradually decreases, so that a protrusion end portion BU3 is formed. The third part of water film W3 flows to the protrusion end portion BU1 along the outer surface of the protrusion end portion BU3 due to its own tension, so that the width of the turned water film is further increased.

Further, the lower end of the protrusion portion BU1 (i.e., the lower end of the protrusion end portion BU3) is formed as a sharp tip. By forming the lower end of the protrusion portion BU1 as a sharp tip, the water films turned in the flared portions of two adjacent flow guide slots BU1 can be butt-jointed seamlessly to form a continuous shape, so that the uniformity of the water film at the inlet of the functional portion 5320B can be further improved.

It should be emphasized that the first part of water film W1, the second part of water film W2 and the third part of water film W3 are merely for convenience of description. In practical applications, the first part of water film W1, the second part of water film W2 and the third part of water film W3 are all sheet-shaped, and the parts of water film can be continuous.

Therefore, the turnover structure B5313 not only can turn the water film on the surface of the lower sidewall of the flow guide slot B5311 to a direction parallel to the second primary packing sheet 5300B, but also can expand the width of the water film, so that it is advantageous for the even distribution of water at the inlet and inside the functional portion 5320B of the second primary packing sheet 5300B, and the heat exchange efficiency is improved.

In this implementation, an upper dredge portion 5340B is further arranged between the upper flow guide portion 5310B and the functional portion 5320B. The upper dredge portion 5340B includes strip-shaped dredge slots formed by bending the substrate for multiple times. The water film after passing the turnover structure B5313 is divided into fine water flows by the dredge slots in the upper dredge portion 5340B. The fine water flows are more easily distributed evenly after flowing into the functional portion B5320.

The dredge slots in the upper dredge portion 5340B can be arranged obliquely, and the extension direction of the dredge slots is preferably the same as the direction of inclination of the flow guide slots B5311, so that it is advantageous for the water film to flow into the upper dredge portion 5340B.

The upper dredge portion 5340B may further include a first dredge region 5341B and a second dredge region 5342B. The first dredge region 5341B is located on one side of the second primary packing sheet 5300B in the width direction, and located on the same side of the second primary packing sheet 5300B as the longitudinal flow guide portion B5312. The lower ends of the dredge slots in the first dredge region 5341B extend obliquely toward one side of the second primary packing sheet 5300B in the width direction. The lower ends of the dredge slots in the first dredge region 5342B extend obliquely toward the other side of the packing sheet in the width direction. Preferably, in the first dredge region 5341B, the extension direction of the dredge slots is parallel to the extension direction of the flow guide slots B5311. In this implementation, since the flow guide slots B5311 are arranged obliquely, a water depletion region formed on the edges on one side of the flow guide slots B5312 is provided in the second primary packing sheet 5300B. The dredge slots in the second dredge region 5342B are configured to convey water to the water depletion region, so that the effective heat exchange area in the functional portion 5320 of the packing module 5300 in this implementation is increased.

Figure 26:
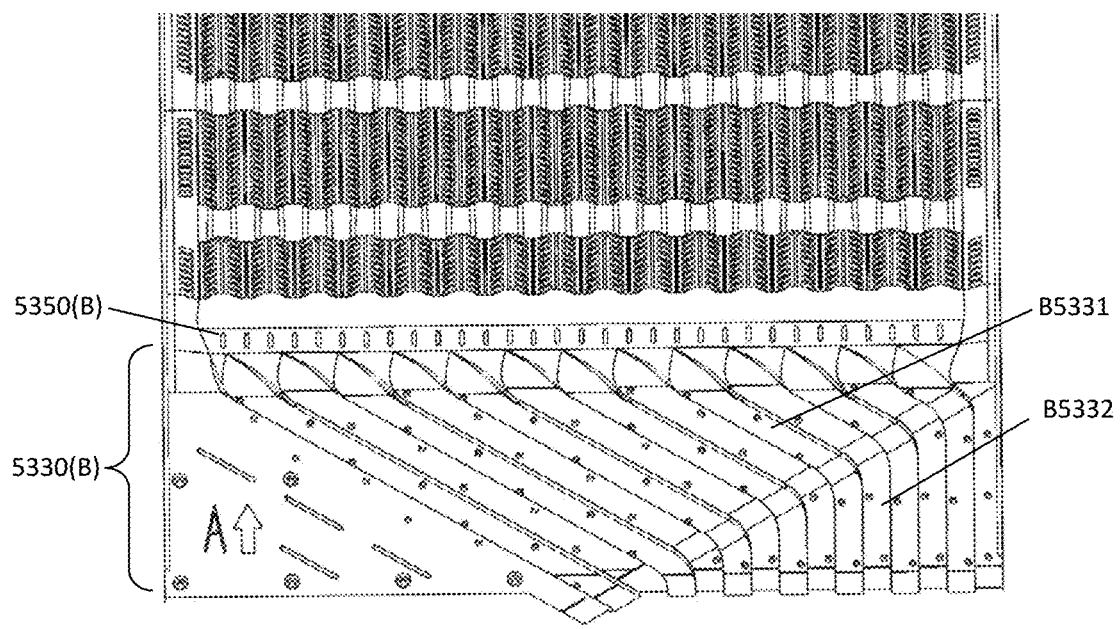

As shown in FIGS. 23 and 26, a lower flow guide portion 5330B formed on the lower side of the functional portion 5320B is further provided in the second primary packing sheet 5300B. The lower flow guide portion 5330B includes flow guide slots B5331 formed by bending the substrate for multiple times and longitudinal flow guide slots B5332. There is an included angle between the extension direction of the flow guide slots B5331 in the lower flow guide portion 5330B and the vertical direction. At the upper openings of the flow guide slots B5331 in the lower flow guide portion 5330B, the upper openings gradually decrease in width and gradually increase in depth in a direction from the functional portion 5320B to the lower flow guide portion 5330B. The upper openings are advantageous for water to gather in the flow guide slots B5331 of the lower flow guide portion 5330B.

As shown in FIG. 26, a lower dredge portion 5350B formed between the functional portion 5320B and the lower flow guide portion 5330B is further provided in the second primary packing sheet 5330B. The lower dredge portion 5350B includes strip-shaped bumps extending in the up-down direction and formed by bending the substrate for multiple times. The strip-shaped bumps can play a role in guiding the water flowing out from the functional portion 5320B, and can enhance the strength of the second primary packing sheet 5330B at its corresponding position.

It should be emphasized that the turnover structure in this implementation can also be applied to the first and second primary packing sheets in the first, second, third and fourth implementations. The turnover structure is specifically applied at the lower openings of the flow guide slots in the upper flow guide portions of the first and second primary packing sheets to turn the water film on the surfaces of the lower sidewalls of the flow guide slots to a direction parallel to the plane where the first or second primary packing sheet is located and expand the width of the water film. Further, the turnover structure can also be used in other conventional packing sheets as long the conventional packing sheets have flow guide slots arranged obliquely.

In this implementation, the first primary packing sheet 5300A is buckled with the first partition sheet 5300C to form a first module group, and the second primary packing sheet 5300B is buckled with the second partition sheet 5300B to form a second module group. When the first module group and the second module group are stacked alternately, there are gaps between the tops and bottoms of the first module group and the second module group, resulting in the presence of undesirable water and/or air flow paths. In order to solve this technical problem, the packing module in this implementation further includes cover members 5510. The cover members 5510 can occlude the gaps at fitting surfaces of the first module group and the second module group, avoiding the generation of undesirable water and/or air flow paths.

Figure 27:
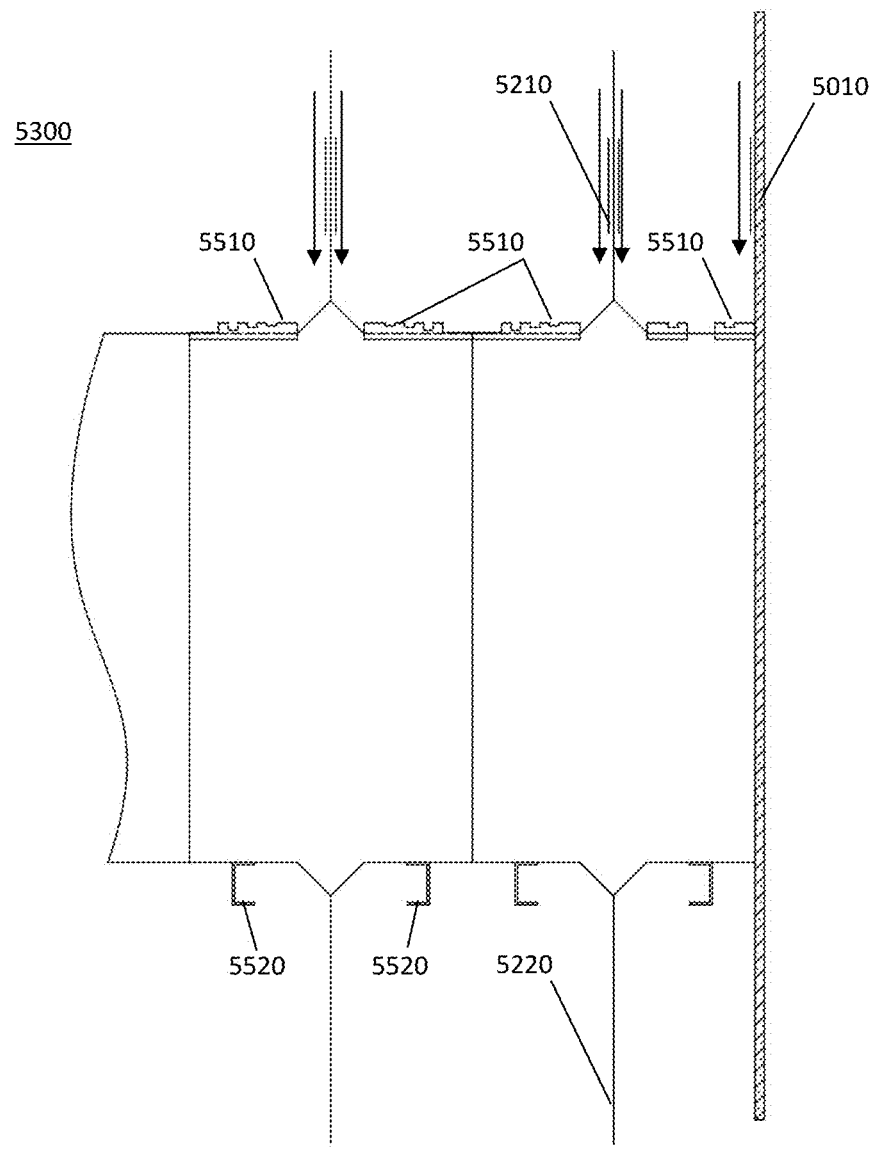
Figure 28:
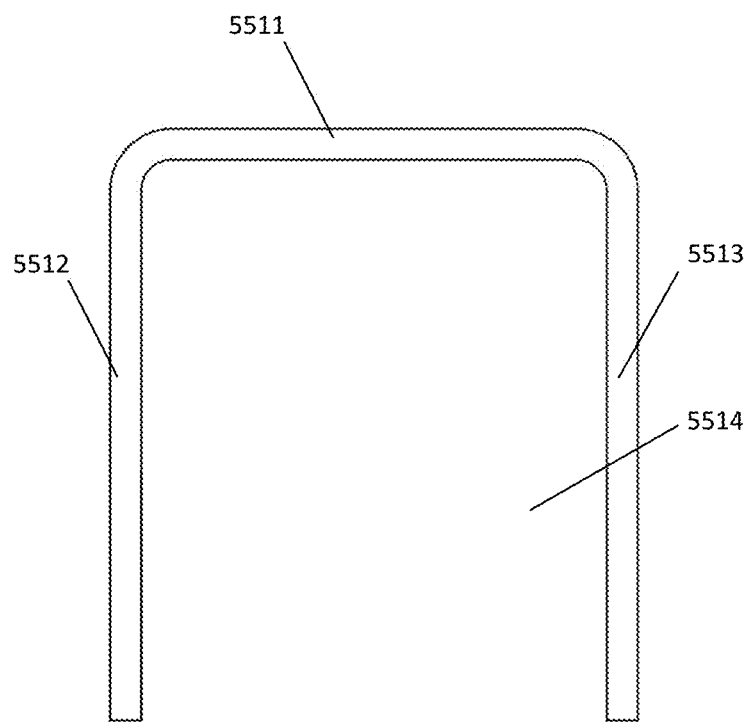
Figure 29:
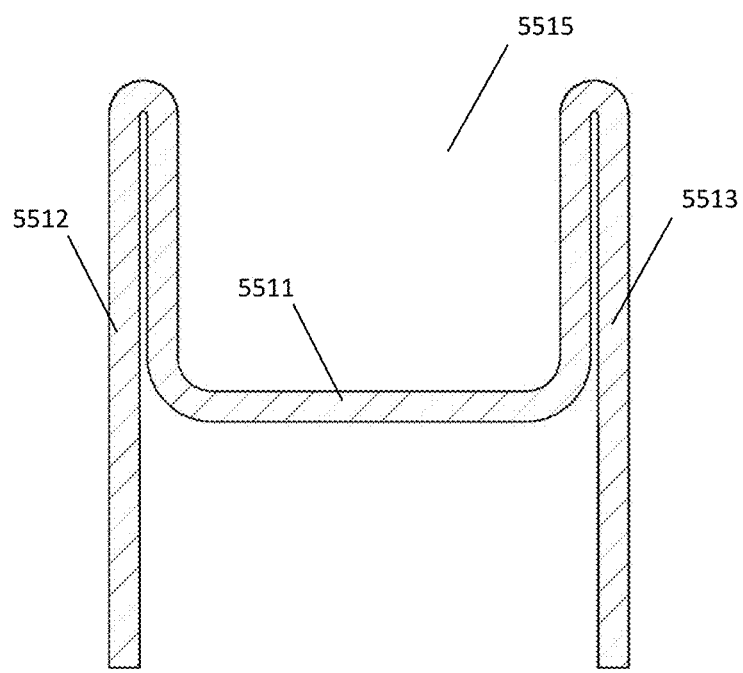
Figure 30:
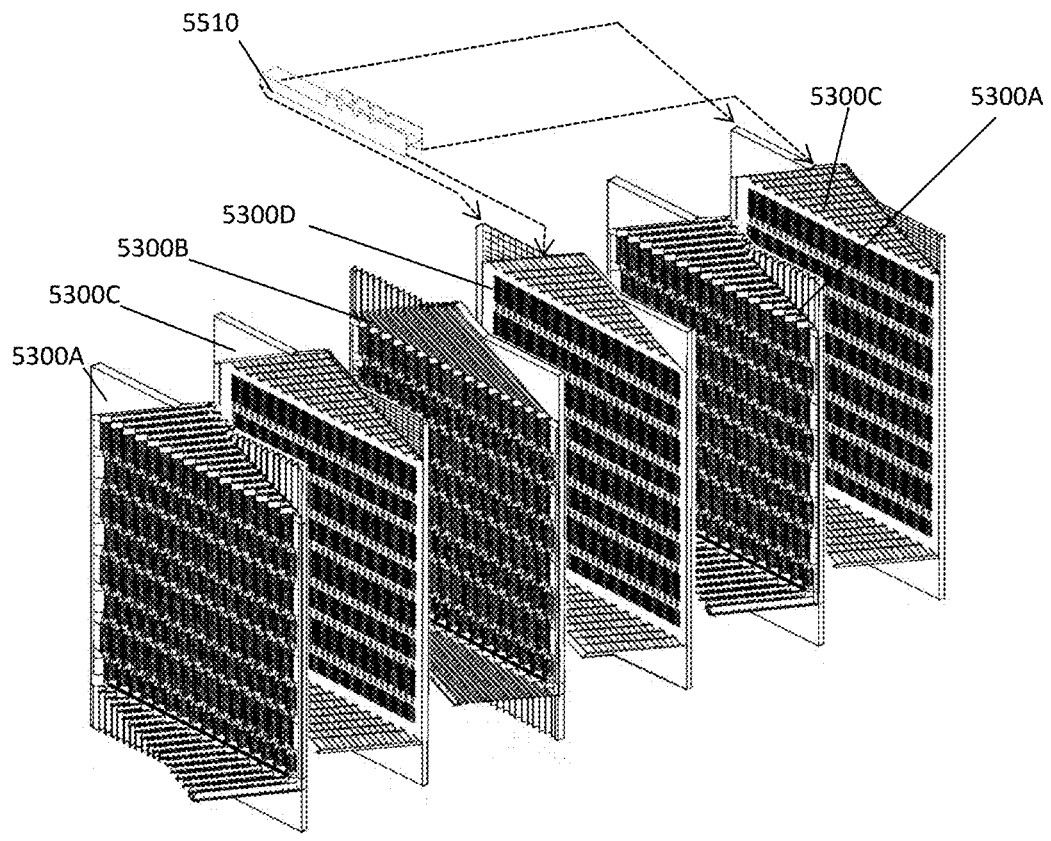
Figure 31:
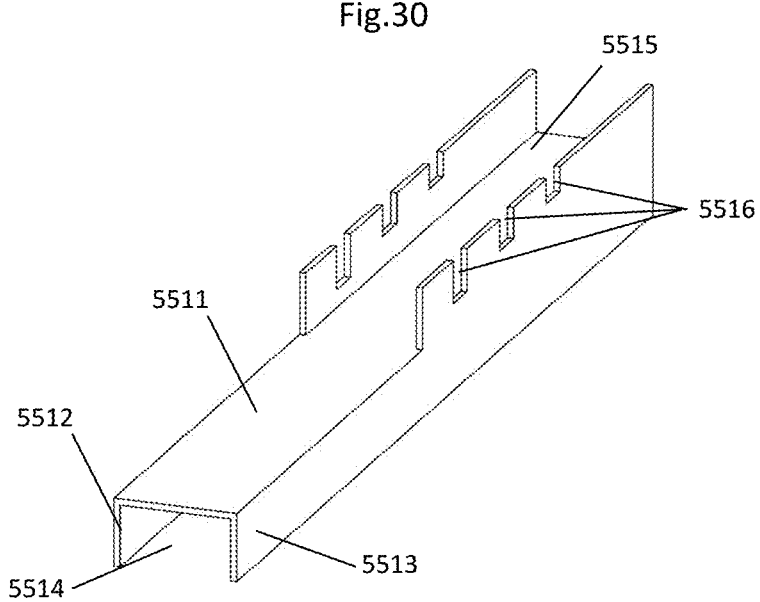

FIG. 27 is a schematic diagram of the mounting positions of the cover members according to the fifth implementation of the present invention. FIG. 28 is a sectional view of the cover member according to an embodiment of the present invention. FIG. 29 is a sectional view of the cover member according to another embodiment of the present invention. FIG. 30 is a sectional view of the mounting positions of cover members according to still another embodiment of the present invention. FIG. 31 is a schematic structure diagram of the cover member shown in FIG. 30.

Cover members 5510 for covering gaps between the first primary packing sheet 5300A and the first and second partition sheets adjacent thereto are arranged at the upper end of the first primary packing sheet 5300A on the non-inflow side and the lower end of the first primary packing sheet 5300A on the non-outflow side. Cover members 5510 for covering gaps between the second primary packing sheet 5300B and the first and second partition sheets adjacent thereto are arranged at the upper end of the second primary packing sheet 5300B on the non-inflow side and the lower end of the second primary packing sheet 5300B on the non-outflow side.

As shown in FIGS. 27 and 28, the cover member 5510 includes a cover sheet 5511. A first buckling portion 5512 extending downward is formed on one side of the cover sheet 5511, while a second buckling portion 5513 extending downward is formed on the other side thereof. A bucking slot 5514 is formed between the first buckling portion 5512 and the second buckling portion 5513. During mounting, the non-inflow/outflow sides at two ends of the first primary packing sheet 5300A and the adjacent first and second partition sheets 5300C and 5300D on two sides thereof in the vertical direction are placed in the buckling slot 5514. The non-inflow/outflow sides at two ends of the second primary packing sheet 5300B and the adjacent first and second partition sheets 5300C and 5300D on two sides thereof in the vertical direction are placed in the buckling slot 5514. In this implementation, the sealed connection between the cover members 5510 and the first and second partition sheets 5300C and 5300D can be realized by gluing, hot melting or the like. Thus, the water sprayed from the upper side of the packing module 5300 can be shielded by the cover members 5510, and will not flow into the gaps on the non-inflow side between the first primary packing sheet 5300A and the first partition sheet 5300C and between the first primary packing sheet 5300A and the second partition sheet 5300C.

In the case where the cover members 5510 are provided, folding edge structures are formed on only the edges of on two sides of the first and second primary packing sheets 5300A, 5300B and the first and second partition sheets 5300C, 5300D in the width direction, and the edges on upper and lower sides thereof are shielded by the cover members 5510. The cover members 5510 can cover the non-inflow sides of the first and second primary packing sheets 5300A, 5300B and the gap between the first module group and the second module group. Thus, the structures of the packing sheets and the partition sheets can be simplified, and the presence of other flow paths except for the first and second flow paths at the bonding surface of the first module group with the second module group can be avoided by providing the cover members 5510.

In the packing module with the cover members 5510 mounted therein, bent evasion portions are provided at the upper ends and/or lower ends of the first primary packing sheet 5300A and the second primary packing sheet 5300B on one side facing away from the folding edges in order to reserve positions for arranging the first buckling portion 5512 and the second buckling portion between the first module group and the second module group. The description will be given by taking the second primary packing sheet 5300B as an example with reference to FIG. 24. A bent evasion portion B5316 is formed on one side of the top of the upper flow guide portion 5310B facing away from the folding edge BP. The bent evasion portion B5316 is bent toward the inner side of the principal plane to form a space capable of accommodating the first buckling portion 5512 or the second buckling portion 5513. Thus, after the packing module 5300 is stacked, the first module group and the second module group can be flatly fitted.

As shown in FIGS. 27 and 29, in this implementation, the height of the upper longitudinal flow guide portions of the first and second primary packing sheets 5300A, 5300B is less than that of the vertex of the upper triangle, and the vertex angle of the upper triangle is protruded upward. The height of the vertex of the lower triangle is less than that of the lower longitudinal flow guide portions of the first and second primary packing sheets 5300A, 5300B, and the vertex angle of the lower triangle is protruded downward. The packing module mounting structure for fixing the packing module includes: an upper partition plate 5210 which supports the packing module and extend upward from the upper vertex angle of the upper flow guide portion of the packing module, and a lower partition plate 5220 which supports the packing module and extends downward from the lower vertex angle of the lower flow guide portion of the packing module.

During the operation of the packing module in this implementation, the spray portion above the heat exchange portion evenly sprays water onto the heat exchange portion. A part of the water directly falls into the inflow port of the packing module, a part of the water will fall on the cover members 5510 on the non-inflow side of the first and second primary packing sheets 5300A, 5300B, and the other part of the water will form a wall flow flowing downward along the surface of the upper partition plate 5210 and the surface of the tower wall 5010. The wall flow will flow the flow guide slots close to the vertex angle of the upper triangle along the upper bracket in the packing module mounting structure, resulting in the uneven distribution of water in the packing module.

In order to solve this technical problem, in this implementation, water guide slots 5515 are formed on the tops of the cover members 5510 on the upper side of the first and second primary packing sheets 5300A, 5300B. The inflow ends of the water guide slots 5515 are close to the vertex angle of the upper triangle, while the outflow ends of the water guide slots 5515 extend away from the vertex angle of the upper triangle in a direction parallel to the width direction of the first and second primary packing sheets 5300A, 5300B and are separated from the edge of the packing module by a certain distance. The flow water can flow in from the inflow ends of the water guide slots 5515 and flow out from the outflow ends of the water guide slots 5515. In this implementation, the outflow ends of the water guide slots 5515 are separated from the edge of the packing module in the width direction by a certain distance, and the water guide slots 5515 can convey water to a middle region of the inflow port of the packing module, so that it is advantageous for the even distribution of water in the packing module.

As shown in FIG. 29, the water guide slots 5515 can be integrally formed with the cover sheets 5511, the first buckling portion 5512 and the second buckling portion 5513 by bend molding.

As shown in FIGS. 30 and 31, diversion portions 5516 are arranged on two sidewalls of the water guide slots 5515. A part of the water in the water guide slots can flow to the inflow import of the packing module through the diversion portions 5516, so that it is further advantageous for the even distribution of water in the packing module.

A plurality of flow division portions 5516 are arranged on two sidewalls of the water guide slots 5515, and the height of bottom edges of the plurality of flow division portions gradually decreases from the inflow ends to the outflow ends of the water guide slots 5515. Thus, when the water amount of the wall flow is large, diversion is preferentially performed at lower positions of the bottom edges of the diversion portion 5516 near the inflow ports of the water guide slots 5515, and the amount of diverted water is larger than that at other positions, so that it is further advantageous for the even distribution of water in the packing module.

In the cover members 5510 shown in FIGS. 30 and 31, the length of the buckling slots 5514 is suitable for covering the non-inflow side of the first and second primary packing sheets 5300A, 5300BB, the water guide slots 5515 are integrally formed with the buckling slots 5514, and the water guide slots 5515 are shorter than the buckling slots 5514.

Figure 32:
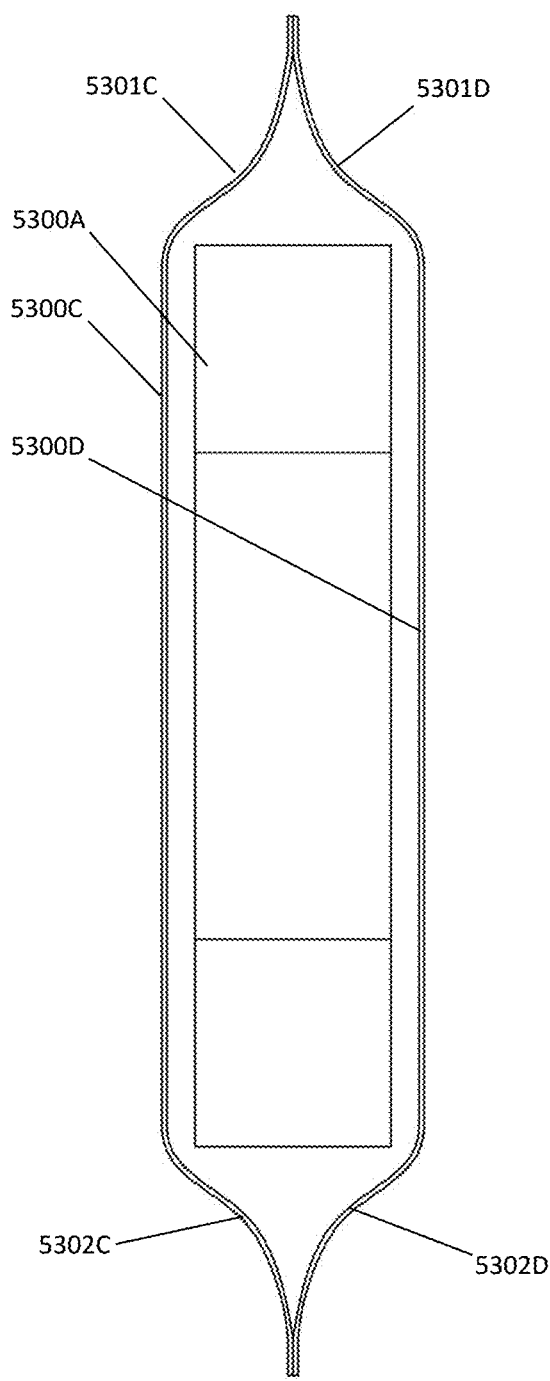

In addition, the cover member 5510 can also be replaced with the structure shown in FIG. 32. As shown in FIG. 32, by taking the first primary packing sheet 5300A as an example, a first partition sheet 5300C and a second partition sheet 5300B are arranged on the left and right sides of the first primary packing sheet 5300A, respectively. The upper end of the first partition sheet 5300C extends upward to form a first upper extension portion 5301C, while the lower end thereof extends downward to form a first lower extension portion 5302C; and, the upper end of the second partition sheet 5300D extends upward to form a second upper extension portion 5301D, while the lower end thereof extends downward to form a second lower extension portion 5302D. The first upper extension portion 5301C can be bonded or heat-sealed with the second upper extension portion 5301D to form a first peak-shaped protrusion. The first upper extension portion 5302C can be bonded or heat-sealed with the second upper extension portion 5302D to form a second peak-shaped protrusion. The connecting structure can replace the cover member 5510 to occlude the non-inflow side and non-outflow side of the first primary packing sheet 5300, and is easy to machine and low in cost. Moreover, the first peak-shaped protrusion can guide the water sprayed from the upper side so that the water smoothly flows into the flow paths on left and right sides; and, the second peak-shaped protrusion can guide the air flowing from the top down on the lower side so that the air smoothly flows into the flow paths on the left and right sides of the second peak-shaped protrusion.

On the top and bottom of the packing module 5300, the cover members 5510 and the bonding or heat-sealing structures can occlude the non-inflow side of the first and second primary packing sheets 5300A, 5300B and the gap between the first module group and the second module group. In addition, when the packing module is stacked, the sealed connection on two sides of the primary packing sheets and partition sheets in the width direction is also a problem to be solved by the present invention.

Figure 33:
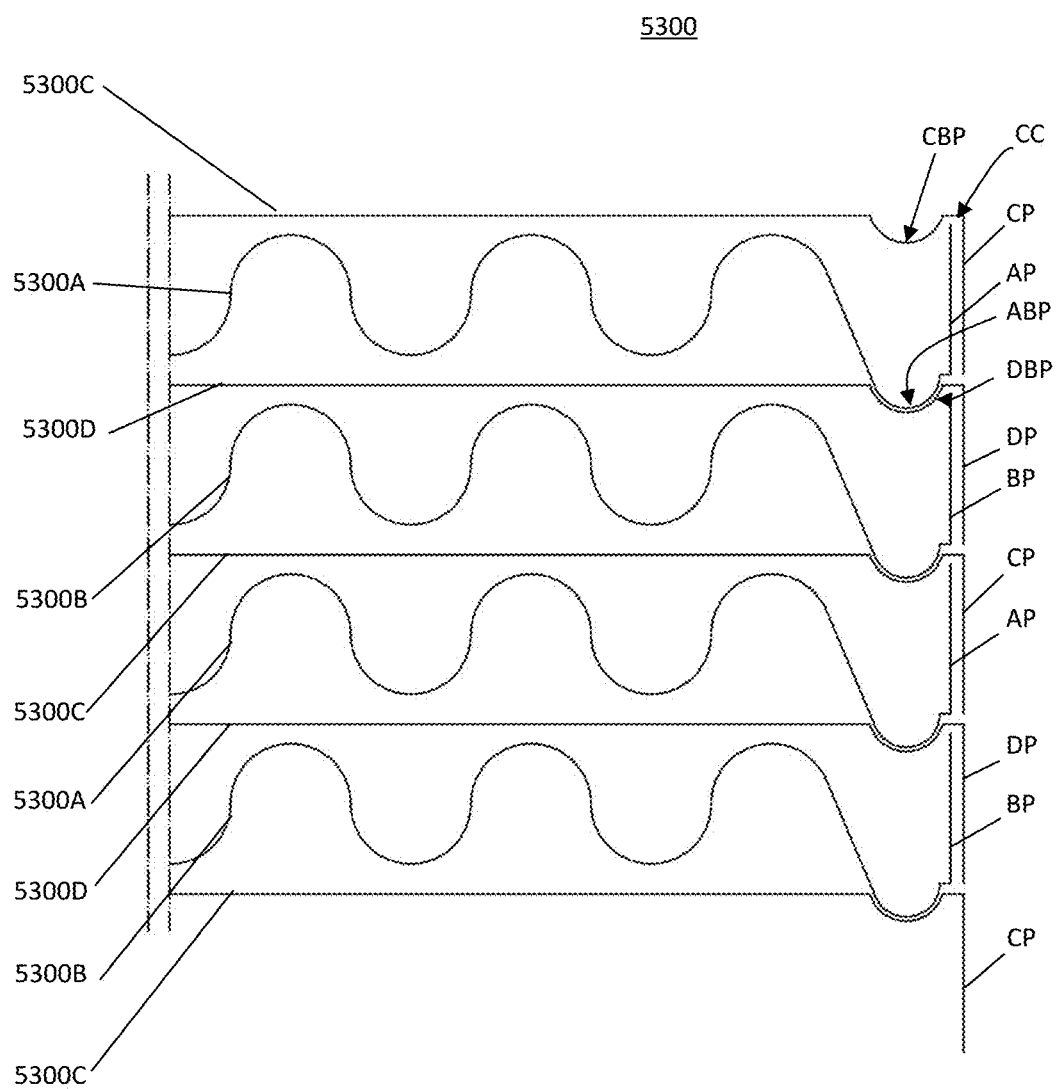

FIG. 33 is a horizontally sectional view after the first and second primary packing sheets 5300A, 5300B and the first and second partition sheets 5300C, 5300D are stacked in this implementation.

As shown in FIG. 33, when the packing module 5300 is stacked, the first partition sheet 5300C, the first primary packing sheet 5300A, the second partition sheet 5300D, the second primary packing sheet 5300B, the first partition sheet 5300C, the first primary packing sheet 5300A . . . are successively stacked.

In FIG. 33, the folding edge CP of the first partition sheet 5300C is stacked with the folding edge AP of the first primary packing sheet 5300A. For example, the sealed and fixed connection between the folding edge CP and the folding edge AP can be realized by bonding or heat-sealing. The first partition sheet 5300C and the first primary packing sheet 5300A form a first module group. A bent portion CBP is provided at a position on the first partition sheet 5300 close to the folding edge CP, and a groove body CC is formed between the bent portion CBP and the folding edge CP. The edge of the folding edge AP is clamped into the groove body CC for fixation. In addition, further, glue can be applied in the groove body CC so that the edge of the free end of the folding edge AP is bonded and fixed at the groove body CC.

The folding edge DP of the second partition sheet 5300D is stacked with the folding edge BP of the second primary packing sheet 5300B. For example, the sealed and fixed connection between the folding edge DP and the folding edge BP can be realized by bonding or heat-sealing. The second partition sheet 5300D and the second primary packing sheet 5300B form a second module group.

For the connection between the first module group and the second module group, as shown in FIG. 33, in the first module group, a bent portion ABP extending vertically is arranged at a position on two sides of the first primary packing sheet 5300A close to the folding edge, and the horizontal section of the bent portion ABP is preferably semicircular but is not limited thereto. In the second module group adjacent to the first module group, a bent portion DBP adapted to the shape of the sections of the bent portion ABP is arranged on the second partition sheet 5300D. The bent portion ABP and the bent portion DBP are the same as in the bending direction. When the first module group and the second module group are stacked, the protruded side of the bent portion ABP is placed into the recessed side of the bent portion DBP. In some embodiments, glue can be applied on the recessed side of the bent portion DBP to realize the sealed and fixed connection between the bent portion ABP and the bent portion DBP. In addition, the bent portion ABP and the bent portion DBP can also play a fixing role when the first module group and the second module group are stacked, so that the edges of the packing sheets and the partition sheets in the packing module in the width direction are aligned with each other.

In addition, in some embodiments, support members 5520 that are supported on the lower side of the packing module and extend in the stack direction of the first and second primary packing sheets are further provided in the packing module. By providing the support members 5520, each primary packing sheet and each partition sheet can be supported, and it is convenient to fix the packing module. Each packing module is preferably supported by two support members 5520, and the two support members 5520 are located on two sides of the vertex angle of the lower triangle, respectively. The section structure of the support members 5520 will not be limited, and for example, may be U-steel, angle iron, I-bar or the like.

The periphery of each packing module can be fixed by a frame formed by profiles such as plates or angle iron, so that each packing module is formed integrally, and it is convenient for transportation and mounting.

Figure 34:
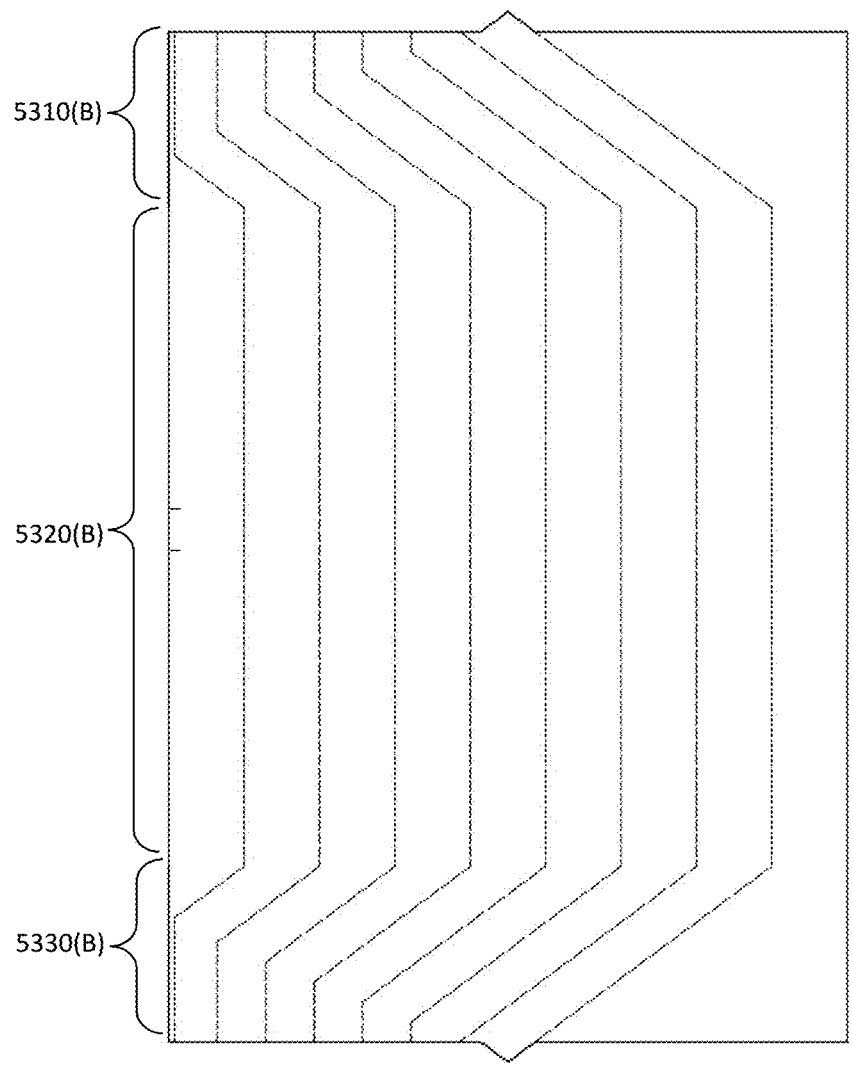

The description will be given by taking the second primary packing sheet 5300B as an example with reference to FIG. 34. The inflow ports at the upper ends of the flow guide slots of the upper flow guide portion 5310B are located on the left side of the second primary packing sheet 5300B in the width direction, and the outflow ports at the lower ends of the flow guide slots of the lower flow guide portion 5330 are located on the left side of the second primary packing sheet 5300B in the width direction. The outflow ports at the lower ends of the flow guide slots of the lower flow guide portion 5330 can also be located on the right side of the second primary packing sheet 5300B in the width direction (referring to FIG. 23).

Figure 35:
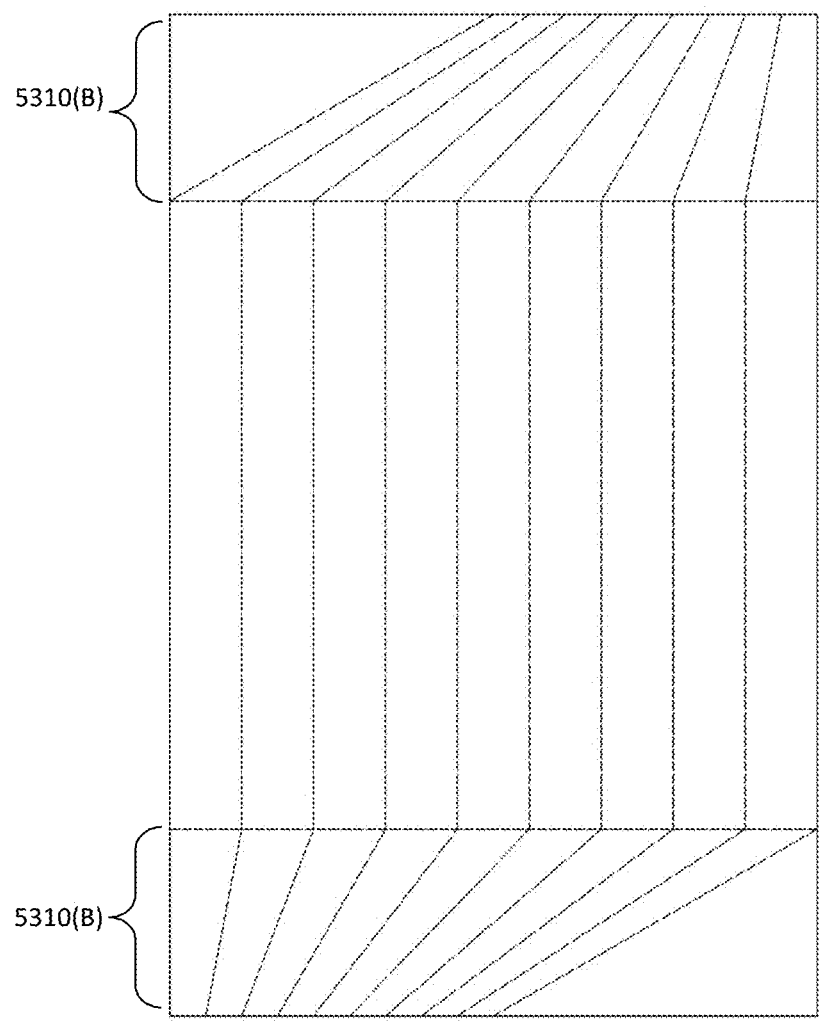

The description will be given by taking the second primary packing sheet 5300B as an example with reference to FIG. 35. The plurality of flow guide slots in the upper flow guide portion 5310B and the lower flow guide portion 5330B may not be parallel to each other, or some flow guide slots are arranged in parallel while other flow guide slots are not arranged in parallel.

[Sixth Implementation]

In the first implementation, in order to realize good fog dispersal performance of the cooling tower 1000 when operating in winter, the plurality of nozzles 210-1215 . . . act at intervals, so that some nozzles are not in the operating state. In this way, when the air in the cooling tower 1000 enters the packing module, the air exchanges heat with water in only some flow paths, while among other flow paths, there are no flow paths coming into contact with water and directly passing through the packing module, for example, the flow path formed by any one of the first and second primary packing sheets A, B. As a result, there may be a problem that the particles such as suspended dust in the air will pollute some flow paths of the packing module. Therefore, in this implementation, the structure of the cooling tower is improved to ensure that the pollutants in air will not pollute the flow paths that do not operate.

Figure 36:
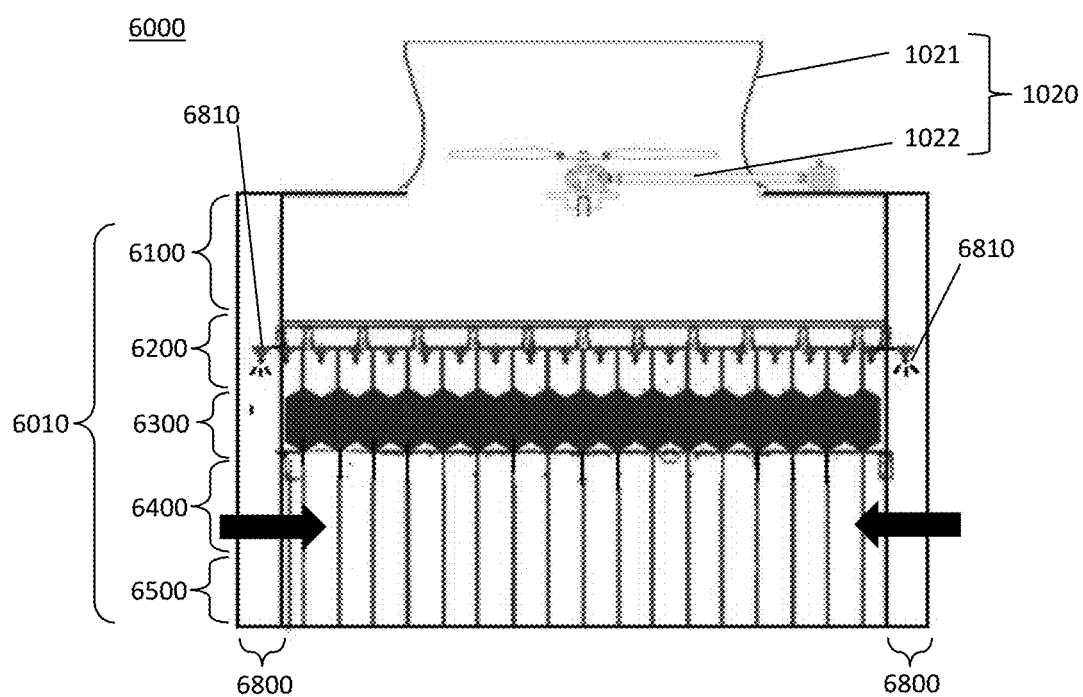

FIG. 36 is a schematic structure diagram of a cooling tower according to the sixth implementation of the present invention. As shown in FIG. 36, in the cooling tower 6000 in this implementation, a cleaning space 6800 is formed between the inner wall surface of the main body 6010 and the internal devices including the spray portion 6200, the heat exchange portion 6300 and the air import portion 6400. Cleaning nozzles 6810 are arranged in the upper portion of the cleaning space 6800. The cleaning nozzles 6810 may be directly connected to the water supply of the spray portion

6200, or may be arranged separately. The cleaning nozzles 6810 are not lower than the heat exchange portion 6300. The water sprayed in the cleaning space 6800 is also collected by the water collecting portion 5500.

By providing the cleaning space 6800, the air sucked into the cooling tower 6000 from the outside can be washed and preheated, avoiding the freezing the packing module caused by suddenly cold air. Moreover, by cleaning the air sucked into the cooling tower 6000 from the air import portion 6400, the dust and particles mixed in the external air can be effectively removed, and the dust and particles in the air are prevented from adhering to some flow paths of the packing module where no hot water passes and polluting the packing module after they enters from the air import portion 6400 and are humidified to a certain extent when some nozzles stops operating in winter.

In this implementation, the cleaning space 6800 preferably has a width of 0.5 m to 1.5 m. If the width of the cleaning space 6800 is tool large, the arrangement space for devices in the cooling tower will be decreased; and, if the width of the cleaning space 6800 is too small, it is likely that the beneficial functions of the cleaning space 6800 cannot be fully developed.

[Seventh Implementation]

Figure 37:
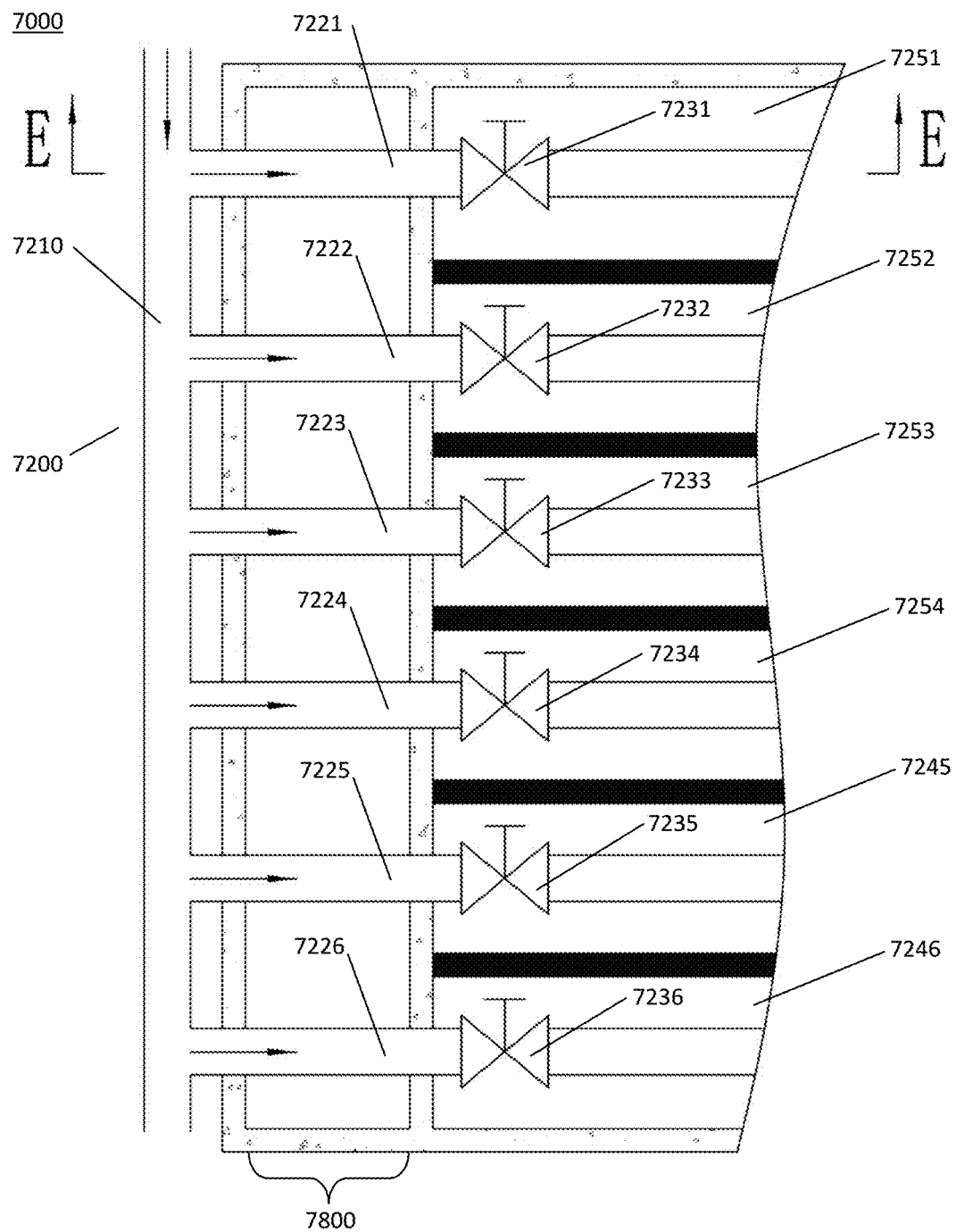
Figure 38:
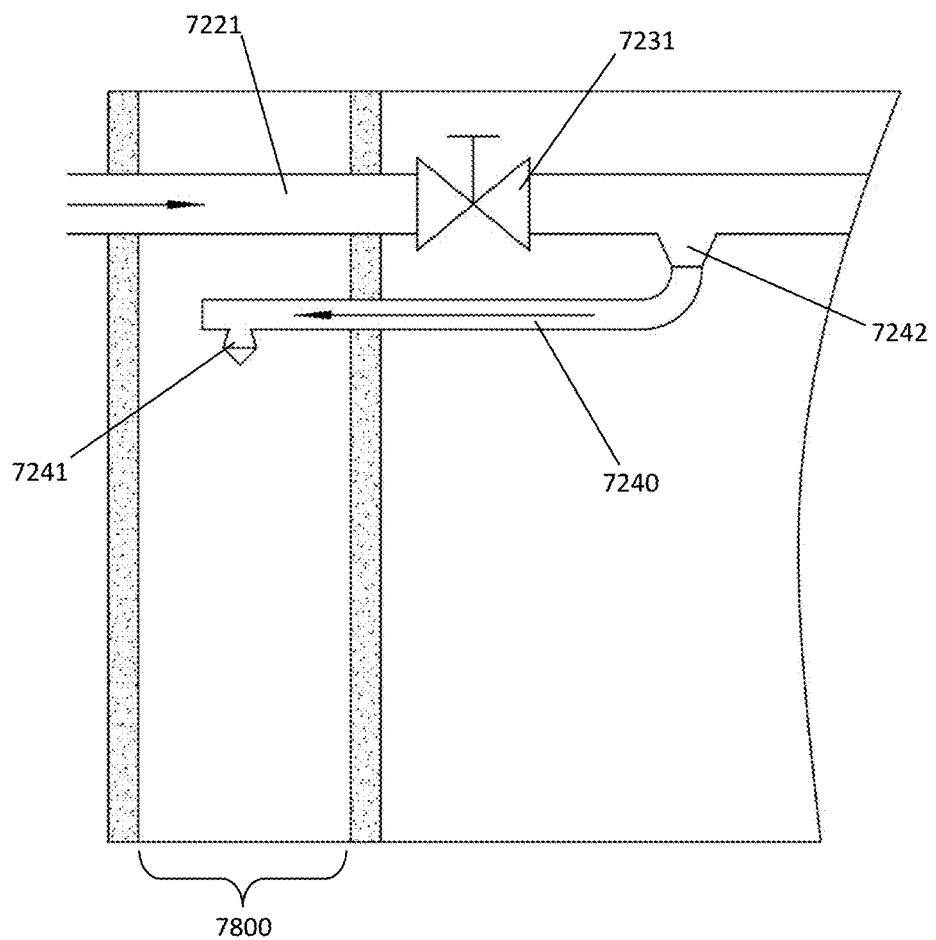

In this implementation, further improvements are made on the basis of the sixth implementation. With reference to FIGS. 37 and 38, an anti-freezing pipe 7240 is additionally provided in the cooling tower in this implementation, avoiding that the leaked water drops into the packing module to freeze the air flow path of the packing module when the closed valves have leakage.

As shown in FIG. 37, the spray portion 7200 of the cooling tower in this implementation includes a water supply pipe 7210 and a plurality of branch pipes 7221-7226. Branch valves 7231-7236 are correspondingly arranged at inflow ports of the branch pipes 7221-7226. By opening/closing the branch valves 7231-7236, water drops into only some spray spaces.

For example, by closing the branch valves 7231, 7233 and 7235 and opening the branch valves 7232, 7234 and 7236, water does not drop into the spray spaces 7251, 7253 and 7255, but drops into the spray spaces 7252 and 7254. In winter, in the spray spaces 7251, 7253 and 7255 without water sprayed therein, cold air enters the packing module from the air import portion. Due to low temperature in winter, in the case where the branch valves 7231, 7233 and 7235 have slight leakage, a small amount of water directly comes into contact with a relatively large amount of air, and the leaked water is easily iced in the packing module to occlude the flow paths, so that it is easy to result in the freezing and cracking of the packing module.

As shown in FIG. 38, by taking the branch valve 7231 as an example, in the cooling tower in this implementation, an ant-freezing pipe 7240 is arranged on the branch valve 7231. One end of the ant-freezing pipe 724 is connected to the branch pipe 7221 on the rear side of the branch valve 7231, while the other end thereof extends into the cleaning space 7800. In the case where the branch valve 7231 has slight leakage, the anti-freezing pipe 7240 guides the slightly leaked water to the cleaning space 7800, avoiding the water from dropping into the packing module on the lower side.

In some embodiments, a horn-mouth portion 7242 can be arranged at the junction of the anti-freezing pipe 7240 and the branch pipe 7221, and a larger path is provided at the horn-mouth portion 7242 and the branch pipe 7221. This structure is advantageous for guiding flow into the anti-freezing pipe 7240.

In some embodiments, a nozzle 7241 can be arranged at an end of the anti-freezing pipe 7240 extending into the cleaning space 7800, and the leaked water is used as water for spraying, so that the water is rationally utilized. The anti-freezing pipe 7240 can be arranged on each branch pipe, and a small number of nozzles are additionally provided on the branch pipes through which water flows, so that the spraying area and the heat exchange area are increased. The anti-freezing pipes on the branch pipes through which no water flows can prevent the packing module from freezing.

In addition, the leaked water can also be guided into the adjacent spray space for spraying. For example, one end of the anti-freezing pipe 7240 in this spray space 7251 is connected to the branch pipe 7221, while the other end thereof extends into the spray space 7252.

[Eighth Implementation]

The packing module in the above implementations can also be arranged on the upper side of the spray portion to form a condensation portion to realize the heat exchange between dry cold air and wet hot air, thereby achieving the purpose of saving water and dispersing fog.

Specifically, FIG. 39 is a schematic structure diagram of a cooling tower according to the eighth implementation of the present invention. As shown in FIG. 39, in the main body 8010 of the cooling tower 8000, an air mixing portion 8100, a condensation portion 8600, a spray portion 8200, a heat exchange portion 8300, an air import portion 8400 and a water collecting portion 8500 are arranged from the top down. An exhaust portion 8010 is arranged in an upper portion of the main body 8020, and the exhaust portion 8020 includes an air duct 8021 and a draught fan 8021 arranged in the air duct 8022.

According to the cooling tower, a plurality of nozzles 8211-8217 in the upper portion of the spray portion 8200 spray hot water downward, and the hot water falls in the internal space of the spray portion 8200 to enter the heat exchange portion 8300. In the heat exchange portion, the hot water exchanges heat with cold air flowing from the lower portion of the heat exchange portion 8300, then flows out from the lower portion of the heat exchange portion 8300, falls into the water collecting portion 1500 through the air import portion 8400, and is collected on the bottom of the main body 8010 of the cooling tower 8000. The heat exchange portion 8300 may be conventional stacked sheets, or may be the packing module described in the above embodiments.

In this implementation, a plurality of partition plates 8231-8236 . . . arranged in parallel are provided on the lower side of the condensation portion 8600, and a plurality of spray spaces 8221-8227 . . . are partitioned by the plurality of partition plates on the lower side of the condensation portion 8600. In the spray portion 8200, nozzles 8211-8217 . . . are located in dependent spray spaces 8221-8227 . . . , respectively. In addition, adjacent nozzles 8211-8217 are controlled in opposite switching ways. That is, as shown in FIG. 39, if the nozzles 8211, 8213 . . . are closed, the nozzles 8212, 8214 . . . are opened.

Therefore, in the spray space 8221, 8223 . . . , the dry cold air flowing from the air import portion 8400 flows through the heat exchange portion 8300 without hot water sprayed thereon and then flows upward to the condensation portion 8600, and flows through the first flow path of the packing module in the condensation portion to the air mixing portion 8100. However, in the spray space 8222, 8224, the dry cold air flowing from the air import portion 8400 flows through the heat exchange portion 8300 with hot water sprayed thereon to come into contact and exchange heat with the hot water to form wet hot air. The wet hot air also flows upward through the second flow path of the packing module in the condensation portion 8600 to reach the air mixing portion 8100 so as to mix the dry cold air. After mixed, the wet hot air changes from the saturated state to the unsaturated state, so that the fog dispersal effect is achieved.

In the packing module in the condensation portion, when the wet hot air in the second flow path comes into contact with the cold surface of the first flow path, condensed water droplets are formed on the surface of the second flow path. These water droplets are resulted from cooling the wet cold air so that the water content in the wet hot air decreases. The condensed water droplets fall back to the water collecting portion 8500, so that the purpose of saving water is achieved. In summer, the nozzles can be opened so that the cooling tower has higher heat dissipation capability; while in winter, adjacent nozzles 8211-8217 . . . are controlled in opposite switching ways, so that the purpose of saving water and dispersing fog is achieved.

FIG. 40 shows a cooling tower in other embodiments, where the condensation portion 8600 is a rectangular packing module (referring to FIG. 21). It should be emphasized that the packing module structures in the above implementations can be used as the packing modules in the condensation portion and those skilled in the art can adaptively adjust or simplify the shape of the packing module as needed. For example, the packing module is formed in a rhombic shape, a parallelogram shape, a pentagonal shape or the like, and the structures varied according to the concepts of the present invention shall fall into the protection scope of the present invention.

The invention claimed is:

1. A packing module having:
stacked first flow path and second flow path which exchange heat between water sprayed from above and air flowing from below to above;
a first import portion for importing water sprayed from one side of the packing module in a width direction into the first flow path;
a second import portion for importing water sprayed from the other side of the packing module in the width direction into the second flow path;
a first export portion for guiding water flowing out from the first water path to one side of the packing module in the width direction for discharging; and
a second export portion for guiding water flowing out from the second water path to the other side of the packing module in the width direction for discharging,
wherein the first and second flow paths are stacked, and occupy the approximately full width of the packing module in the width direction, respectively,
wherein the packing module further comprises:
first primary packing sheets, which limit the formation of the first flow path;
second primary packing sheets, which limit the formation of the second flow path and arranged in an alternative direction with the first primary packing sheets; and
partition sheets, which separate the first primary packing sheets from the second primary packing sheets,
wherein the first and second import portions and/or the first and second export portions are formed as a triangular shape having a vertex angle pointing to the outside of the packing module when viewed in a stack direction of the packing module,
wherein the partition sheets comprise:
first partition sheets, which are located on one side of the first primary packing sheets and matched with the first primary packing sheets to form a first module group; and
second partition sheets, which are located on one side of the second primary packing sheets and matched with the second primary packing sheets to form a second module group; and
the first module group and the second module group are stacked to form the packing module, and
wherein when the first and second module groups are stacked, import portion water-retaining ribs are formed on the outer surfaces of the first and second folding groups of the first and second import portions.

2. The packing module according to claim 1, wherein:
the import portion water-retaining ribs are formed as a herringbone shape with an upward tip.

3. A packing module having:
stacked first flow path and second flow path which exchange heat between water sprayed from above and air flowing from below to above;
a first import portion for importing water sprayed from one side of the packing module in a width direction into the first flow path;
a second import portion for importing water sprayed from the other side of the packing module in the width direction into the second flow path;
a first export portion for guiding water flowing out from the first water path to one side of the packing module in the width direction for discharging; and
a second export portion for guiding water flowing out from the second water path to the other side of the packing module in the width direction for discharging,
wherein the first and second flow paths are stacked, and occupy the approximately full width of the packing module in the width direction, respectively,
wherein the packing module further comprises:
first primary packing sheets, which limit the formation of the first flow path;
second primary packing sheets, which limit the formation of the second flow path and arranged in an alternative direction with the first primary packing sheets; and
partition sheets, which separate the first primary packing sheets from the second primary packing sheets,
wherein the first and second import portions and/or the first and second export portions are formed as a triangular shape having a vertex angle pointing to the outside of the packing module when viewed in a stack direction of the packing module,
wherein the partition sheets comprise:
first partition sheets, which are located on one side of the first primary packing sheets and matched with the first primary packing sheets to form a first module group; and
second partition sheets, which are located on one side of the second primary packing sheets and matched with the second primary packing sheets to form a second module group; and
the first module group and the second module group are stacked to form the packing module, and
wherein when the first and second module groups are stacked, export portion water-retaining ribs are formed on the outer surfaces of the first and second folding groups of the first and second export portions.

4. A packing module having:
stacked first flow path and second flow path which exchange heat between water sprayed from above and air flowing from below to above;
a first import portion for importing water sprayed from one side of the packing module in a width direction into the first flow path;
a second import portion for importing water sprayed from the other side of the packing module in the width direction into the second flow path;
a first export portion for guiding water flowing out from the first water path to one side of the packing module in the width direction for discharging; and
a second export portion for guiding water flowing out from the second water path to the other side of the packing module in the width direction for discharging,
wherein the first and second flow paths are stacked, and occupy the approximately full width of the packing module in the width direction, respectively, and
wherein the packing module further comprises:
first primary packing sheets, which limit the formation of the first flow path;
second primary packing sheets, which limit the formation of the second flow path and arranged in an alternative direction with the first primary packing sheets; and
partition sheets, which separate the first primary packing sheets from the second primary packing sheets, wherein:
the partition sheets comprise first partition sheets and second partition sheets; the first partition sheets are located on one side of the first primary packing sheets and matched with the first primary packing sheets to form a first module group; the second partition sheets are located on one side of the second primary packing sheets and matched with the second primary packing sheets to form a second module group; and the first module group and the second module group are stacked to the packing module;
in the upper portion of the packing module: when viewed in the stack direction of the packing sheets, the packing module forms, in a vertical direction, upper flow guide portions with an upper triangle having a vertex angle pointing to the upper side of the packing module, and upper longitudinal flow guide portions communicating a bevel edge of the upper triangle on an inflow side;
in the lower portion of the packing module: when viewed in the stack direction of the packing sheets, the packing module forms, in a vertical direction, lower flow guide portions with a lower triangle having a vertex angle pointing to the lower side of the packing module, and lower longitudinal flow guide portions communicating a bevel edge of the upper triangle on an outflow side;
the first primary packing sheets guide, at the upper flow guide portions, water from a bevel edge on one side as the bevel edge on the inflow side to the middle part of the approximately full width of the first primary packing sheets, and guide, at the lower flow guide portions, the water from the middle part of the approximately full width of the first primary packing sheets to a bevel edge on the other side as the bevel edge on the outflow side or the bevel edge on the one side;
for the first primary packing sheets, the upper longitudinal flow guide portions are arranged at positions corresponding to the bevel edge on the one side, and the lower longitudinal flow guide portions are arranged at position corresponding to the bevel edge on the other side or the bevel edge on the one side;
the second primary packing sheets guide, at the upper flow guide portions, water from a bevel edge on the other side as the bevel edge on the inflow side to the middle part of the approximately full width of the second primary packing sheets, and guide, at the lower flow guide portions, the water from the middle part of the approximately full width of the second primary packing sheets to a bevel edge on one side as the bevel edge on the outflow side or the bevel edge on the other side; and
for the second primary packing sheets, the upper longitudinal flow guide portions are arranged at positions corresponding to the bevel edge on the other side, and the lower longitudinal flow guide portions are arranged at positions corresponding to the bevel edge on the one side or the bevel edge on the other side.

5. The packing module according to claim 4, wherein:
the height of the upper longitudinal flow guide portions of the first and second primary packing sheets is less than that of the vertex of the upper triangle, and the vertex angle of the upper triangle is protruded upward; and
the height of the vertex of the lower triangle is less than that of the lower longitudinal flow guide portions of the first and second primary packing sheets, and the vertex angle of the lower triangle is protruded downward.

6. The packing module according to claim 4, wherein:
the upper ends of the first and second primary packing sheets on a non-inflow side are at the same height as the upper ends of the upper longitudinal flow guide portions; and
the lower ends of the first and second primary packing sheets on a non-outflow side are at the same height as the lower ends of the upper longitudinal flow guide portions.

7. The packing module according to claim 6, wherein:
on the edges, where no inflow/outflow port is formed, of the first primary packing sheets and the first partition sheets, first folding groups that can be folded toward each other in opposite directions and can be buckled with each other are formed;
on the edges, where no inflow/outflow port is formed, of the second primary packing sheets and the second partition sheets, second folding groups that can be folded toward each other in opposite directions and can be buckled with each other are formed;
cover members for covering gaps between the first primary packing sheets and between first and second partition sheets adjacent thereto are arranged at the upper ends of the first primary packing sheets on the non-inflow side and the lower ends of the first primary packing sheets on the non-outflow side; and
cover members for covering gaps between the second primary packing sheets and between first and second partition sheets adjacent thereto are arranged at the upper ends of the second primary packing sheets on the non-inflow side and the lower ends of the second primary packing sheets on the non-outflow side.

8. The packing module according to claim 7, wherein:
water guide slots are formed on the tops of the cover members on the upper side of the first and second primary packing sheets; the inflow ends of the water guide slots are close to the vertex angle of the upper triangle; and, the outflow ends of the water guide slots extend away from the vertex angle of the upper triangle in a direction parallel to the width direction of the packing module and is separated from the edge of the packing module by a certain distance.

9. The packing module according to claim 8, wherein:
a plurality of diversion portions are arranged on two sidewalls of the water guide slots, and the height of bottom edges of the plurality of diversion portions gradually decreases from the inflow ends to the outflow ends of the water guide slots.

10. A packing module having:
stacked first flow path and second flow path which exchange heat between water sprayed from above and air flowing from below to above;
a first import portion for importing water sprayed from one side of the packing module in a width direction into the first flow path;
a second import portion for importing water sprayed from the other side of the packing module in the width direction into the second flow path;
a first export portion for guiding water flowing out from the first water path to one side of the packing module in the width direction for discharging; and
a second export portion for guiding water flowing out from the second water path to the other side of the packing module in the width direction for discharging,
wherein the first and second flow paths are stacked, and occupy the approximately full width of the packing module in the width direction, respectively, and
wherein the packing module further comprises:
  first primary packing sheets, which limit the formation of the first flow path;
  second primary packing sheets, which limit the formation of the second flow path and arranged in an alternative direction with the first primary packing sheets; and
  partition sheets, which separate the first primary packing sheets from the second primary packing sheets,
wherein:
  the first import portion is formed to guide, above the first primary packing sheets and by using a flow guide slot arranged obliquely, water flowing from one side of the packing module in the width direction to the first flow path, and
  the second import portion is formed to guide, above the second primary packing sheets and by using a flow guide slot arranged obliquely, water flowing from the other side of the packing module in the width direction to the second flow path, and
wherein flared portions are formed at lower openings of the flow guide slots obliquely arranged in the first and second import portions, and the flared portions are gradually widened from the top down.

11. The packing module according to claim 10, wherein:
in the first import portion, protrusion portions protruded outward in a normal direction of a plane where the first primary packing sheets are located are formed between two adjacent flow guide slots;
in the second import portion, protrusion portions protruded outward in a normal direction of a plane where the second primary packing sheets are located are formed between two adjacent flow guide slots; and
the flared portions are connected to at least one protrusion portion adjacent thereto through smooth transition surfaces.

12. The packing module according to claim 11, wherein:
the smooth transition surfaces are curved surfaces.

13. The packing module according to claim 11, wherein:
the lower ends of the protrusion portions gradually decrease in protrusion height and gradually decrease in width from the top down.

14. The packing module according to claim 11, wherein:
the flared portions are connected to the protrusion portions on the lower side thereof through first transition surfaces, and the first transition surfaces are convex smooth transition surfaces; and
the flared portions are connected to the protrusion portions on the upper side thereof through second transition surfaces, and the second transition surfaces are concave smooth transition surfaces.

15. The packing module according to claim 10 wherein:
diffusion portions for uniformly distributing water to the middle part of the approximately full width of the first primary packing sheets are formed on the first primary packing sheets between the first import portion and the middle part of the approximately full width of the first primary packing sheets; and
diffusion portions for uniformly distributing water to the middle part of the approximately full width of the second primary packing sheets are formed on the second primary packing sheets between the first import portion and the middle part of the approximately full width of the second primary packing sheets.

16. The packing module according to claim 15, wherein:
the diffusion portions are formed as diffusion protrusions in multiple inverted herringbone shapes.

17. The packing module according to claim 16, wherein:
the intersection points of the herringbone shapes of the diffusion portions are approximately aligned with opening centers of the corresponding flow guide slots facing the middle parts of the approximately full widths of the first and second primary packing sheets.

* * * * *